US012669576B2

(12) United States Patent
Kishigami

(10) Patent No.: US 12,669,576 B2
(45) Date of Patent: Jun. 30, 2026

(54) RADAR APPARATUS AND TRANSMISSION METHOD OF RADAR APPARATUS

(71) Applicant: Panasonic Automotive Systems Co., Ltd., Kanagawa (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 330 days.

(21) Appl. No.: 18/611,434

(22) Filed: Mar. 20, 2024

(65) Prior Publication Data

US 2024/0319331 A1    Sep. 26, 2024

(30) Foreign Application Priority Data

Mar. 22, 2023    (JP) ................................. 2023-045450

(51) Int. Cl.
| | |
|---|---|
| *G01S 7/35* | (2006.01) |
| *G01S 7/42* | (2006.01) |
| *G01S 13/00* | (2006.01) |
| *G01S 13/42* | (2006.01) |

(52) U.S. Cl.
CPC .............. *G01S 7/35* (2013.01); *G01S 13/003* (2013.01); *G01S 13/42* (2013.01)

(58) Field of Classification Search
CPC .......... G01S 7/35; G01S 13/003; G01S 13/42; G01S 13/325; G01S 13/343; G01S 13/584; G01S 13/931
See application file for complete search history.

(56) References Cited

U.S. PATENT DOCUMENTS

| | | | | |
|---|---|---|---|---|
| 10,567,021 | B1* | 2/2020 | Jensen | ................. H04B 1/1018 |
| 2010/0103045 | A1* | 4/2010 | Liu | ..................... H04L 43/0847 |
| | | | | 342/372 |

(Continued)

FOREIGN PATENT DOCUMENTS

| | | |
|---|---|---|
| JP | 2014119344 A | 6/2014 |
| JP | 2019052952 A | 4/2019 |

(Continued)

OTHER PUBLICATIONS

Cadzow, "Direction-of-Arrival Estimation Using Signal Subspace Modeling," *IEEE Transactions on Aerospace and Electronic Systems* 28(1):64-79, Jan. 1992. (16 pages).

(Continued)

*Primary Examiner* — William Kelleher
*Assistant Examiner* — Juliana Cross
(74) *Attorney, Agent, or Firm* — Seed Intellectual Property Law Group LLP

(57)    ABSTRACT

Provided is a radar apparatus that includes: a plurality of transmission antennas including a first transmission antenna, which is connected to a first feeding line, and a second transmission antenna, which is connected to a second feeding line different from the first feeding line; and transmission circuitry, which, in operation, performs multiplexing transmission of a transmission signal, to which a phase rotation amount corresponding to a Doppler shift amount is applied, from the plurality of transmission antennas. A phase deviation due to a line length difference between the first feeding line and the second feeding line is an odd multiple of π/2.

20 Claims, 13 Drawing Sheets

(56)     References Cited

U.S. PATENT DOCUMENTS

| | | | |
|---|---|---|---|
| 2013/0115886 A1* | 5/2013 | Khan .................. | H01Q 21/061 |
| | | | 455/39 |
| 2019/0379137 A1 | 12/2019 | Ohguchi | |
| 2020/0209380 A1 | 7/2020 | Takayama | |
| 2020/0393553 A1* | 12/2020 | Kishigami .............. | G01S 7/036 |
| 2022/0066012 A1 | 3/2022 | Jansen et al. | |
| 2022/0107402 A1 | 4/2022 | Kishigami | |

FOREIGN PATENT DOCUMENTS

| | | | |
|---|---|---|---|
| JP | 2019211388 A | 12/2019 | |
| JP | 2020148754 A | 9/2020 | |
| JP | 2020204603 A | 12/2020 | |
| JP | 2021001799 A | 1/2021 | |

OTHER PUBLICATIONS

Jung et al., "Solving Doppler-Angle Ambiguity of BPSK-MIMO FMCW Radar System," *IEEE Access*, vol. 9, pp. 120347-120357, 2021. (11 pages).

Kronauge et al., "Fast Two-Dimensional CFAR Procedure," *IEEE Transactions on Aerospace and Electronic Systems* 49(3):1817-1823, Jul. 2013. (7 pages).

Li et al., "MIMO Radar with Colocated Antennas," *IEEE Signal Processing Magazine*, pp. 106-114, Sep. 2007. (9 pages).

* cited by examiner

RADAR APPARATUS AND TRANSMISSION METHOD OF RADAR APPARATUS

TECHNICAL FIELD

The present disclosure relates to a radar apparatus.

BACKGROUND ART

In recent years, a study of radar apparatuses using a short-wavelength radar transmission signal including a microwave or a millimeter wave that allows high resolution is under way. As a radar apparatus, for example, a configuration in which a receiver as well as a transmitter include a plurality of antennas (array antenna) and beam scanning is performed through signal processing using transmission and reception array antennas (which may also be referred to as a Multiple Input Multiple Output (MIMO) radar) has been proposed (for example, see Non-Patent Literature (hereinafter referred to as "NPL") 1).

CITATION LIST

Patent Literature (Hereinafter Referred to as "PTL")

PTL 1
    Japanese Patent Application Laid-Open No. 2014-119344
PTL 2
    Japanese Patent Application Laid-Open No. 2019-052952
PTL 3
    Japanese Patent Application Laid-Open No. 2020-204603
PTL 4
    Japanese Patent Application Laid-Open No. 2020-148754

Non-Patent Literature

NPL 1
    J. Li, and P. Stoica, "MIMO Radar with Colocated Antennas", Signal Processing Magazine, IEEE Vol. 24, Issue: 5, pp. 106-114, 2007
NPL 2
    J. Jung, S. Lim, S.-C. Kim and S. Lee, "Solving Doppler-Angle Ambiguity of BPSK-MIMO FMCW Radar System", in IEEE Access, vol. 9, pp. 120347-120357, 2021
NPL 3
    M. Kronauge, H. Rohling, "Fast two-dimensional CFAR procedure", IEEE Trans. Aerosp. Electron. Syst., 2013, 49, (3), pp. 1817-1823
NPL 4
    J. A. Cadzow, "Direction-of-arrival estimation using signal subspace modeling", IEEE Transactions on Aerospace and Electronic Systems, Volume: 28, Issue: 1, Publication Year: 1992, Page(s): 64-79

SUMMARY OF INVENTION

Nonetheless, methods of detecting a target object (or a target) by a radar apparatus (for example, a MIMO radar) have not been sufficiently studied.

One non-limiting and exemplary embodiment facilitates providing a radar apparatus that improves target object detection accuracy.

A radar apparatus according to an exemplary embodiment of the present disclosure includes: a plurality of transmission antennas including a first transmission antenna, which is connected to a first feeding line, and a second transmission antenna, which is connected to a second feeding line different from the first feeding line; and transmission circuitry, which, in operation, performs multiplexing transmission of a transmission signal, to which a phase rotation amount corresponding to a Doppler shift amount is applied, from the plurality of transmission antennas. A phase deviation due to a line length difference between the first feeding line and the second feeding line is an odd multiple of $\pi/2$.

It should be noted that general or specific embodiments may be implemented as a system, a method, an integrated circuit, a computer program, a storage medium, or any selective combination thereof.

According to an exemplary embodiment of the present disclosure, target detection accuracy in a radar apparatus can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
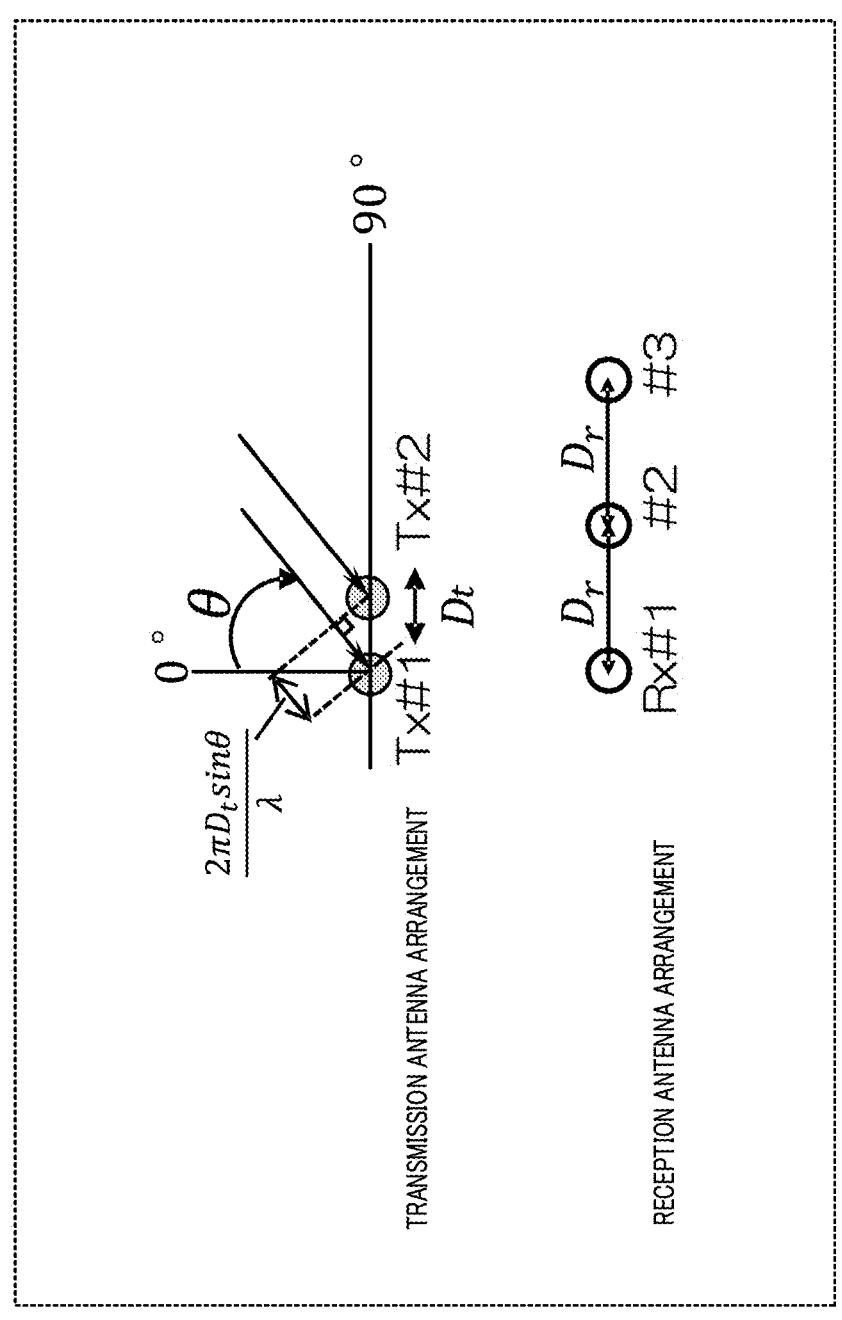
FIG. 1 illustrates exemplary antenna arrangements in a radar apparatus and an exemplary target object direction.

The following description will focus on a multiplexing transmission method in a MIMO radar.

Examples of a method of simultaneously multiplexing and transmitting transmission signals from a plurality of transmission antennas include a method of transmitting signals such that a receiver is capable of demultiplexing a plurality of transmission signals in the Doppler frequency domain (hereinafter, the method will be referred to as "Doppler multiplexing (DDM: Doppler Division Multiplexing) transmission or "DDM transmission") (see, for example, PTL 1).

In DDM transmission, for example, for each transmission antenna, a transmitter applies phase rotations that apply different Doppler shift amounts (hereinafter, a Doppler shift amount will be referred to as a DS amount) to transmission signals to be transmitted, and simultaneously transmits the transmission signals from a plurality of transmission antennas. In DDM transmission, each signal (reflected wave from a target object) received using a plurality of reception antennas is subjected to filtering in the Doppler frequency domain, and thus, the transmission signals transmitted from the transmission antennas are demultiplexed and received.

In a MIMO radar using DDM transmission, simultaneous transmission of transmission signals from a plurality of transmission antennas makes it possible to reduce time intervals for observing changes in received phases when Fourier frequency analysis is applied for Doppler frequency detection (for example, relative velocity detection), in comparison with time-division multiplexing transmission. In the MIMO radar using DDM transmission, on the other hand, filtering is performed on a Doppler frequency axis to demultiplex transmission signals from transmission antennas, and thus, the effective Doppler frequency bandwidth per transmission signal is restricted.

As described above, in the MIMO radar using DDM transmission, reflected wave signals corresponding to transmission signals from transmission antennas are subjected to reception processing on the assumption that each of the reflected waves is included within a Doppler frequency range of $\pm 1/(2Tr \times Nt)$, and thus, the Doppler frequency range is the same as that in a case where time-division multiplexing transmission is performed. Here, Nt is the number of transmission antennas and Tr is the transmission period for transmission signals.

For example, as a method of enlarging a Doppler frequency detection range in DDM transmission, PTL 2 discloses a DDM transmission method in which Doppler intervals to be assigned to a plurality of transmission antennas are unequal intervals. Thus, a detectable Doppler frequency range can be enlarged. Here, in PTL 2, a multi-valued phase shifter with a multi-valued number more than the number of transmission antennas is used. For example, in the case of two transmission antennas, a three-valued or more-valued phase shifter is used. For example, one of phase rotations (for example, phase rotation amounts of three values of 0, $\pi/3$, and $\frac{2}{3}\pi$) that differ for each transmission antenna is applied to a chirp signal for each transmission period. In this case, it is required to narrow phase rotation intervals by the phase shifter (for example, to increase the phase multivalued number), and the circuitry configuration of the phase shifter is likely to be complicated and the cost of the radar apparatus is likely to increase for increasing the accuracy of the phase rotation of the phase shifter.

For example, NPL 2 discloses a method of determining a transmission antenna so as to retain the continuity of phase changes between virtual reception antennas depending on a target object direction. For example, a phase difference between virtual antennas arranged at equal intervals on a straight line becomes a phase change to be fitted by a straight line of an inclination depending on a target object direction. For this reason, in the method disclosed in NPL 2, a transmission antenna is determined such that coincidence in phase changes is high.

For example, a case where 0 [Hz] and $-1/(2Tr)$ [Hz] that are transmission Doppler shifts (hereinafter, each of which will also be referred to as "transmission Doppler shift (DS) amount") in which a Doppler frequency range of $\pm 1/(2Tr)$ is equally divided into Nt pieces (for example, Nt=2) are applied to Nt transmission antennas (Tx #1 and Tx #2 in the case of Nt=2) will be described. In this case, the radar apparatus multiplies a chirp signal, which is a transmission signal of the m-th transmission period, with each of phase rotations $\Phi_1(m)=(m-1)\Delta\Phi_1$ and $\Phi_2(m)=(m-1)\Delta\Phi_2$ (where $\Delta\Phi_1=0$ and $\Delta\Phi_2=\pi$), and transmits the chirp signal from Tx #1 and Tx #2. In such a case, when reflected waves from a target object at a given distance are detected, two Doppler frequency peaks are detected, as the Doppler frequency (fd) at distance Bin corresponding to the distance, in a range of $-1/(2Tr)\leq fd<1/(2Tr)$, where Tr is the transmission period, and m represents a natural number equal to or less than a predetermined value. For example, assumed Doppler frequencies of reflected waves from a target object exceed a Doppler division range of $\pm 1/(4Tr)$ in a case where the assumed Doppler frequencies are in the range of $-1/(2Tr)\leq fd<1/(2Tr)$, and thus, it is expected to detect by a certain means which of two detected Doppler frequency peaks each of a plurality of transmission antennas (for example, Tx #1 and Tx #2) corresponds to.

As described above, the method disclosed in NPL 2 is a method of determining a transmission antenna so as to retain the continuity of phase changes between virtual reception antennas depending on a target object direction. For example, a case where two transmission antennas and four reception antennas are arranged and eight virtual reception antennas are arranged linearly at equal intervals d will be described. Here, the received phases of reception signals from the virtual antennas with respect to angle of arrival $\theta$ have a relationship in which the reception signal in $n_{va}$-th virtual reception antenna $\#n_{va}$ when virtual reception antenna #1 (for example, the virtual reception antenna at one end) is used as a reference is given by $(n_{va}-1)\times\omega$, where $\omega=2\pi d\times\sin\theta/\lambda$. Here, $\lambda$ represents the wavelength of a radar transmission wave. Here, $n_{va}=1, \ldots, 8$.

For example, in a case where two Doppler frequency peaks (fd1 and fd2) are detected in the range of $-1/(2Tr)\leq fd<1/(2Tr)$ on a Doppler frequency axis at distance Bin corresponding to a distance at which a target object is present, there are two cases: a case where transmission antennas corresponding to (fd1 and fd2) are (Tx #1 and Tx #2) and a case where transmission antennas corresponding to (fd1 and fd2) are (Tx #2 and Tx #1). The radar apparatus selects, for example, between the two cases, a case where a phase change between the virtual reception antennas changes linearly with an inclination depending on a target object direction.

Use of such transmission antenna discrimination enables multiplexed-signal demultiplexing of a DDM transmission signal, makes it possible to detect the Doppler frequency of a reflected wave from a target object in the range of $-1/(2Tr)\leq fd<1/(2Tr)$, and makes it possible to enlarge a Doppler detection range. Further, in the transmission antenna determination as such, multiplexed-signal demultiplexing of a DDM transmission signal and direction estimation for a target object are performed simultaneously.

The method disclosed in NPL 2 is also applicable to a case where existing (for example, PTL 1) DDM transmission is used. For example, the method disclosed in NPL 2 is also applicable to DDM transmission in which a two-valued phase shifter is used in the case of two transmission antennas. For example, a detectable Doppler frequency range can be enlarged by using the method disclosed in NPL 2 without increasing the multi-valued number of a phase shifter. Further, the method disclosed in NPL 2 is capable of suppressing an increase in the multi-valued number of a phase shifter, and therefore has an effect of suppressing an increase in the cost of a radar.

Incidentally, a path difference between reflected waves of signals (radar transmission waves) transmitted from a plurality of transmission antennas, respectively, may be an integer multiple of the wavelength of the radar transmission waves depending on a target object direction. For example, the received phases of reflected waves corresponding to signals transmitted from a plurality of transmission antennas, respectively, are equal in a case where target object direction $\theta$ is $(2\pi Dt \sin \theta)/\lambda = 2n\pi$. Here, Dt represents the transmission antenna interval, n represents an integer value, and $\lambda$ represents the wavelength of a radar transmission wave.

When the technique disclosed in NPL 2 is applied to such a case, the received phases of reflected waves corresponding to signals transmitted from a plurality of transmission antennas may have an in-phase relationship and transmission antenna determination in the radar apparatus may become difficult.

For example, a case where two transmission antennas (Tx #1 and Tx #2) are arranged at wavelength intervals of Dt=0.5 in a first direction (the lateral direction in FIG. 1) and three reception antennas (Rx #1, Rx #2, and Rx #3) are arranged at wavelength intervals of Dr=1 in a direction coincident with the first direction as illustrated in FIG. 1 will be described. For example, in a case where a target object is present in frontal direction $\theta=0°$ (in the case of $(2\pi Dt \sin \theta)/\lambda=0$) in FIG. 1, the received phases of reflected waves corresponding to signals transmitted from a plurality of the different transmission antennas are equal or in phase, and thus, it is difficult for the radar apparatus to perform transmission antenna determination. Here, it is configured such that $\theta$ is an angle that uses, as a reference, the vertical direction (broadside direction) with respect to the direction in which the plurality of transmission antennas is arranged, as illustrated in FIG. 1. For example, it is configured such that the vertical direction with respect to the direction in which the plurality of transmission antennas is arranged is $\theta=0°$.

In one non-limiting and exemplary embodiment of the present disclosure, a method of improving the accuracy of transmission antenna determination will be described.

Hereinafter, embodiments according to exemplary embodiments of the present disclosure will be described in detail with reference to the accompanying drawings. Note that, in the embodiments, the same constituent elements will be denoted with the same reference signs, and descriptions thereof will be omitted because of redundancy.

Hereinafter, a configuration of a radar apparatus in which a transmission branch simultaneously transmits different multiplexed transmission signals from a plurality of transmission antennas and a reception branch performs reception processing by demultiplexing each transmission signal (for example, a MIMO radar configuration) will be described.

Further, hereinafter, a configuration of a radar system (also referred to as chirp pulse transmission (fast chirp modulation), for example) using a frequency-modulated pulse wave such as a chirp pulse will be described as an example. The modulation scheme is, however, not limited to the frequency ECU modulation. For example, one exemplary embodiment of the present disclosure is also applicable to a radar system using a pulse compression radar that phase-modulates or amplitude-modulates a pulse train and transmits the pulse train.

Further, the radar apparatus performs, for example, DDM transmission. In addition, for example, in DDM transmission, the radar apparatus performs multiplexing transmission of signals, to which different phase rotations (for example, phase shifts) corresponding to different DS amounts for a Doppler multiplexing number are applied (hereinafter, each of the signals will be referred to as "Doppler-multiplexed (DDM) transmission signal" or "DDM signal"), by using a plurality of transmission antennas.

[Configuration of Radar Apparatus]

Figure 2:
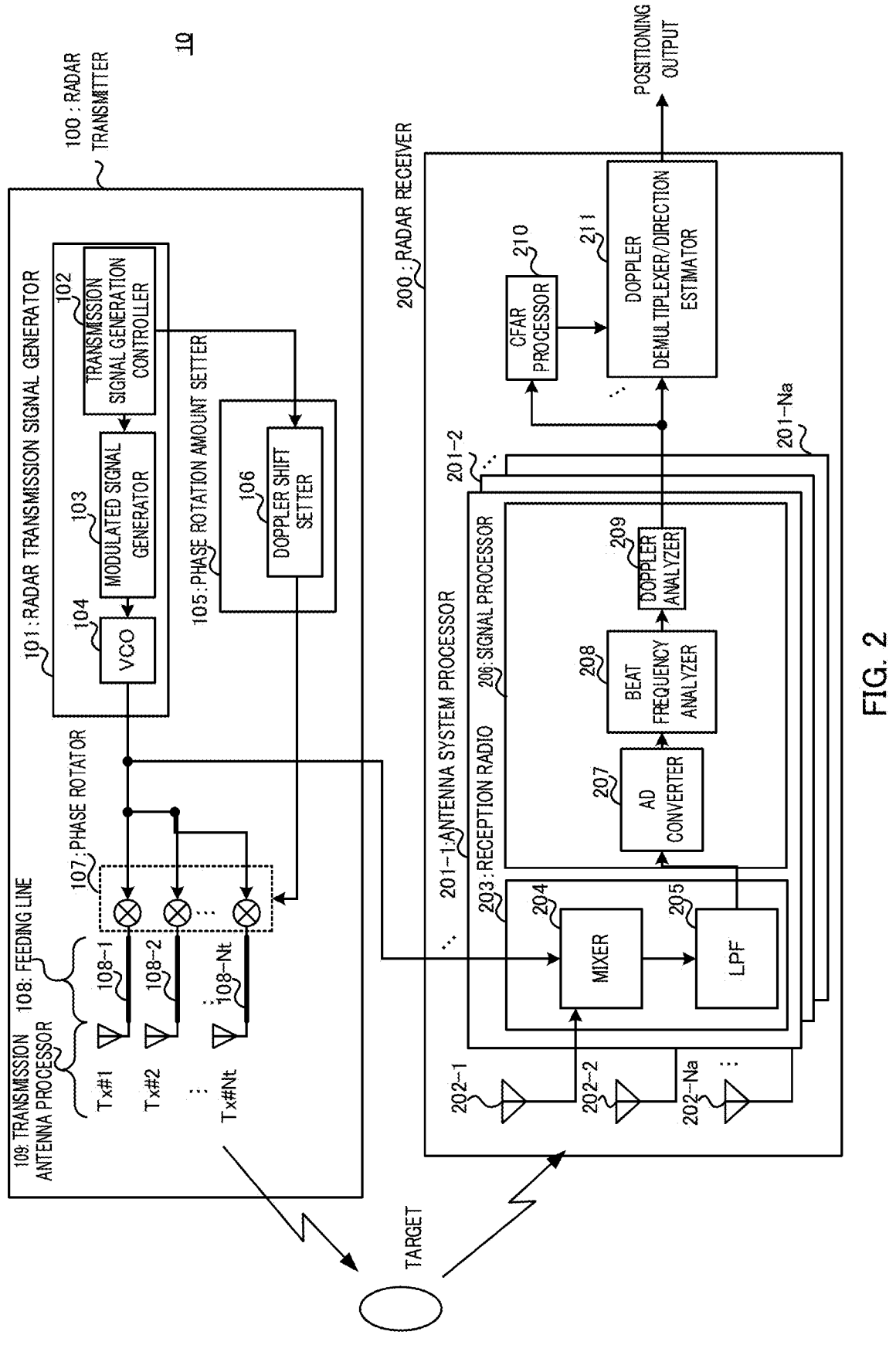
FIG. 2 is a block diagram illustrating a configuration example of the radar apparatus.

Radar apparatus 10 in FIG. 2 includes radar transmitter (transmission branch) 100 and radar receiver (reception branch) 200.

Radar transmitter 100 generates a radar signal (radar transmission signal) and transmits the radar transmission signal in a defined transmission period (hereinafter referred to as "radar transmission period") by using transmission antenna processor 109 (for example, a transmission array antenna) formed of a plurality of (for example, Nt) transmission antennas.

Radar receiver 200 receives a reflected wave signal, which is a radar transmission signal reflected by a target object (target), by using reception antenna processor 202 (for example, a reception array antenna) including a plurality of reception antennas 202-1 to 202-Na. Radar receiver 200 performs signal processing on a reflected wave signal received by each reception antenna to, for example, detect the presence or absence of a target object or estimate the distance of arrival, Doppler frequency (for example, relative velocity), and direction of arrival of the reflected wave signal, and outputs information on an estimated result (for example, positioning information).

Note that, radar apparatus 10 may be mounted in, for example, a moving body such as a vehicle, and the positioning output (information on an estimated result) of radar receiver 200 may be connected to, for example, a control apparatus ECU (electronic control unit) (not illustrated) such as an advanced driver assistance system (ADAS), which enhances crash safety, or an autonomous driving system, and may be utilized for vehicle driving control or alarm calling control.

Further, radar apparatus 10 may be attached to, for example, a structure (not illustrated) at a relative elevation, such as a roadside utility pole or traffic light. Further, radar apparatus 10 may be utilized as, for example, a sensor in an assistance system that enhances the safety of a traveling vehicle or a pedestrian or in a suspicious individual intrusion prevention system (not illustrated). Further, the positioning output of radar receiver 200 may be connected to, for example, a control apparatus (not illustrated) in an assistance system that enhances safety or in a suspicious individual intrusion prevention system, and may be utilized for alarm calling control or abnormality detection control. Note that, the uses of radar apparatus 10 are not limited thereto and may be utilized for other uses.

Further, the target object is an object to be detected by radar apparatus 10, and encompasses, for example, a vehicle (including a four-wheel vehicle and a two-wheel vehicle), a person, a block, a curb, or the like.

[Configuration of Radar Transmitter 100]

Radar transmitter 100 includes radar transmission signal generator 101, phase rotation amount setter 105, phase rotator 107, and transmission antenna processor 109.

Radar transmission signal generator 101 generates a radar transmission signal. Radar transmission signal generator 101 includes, for example, transmission signal generation controller 102, modulated signal generator 103, and voltage controlled oscillator (VCO) 104. Hereinafter, each component in radar transmission signal generator 101 will be described.

Transmission signal generation controller 102 sets, for example, a transmission signal generation timing for each radar transmission period, and outputs information on the set transmission signal generation timing to modulated signal generator 103 and phase rotation amount setter 105 (for example, Doppler shift setter 106). Here, the radar transmission period (also referred to as the transmission period) is Tr.

Modulated signal generator 103 periodically generates, for example, sawtooth-shaped modulated signals based on the information on the transmission signal generation timing for each Tr inputted from transmission signal generation controller 102.

Figure 3:
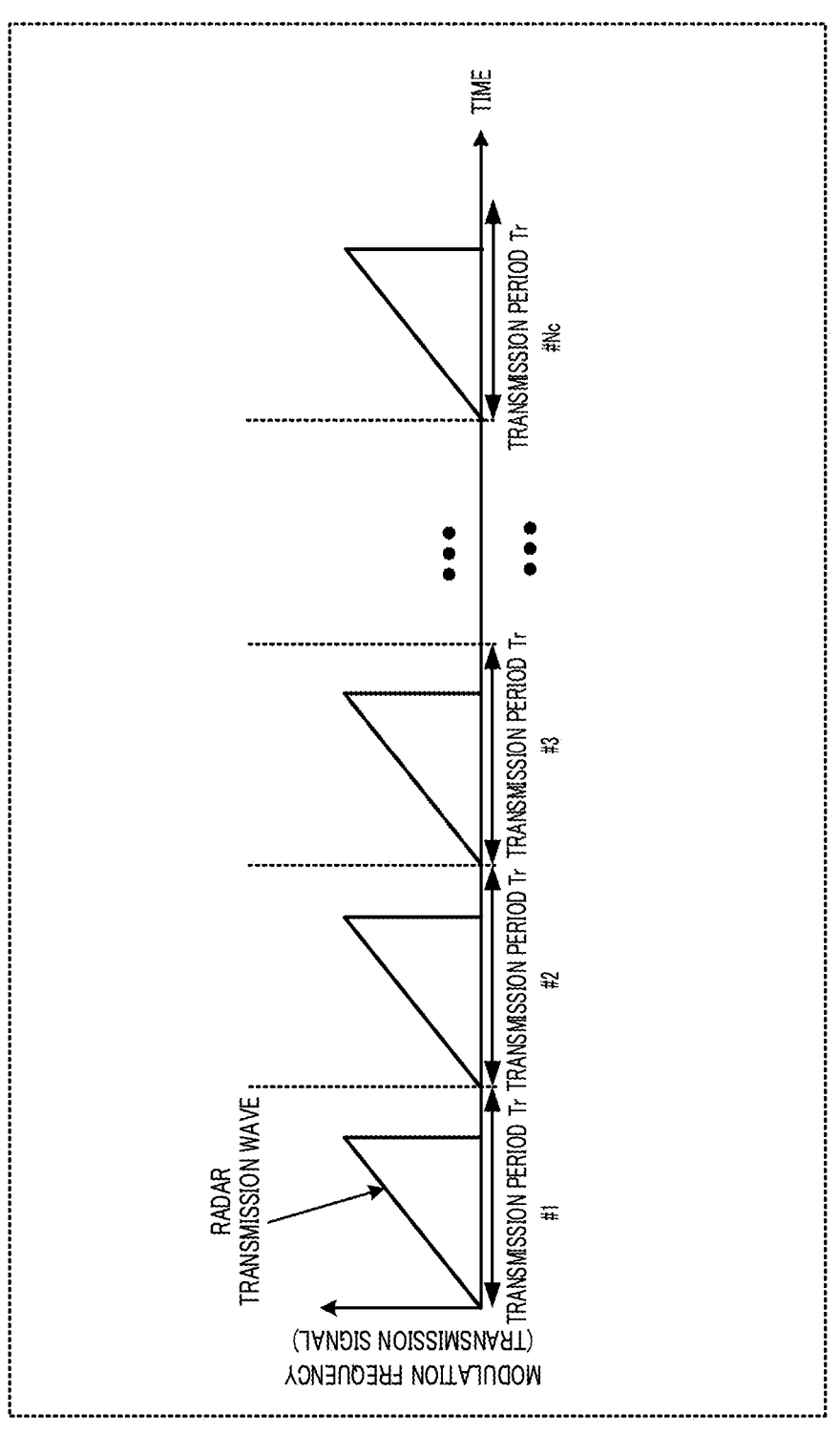
FIG. 3 illustrates an example of a transmission signal in a case where a chirp signal is used.

VCO 104 outputs, for example, as a radar transmission signal (radar transmission wave) as illustrated in FIG. 3, a frequency-modulated signal (hereinafter referred to as a frequency chirp signal or a chirp signal, for example) to phase rotator 107 and radar receiver 200 (mixer 204 to be described later) based on the modulated signal inputted from modulated signal generator 103.

Note that, in FIG. 3, the vertical axis represents the modulation frequency (transmission frequency) and the horizontal axis represents time.

Further, in the following description, modulated signal generator 103 generates modulated signals, for example, so as to transmit chirp signals Nc times for each Tr in one radar positioning. Further, VCO 104 outputs chirp signals Nc times for each Tr, for example, based on the operation of modulated signal generator 103. Further, each Tr in Nc times is represented by index m, where m=1, . . . , Nc.

Radar apparatus 10 is capable of detecting a temporal fluctuation in a target object position by performing radar positioning a plurality of times.

Phase rotation amount setter 105 sets, based on the information on the transmission signal generation timing for each Tr inputted from transmission signal generation controller 102, a phase rotation amount (for example, a phase rotation amount corresponding to DDM transmission) that is applied to a radar transmission signal for each Tr in phase rotator 107. Phase rotation amount setter 105 includes, for example, Doppler shift (DS) setter 106.

DS setter 106 sets, for example, based on the information on the transmission signal generation timing for each Tr, a phase rotation amount corresponding to a DS amount, which is applied to a radar transmission signal (for example, a chirp signal), and outputs information on the set phase rotation amount to phase rotator 107.

Phase rotator 107 applies the phase rotation amount inputted from DS setter 106 to a chirp signal inputted from VCO 104, and outputs a signal after phase rotation to transmission antenna processor 109. For example, phase rotator 107 includes a phase shifter and a phase modulator, and the like (not illustrated). An output signal of phase rotator 107 is amplified to a defined transmission power and is radiated from each transmission antenna into space via feeding lines 108 connected to the transmission antennas.

For example, radar transmission signals are transmitted with multiplexing transmission from a plurality of transmission antennas by application of phase rotation amounts corresponding to DS amounts.

Here, all feeding lines 108 connected to the transmission antennas (for example, Tx #1 to Tx #Nt) may not be lines having an equal length. For example, at least two feeding lines 108 may be lines having different line lengths.

Hereinafter, the feeding line lengths of feeding lines 108-1 to 108-Nt connected to Tx #1 to Tx #Nt will be expressed as $L_1$ to $L_{Nt}$.

Further, as phase differences of radar transmission signals caused by feeding line length differences among feeding lines 108, for example, phase differences for Tx #1 to Tx #Nt in a case where Tx #tref is used as a reference will be described as $\gamma(1, \text{tref})$ to $\gamma(Nt, \text{tref})$ (expressed in radian units). For example, in a case where Tx #1 is used as a reference, (tref=1), and the phase differences for Tx #1 to Tx #Nt can be expressed as $\gamma(1, 1)$ to $\gamma(Nt, 1)$. Note that, $\gamma(1, 1)=0$ [rad]. Note that, even when an integer multiple of $2\pi$ is added to one of the phase differences represented by $\gamma(1, \text{tref})$ to $\gamma(Nt, \text{tref})$, the values of the one phase difference before and after the addition of the integer multiple of $2\pi$ can be regarded as the same.

Note that, in a case where a radar transmission signal has a wide frequency band as in a chirp signal, a phase difference in the center frequency of the radar transmission signal may be used as a typical value. Note that, feeding line length setting will be described later.

Next, an example of a method of phase rotation amount setting in phase rotation amount setter 105 will be described.

DS setter 106 may set phase rotation amount $\varphi_{ndm}$ for applying DS amount $DOP_{ndm}$, where ndm=1 to $N_{DM}$. $N_{DM}$ is the number of different set DS amounts and will be referred to hereinafter as "Doppler multiplexing number (DDM number)".

In radar apparatus 10, DDM number $N_{DM}$ may be set to be the same number as number Nt of transmission antennas used for multiplexing transmission. Note that, hereinafter, a case where DDM number $N_{DM}$ is the same number as number Nt of transmission antennas used for multiplexing transmission ($N_{DM}$=Nt) will be described as an example, but DDM number $N_{DM}$ is not limited thereto. For example, DDM number $N_{DM}$ may be set to be a number smaller than Nt. Note that, it is configured such that DDM number $N_{DM}$ is equal to or greater than 2.

As $DOP_1$, $DOP_2$, . . . , $DOP_{N\_DM}$ ("N_DM" is also referred to as "$N_{DM}$"), for example, DS amounts at equal intervals may be set or DS amounts at unequal intervals may be set. Each of $DOP_1$, $DOP_2$, . . . , $DOP_{N\_DM}$ may be set to satisfy, for example, $0 \le DOP_1$, $DOP_2$, . . . , $DOP_{N\_DM} < 1/\text{Tr}$. Alternatively, $DOP_1$, $DOP_2$, . . . , $DOP_{N\_DM}$ may be set to satisfy, for example, equation 1.

(Equation 1)

$$\frac{-1}{2T_r} \le DOP_1, DOP_2, \ldots, DOP_{N\_DM} < \frac{1}{2T_r} \qquad [1]$$

Further, for example, minimum DS interval $\Delta f_{MinInterval}$ among $DOP_1$, $DOP_2$, . . . , $DOP_{N\_DM}$ may satisfy following equation 2. Note that, a DS interval (also described as a DDM interval or a Doppler interval) may be defined with the absolute value of a difference between arbitrary two DS amounts among $DOP_1$, $DOP_2$, . . . , $DOP_{N\_DM}$.

(Equation 2)

$$0 < \Delta f_{MinInterval} \leq \frac{1}{T_r N_{DM}} \qquad [2]$$

Further, phase rotation amount $\varphi_{ndm}$ for applying each of $DOP_1, DOP_2, \ldots, DOP_{N\_DM}$ may be assigned, for example, as in following equation 3.

$$\phi_{ndm} = 2\pi DOP_{ndm} T_r \qquad \text{(Equation 3)}$$

Note that, in a case where a DS amount as $\Delta f_{MinInterval}$ with equal intervals is set (hereinafter referred to as "equal-interval DS amount setting"), phase rotation amount $\varphi_{ndm}$ for applying $DOP_{ndm}$ is assigned as in, for example, following equation 4.

$$\phi_{ndm} = 2\pi(ndm - 1)\Delta f_{MinInterval} T_r \qquad \text{(Equation 4)}$$

Note that, as minimum DS interval $\Delta f_{MinInterval}$ is narrower, interference between DDM signals is likely to occur and the target detection accuracy is highly likely to decrease (for example, deteriorate), and thus, it is suitable to widen intervals among DS amounts further within a range satisfying the constraint condition of equation 2. For example, in a case where the equal sign is established in equation 2 (for example, $\Delta f_{MinInterval}=1/(T_r N_{DM})$), it is possible to widen intervals among DDM signals in the Doppler domain to the maximum (hereinafter referred to as "maximum equal-interval DS amount setting"). In this case, with respect to $DOP_1, DOP_2, \ldots, DOP_{N\_DM}$, a phase rotation range equal to or greater than 0 and less than $2\pi$ is equally divided into $N_{DM}$ pieces and different phase rotation amounts are assigned. For example, phase rotation amount $\varphi_{ndm}$ for applying $DOP_{ndm}$ is assigned as in following equation 5. Note that, hereinafter, the angle is indicated in radian units.

$$\phi_{ndm} = \frac{2\pi(ndm - 1)}{N_{DM}} \qquad \text{(Equation 5)}$$

Note that, the assignment of phase rotation amounts for applying $DOP_1, DOP_2, \ldots, DOP_{N\_DM}$ is not limited to such an assignment method. For example, phase rotation amounts $\varphi_1, \varphi_2, \ldots, \varphi_{N\_DM}$ may be randomly assigned for $DOP_1, DOP_2, \ldots, DOP_{N\_DM}$, where "N_DM" corresponds to $N_{DM}$, by using a phase-rotation-amount assignment table.

Further, in the equal-interval DS amount setting, the phase rotation amount setting as in following equation 6 may be used by setting $\Delta f_{MinInterval}=1/(T_r(N_{DM}+N_{int}))$ in equation 4, where $N_{int}$ takes an integer value. Note that, in this case, DS amounts at unequal intervals are set (hereinafter referred to as "unequal-interval DS amount setting"), and a multi-valued phase shifter of a multi-valued number more than number Nt of transmission antennas is used. For example, in the case of two transmission antennas and $N_{int}=1$, any two of phase rotation amounts of three values of 0, $\pi/3$, and $\frac{2}{3}\pi$ are used for phase rotation amount $\varphi_{ndm}$ for applying $DOP_{ndm}$. In comparison with the equal-interval DS amount setting, the unequal-interval DS amount setting narrows phase rotation intervals by the phase shifter (increases the phase multi-valued number). The unequal-interval DS amount setting is required to increase the accuracy of the phase rotation of the phase shifter and the circuitry configuration of the phase shifter is likely to be complicated.

$$\phi_{ndm} = \frac{2\pi(ndm - 1)}{N_{DM} + N_{int}} \qquad \text{(Equation 6)}$$

In m-th Tr, DS setter 106 sets phase shift (PS) amount $\psi_{ndm}(m)$ given by following equation 7 to phase rotation amount $\varphi_{ndm}$ that applies ndm-th DS amount $DOP_{ndm}$, and outputs PS amount $\psi_{ndm}(m)$ to phase rotator 107, where m=1 to Nc, and ndm=1 to $N_{DM}$.

$$\psi_{ndm}(m) = (m - 1) \times \phi_{ndm} \qquad \text{(Equation 7)}$$

A method of phase rotation amount setting in phase rotation amount setter 105 has been described above.

In FIG. 2, the outputs of Nt phase rotators 107 (referred to as, for example, Doppler-multiplexed signals (DDM signals)) are amplified to defined transmission power and are then radiated from the Nt transmission antennas in transmission antenna processor 109, respectively, into space via feeding lines 108 connected to the transmission antennas.

For example, in the case of Nt=2, phase rotator #1 outputs signal $cp(t)exp[j(m-1)\times\varphi_1]$ in which phase rotation amount $(m-1)\times\varphi_1$ is applied, for each m-th transmission period, to chirp signal cp(t) generated by radar transmission signal generator 101 for each transmission period. Further, the output of phase rotator #1 is outputted from Tx #1. Here, cp(t) represents a chirp signal for each transmission period. In the same manner, phase rotator #2 outputs signal cp(t)exp $[j(m-1)\times\varphi_2]$ in which phase rotation amount $(m-1)\times\varphi_2$ is applied, for each m-th transmission period, to chirp signal cp(t) generated by radar transmission signal generator 101 for each transmission period. The output of phase rotator #2 is outputted from Tx #2. Here, j is an imaginary unit.

[Configuration of Radar Receiver 200]

In FIG. 2, radar receiver 200 includes reception antenna processor 202 including Na reception antennas Rx #1 to Rx #Na. Further, radar receiver 200 includes Na antenna system processors 201-1 to 201-Na, constant erroneous alarms rate (CFAR) processor 210, and Doppler multiplexing (DDM) demultiplexer/direction estimator 211. Note that, Na antenna system processors 201-1 to 201-Na, CFAR processor 210, and Doppler multiplexing (DDM) demultiplexer/direction estimator 211 may be collectively referred to as reception circuitry. Note that, the reception circuitry uses a reflected wave signal, which is a transmission signal reflected by a target object (target), to perform direction estimation for the target.

Reception antennas Rx #1 to Rx #Na in reception antenna processor 202 receive reflected wave signals that are radar transmission signals reflected by a target object (target), and output, as reception signals, the received reflected wave signals to corresponding antenna system processors 201.

Each antenna system processor 201 includes reception radio 203 and signal processor 206.

Signals received by Na reception antennas Rx #1 to Rx #Na are outputted to Na reception radios 203, respectively. Further, output signals from Na reception radios 203 are outputted to Na signal processors 206, respectively.

Reception radio 203 includes mixer 204 and low pass filter (LPF) 205. Mixer 204 mixes a received reflected wave signal and a chirp signal that is a transmission signal inputted from radar transmission signal generator 101. Reception radio 203, for example, passes the output of mixer 204 through LPF 205. Thus, a beat signal having a frequency according to a delay time for a reflected wave signal is outputted. For example, the difference frequency between the frequency of a transmission chirp signal (transmission frequency-modulated wave), which is a transmission signal (radar transmission wave), and the frequency of a reception chirp signal (reception frequency-modulated wave), which is a reception signal (radar reflected wave), is obtained as the beat frequency.

Signal processor 206 of each antenna system processor 201-$z$ (where $z$=any one of 1 to Na) includes AD converter 207, beat frequency analyzer 208, and Doppler analyzer 209.

In signal processor 206, AD converter 207 converts a signal (for example, a beat signal) outputted from LPF 205 into discretely sampled data.

Beat frequency analyzer 208 performs frequency analysis processing (for example, FFT processing) on $N_{data}$ pieces of discretely sampled data obtained in a defined time range (range gate) for each Tr. Thus, signal processor 206 outputs a frequency spectrum in which a peak appears in a beat frequency according to a delay time for a reflected wave signal (radar reflected wave).

Here, a beat frequency response outputted from beat frequency analyzer 208 in $z$-th signal processor 206, which is obtained through the m-th chirp pulse transmission, is represented by $RFT_z(f_b, m)$, where $f_b$ represents the beat frequency index and corresponds to the index (bin number) of FFT. For example, $f_b$=0, . . . , $(N_{data}/2)$−1, $z$=1 to Na, and m=1 to $N_C$. A beat frequency in which a delay time for a reflected wave signal is smaller (for example, the distance to a target object is closer) as $f_b$ is smaller is indicated.

Further, beat frequency index $f_b$ can be converted into distance information $R(f_b)$ by using following equation 8. Accordingly, hereinafter, beat frequency index $f_b$ will be referred to as "distance index $f_b$".

$$R(f_b) = \frac{c_0}{2B_w} f_b \qquad \text{(Equation 8)}$$

Here, $B_w$ represents the frequency-modulated bandwidth within a range gate in a chirp signal, and $C_0$ represents the velocity of light. Further, in equation 8, $C_0/(2B_w)$ represents the distance resolution.

Beat frequency response $RFT_z(f_b, m)$ outputted from beat frequency analyzer 208 is inputted to Doppler analyzer 209 for each Tr. For this reason, Doppler analyzer 209 performs Doppler analysis for each $f_b$ by using data for each Nc transmission periods (for example, beat frequency response $RFT_z(f_b, m)$ inputted from beat frequency analyzer 208).

For example, in a case where Nc is the value of a power of two, FFT processing can be applied in Doppler analysis. In this case, the FFT size is Nc, and the maximum Doppler frequency which is derived from the sampling theorem and at which no aliasing occurs is ±1/(2Tr). Further, the Doppler frequency interval of Doppler frequency index (hereinafter referred to as DF Index) $f_s$ is 1/(Nc×Tr), and the range of DF Index $f_s$ is $f_s$=−Nc/2, . . . , 0, . . . , Nc/2−1.

Hereinafter, a case where Nc is the value of a power of two will be described as an example. Note that, in a case where Nc is not a power of two, inclusion of zero-padded data makes it possible to perform FFT processing with power-of-two data sizes (FFT sizes), for example.

For example, output $VFT_z(f_b, f_s)$ of Doppler analyzer 209 in z-th signal processor 206 is indicated by following equation 9. Note that, j is an imaginary unit, and z=1 to Na.

$$VFT_z(f_b, f_s) = \sum_{s=0}^{N_c-1} RFT_z(f_b, s)\exp\left(-\frac{j2\pi sf_s}{N_c}\right) \qquad \text{(Equation 9)}$$

The processing in each component of signal processor 206 has been described above.

[Operation Example of CFAR Processor 210]

In FIG. 2, CFAR processor 210 performs CFAR processing (for example, adaptive threshold determination) by using the outputs of Doppler analyzers 209 in first to Na-th signal processors 206 and extracts distance indices (hereinafter, the distance index will be expressed as $f_{b\_cf}$) and DF indices (hereinafter, the DF index will be expressed as $f_{s\_cf}$) that give peak signals. For example, CFAR processor 210 performs power addition of outputs $VFT_z(f_b, f_s)$ of Doppler analyzers 209 in first to Na-th signal processors 206 and performs two-dimensional CFAR processing in two dimensions formed by a distance axis and a Doppler frequency axis (corresponding to the relative velocity) or CFAR processing using one-dimensional CFAR processing in combination (for example, the processing disclosed in NPL 3 may be applied).

In a case where, for example, equation 5 is used as phase rotation amount $\varphi_{ndm}$ for applying $DOP_{ndm}$, each interval between DS amounts in the Doppler frequency domain in the output of Doppler analyzer 209 is an equal interval and, when interval $\Delta FD$ between the DS amounts is indicated with the interval between DF indices, $\Delta FD=Nc/N_{DM}$. Accordingly, in the output of Doppler analyzer 209, peaks are detected at intervals $\Delta FD$ for each DDM signal in the Doppler frequency domain.

Accordingly, CFAR processor 210 may divide each output of Doppler analyzers 209 in the range of $\Delta FD$ and perform CFAR processing (referred to as, for example, "Doppler domain compression CFAR processing" and described as DC-CFAR) after, as given by following equation 10, performing power addition (referred to as, for example, "Doppler domain compression") of peak positions in signals subjected to DDM for the divided ranges. Here, $f_{sc}$=−$\Delta FD/2$, . . . , $(\Delta FD/2)$−1. For example, in the case of $\Delta FD=Nc/N_{DM}$, $f_{sc}$=−$Nc/(2N_{DM})$, . . . , $(Nc/(2N_{DM}))$−1. Note that, DC-CFAR is described in, for example, PTL 3, and a detailed description thereof will be omitted.

$$\text{(Equation 10)}$$
$$PowerFT(f_b, f_{sc}) = \sum_{ndm=1}^{N_{DM}} \sum_{z=1}^{N_a} |VFT_z(f_b, f_{sc} + (ndm-1) \times \Delta FD)|^2$$

Note that, in a case where DF index $f_{sc}$+(ndm−1)×$\Delta FD$ is equal to or greater than Nc/2 in equation 10, an output with an aliased Doppler frequency is performed, and thus, CFAR processor 210 outputs a DF index of ($f_{sc}$+(ndm−1)×$\Delta FD$)−Nc. In the same manner, in a case where DF index $f_{sc}$+(ndm−1)×$\Delta FD$ is equal to or less than −Nc/2−1, an output with an aliased Doppler frequency is performed, and thus, CFAR processor 210 outputs a DF index of ($f_{sc}$+(ndm−1)×$\Delta FD$)+Nc.

CFAR processor 210 using DC-CFAR, for example, adaptively sets a threshold, and outputs $f_{b\_cf}$ and $f_{sc\_cf}$, which provide received power greater than the threshold, received power information PowerFT($f_{b\_cf}$, $f_{sc\_cf}$+(ndm−1)×$\Delta FD$) for DF indices ($f_{sc\_cf}$+(ndm−1)×ΔFD) of $N_{DM}$ DDM signals, and outputs $VFT_z(f_{b\_cf}, f_{sc\_cf}$+(ndm−1)×ΔFD) of Doppler analyzers 209, where ndm=1, . . . , $N_{DM}$, to DDM demultiplexer/direction estimator 211.

[Operation Example of Doppler Multiplexing (DDM) Demultiplexer/Direction Estimator 211]

Next, an operation example of DDM demultiplexer/direction estimator 211 illustrated in FIG. 2 will be described. Note that, hereinafter, an example of processing by DDM demultiplexer/direction estimator 211 in a case where CFAR processor 210 uses DC-CFAR will be described.

DDM demultiplexer/direction estimator 211 performs DDM demultiplexing processing and direction estimation processing on $N_{DM}$ (=Nt) DDM signals.

For example, DDM demultiplexer/direction estimator 211 uses $f_{b\_cf}$ and $f_{sc\_cf}$, the received power information for DF indices of $N_{DM}$ DDM signals, and the outputs of Doppler analyzers 209 in first to Na-th signal processors 206, which are inputted from CFAR processor 210, to demultiplex Nt signals transmitted with DDM transmission, and performs transmission antenna discrimination (for example, determination or identification) together with direction estimation processing.

Further, DDM demultiplexer/direction estimator 211 outputs Doppler frequencies (for example, Doppler velocities or relative velocities) and results of the direction estimation processing based on a result of the transmission antenna discrimination, for example.

Figure 4:
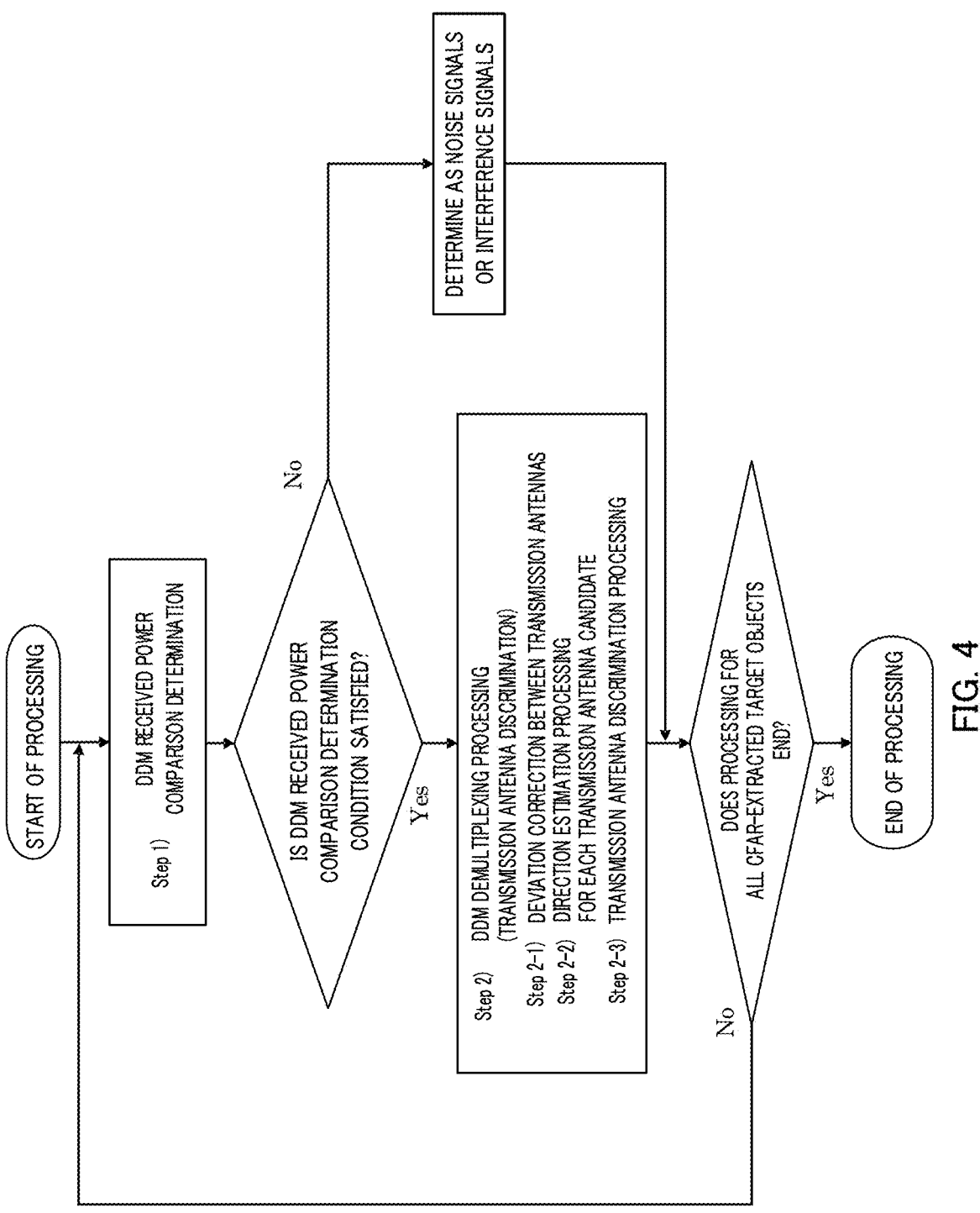
FIG. 4 is a flowchart illustrating an operation example of demultiplexing of a Doppler-multiplexed signal and direction estimation.

FIG. 4 is a flowchart illustrating an operation example in DDM demultiplexer/direction estimator 211.

<Step 1: Received Power Comparison Among DDM Signals (DDM Received Power Comparison Determination)>

DDM demultiplexer/direction estimator 211 determines whether $N_{DM}$ DF indices ($f_{sc\_cf}$+(ndm−1)×ΔFD) in $f_{b\_cf}$ inputted from CFAR processor 210 include $N_{DM}$ DDM signals.

For example, DDM demultiplexer/direction estimator 211 compares received powers (PowerFT ($f_{b\_cf}, f_{sc\_cf}$+(ndm−1)× ΔFD)) in DF indices ($f_{sc\_cf}$+(ndm−1)×ΔFD) and determines whether a received power difference between the DF indices is equal to or greater than a predetermined level (where ndm=an integer of 1 to $N_{DM}$). For example, DDM demultiplexer/direction estimator 211 determines whether a received power difference between $N_{DM}$ DF indices is equal to or less than a threshold or whether a reception level ratio in $N_{DM}$ DF indices is equal to or less than a threshold (hereinafter referred to as "DDM received power comparison determination").

In a case where the determination condition of the DDM received power comparison determination is satisfied, DDM demultiplexer/direction estimator 211 determines that outputs $VFT_z(f_{b\_cf}, f_{sc\_cf}$+(ndm−1)×ΔFD) of Doppler analyzers 209 in $f_{b\_cf}$ include $N_{DM}$ DDM signals, and performs the processing in Step 2 to be described later.

In a case where the determination condition of the DDM received power comparison determination is not satisfied, on the other hand, DDM demultiplexer/direction estimator 211 determines that outputs of Doppler analyzers 209 in $f_{b\_cf}$ do not include any DDM signal and are noise signals or interference signals, and does not perform the processing in Step 2 to be described later.

<Step 2: DDM Demultiplexing Processing (Transmission Antenna Discrimination)>

DDM demultiplexer/direction estimator 211 uses outputs $VFT_z(f_{b\_cf}, f_{sc\_cf}$+(ndm−1)×ΔFD) of Doppler analyzers 209 in $f_{b\_cf}$ to discriminate (or determine or identify) which transmission antennas among Nt transmission antennas correspond to $N_{DM}$ DDM signals as reception signals (hereinafter referred to as "transmission antenna discrimination").

Hereinafter, an example of transmission antenna discrimination processing (hereinafter also referred to as TxSel) will be described.

Note that, hereinafter, output $VFT_z(f_{b\_cf}, f_{sc\_cf}$+(ndm−1)× ΔFD) of Doppler analyzer 209 in z-th signal processor 206 in $f_{b\_cf}$ determined as including $N_{DM}$ DDM signals will be referred to as "$VFT_z(f_{b\_cf}$, fddm(ndm))", where fddm(ndm)=$f_{sc\_cf}$+(ndm−1)×ΔFD.

TxSel is processing of associating $N_{DM}$ (=Nt) outputs $VFT_z(f_{b\_cf}$, fddm(ndm)) of Doppler analyzers 209 in $f_{b\_cf}$, where ndm=1 to $N_{DM}$, with Tx #1, . . . , Tx #Nt.

Here, the order of $N_{DM}$ DDM signals on the Doppler frequency axis at the time of transmission does not change, but changes cyclically. For example, TxSel is processing of selecting one likelihood candidate from Nt candidates regarding the correspondence relationships between $N_{DM}$ (=Nt) outputs of Doppler analyzers 209 and Nt transmission antennas.

For example, a case where DDM signals with fd1<fd2<fd3 are assigned to Nt transmission antennas {Tx #1, Tx #2, Tx #3}, respectively, when $N_{DM}$=Nt=3 will be described. In this case, candidates for the outputs of Doppler analyzers 209 are three candidates: {$VFT_z(f_{b\_cf}$, fddm(1)), $VFT_z(f_{b\_cf}$, fddm(2)), $VFT_z(f_{b\_cf}$, fddm(3))}, {$VFT_z(f_{b\_cf}$, fddm(2)), $VFT_z(f_{b\_cf}$, fddm(3)), $VFT_z(f_{b\_cf}$, fddm(1))}, and {$VFT_z(f_{b\_cf}$, fddm(3)), $VFT_z(f_{b\_cf}$, fddm(1)), $VFT_z(f_{b\_cf}$, fddm(2))}. TxSel is processing of selecting one of the three candidates for the outputs of Doppler analyzers 209.

Hereinafter, among Nt candidates for the outputs of Doppler analyzers 209, a candidate in which output $VFT_z$ ($f_{b\_cf}$, fddm (1)) of Doppler analyzer 209 with ndm=1 is an output corresponding to Tx #1 will be expressed as "first transmission antenna candidate". In the same manner, a candidate in which output $VFT_z(f_{b\_cf}$, fddm (2)) of Doppler analyzer 209 with ndm=2 is an output corresponding to Tx #1 will be expressed as "second transmission antenna candidate". Hereinafter, a candidate in which output $VFT_z(f_{b\_cf}$, fddm(ndt)) of Doppler analyzer 209 with ndm=ndt is an output corresponding to Tx #1 will be expressed as "ndt-th transmission antenna candidate", where ndt=1 to Nt.

Further, an Nt-dimensional column vector including, as an element, the output of Doppler analyzer 209 for the ndt-th transmission antenna candidate, which is caused to correspond to Tx #1 to Tx #Nt, will be expressed as "ndt-th transmission antenna candidate vector DopTx(ndt, z)".

For example, a case where DDM signals with fd1<fd2<fd3 are assigned to Nt transmission antennas {Tx #1, Tx #2, Tx #3}, respectively, when $N_{DM}$=Nt=3 will be described. First to third transmission antenna candidate vectors DopTx(1, z), DopTx(2, z), DopTx(3, z) are expressed as follows, respectively. Here, superscript T represents vector transposition.

$$DopTx(1,z)=\{VFT_z(f_{b\_cf},\text{fddm}(1))\ VFT_z(f_{b\_cf},\text{fddm}(2))\ VFT_z(f_{b\_cf},\text{fddm}(3))\}^T$$

$$DopTx(2,z)=\{VFT_z(f_{b\_cf},\text{fddm}(2))\ VFT_z(f_{b\_cf},\text{fddm}(3))\ VFT_z(f_{b\_cf},\text{fddm}(1))\}^T$$

$$DopTx(3,z)=\{VFT_z(f_{b\_cf},\text{fddm}(3))\ VFT_z(f_{b\_cf},\text{fddm}(1))\ VFT_z(f_{b\_cf},\text{fddm}(2))\}T$$

<Step 2-1: Deviation Correction Between Transmission Antennas>

DDM demultiplexer/direction estimator 211 performs deviation correction between transmission antennas (hereinafter referred to as TxCal) on DopTx(ndt, z).

In TxCal, DDM demultiplexer/direction estimator 211 performs, for example, processing of multiplying correction coefficient Ct(ndt) for correcting phase deviation among Tx #1 to Tx #Nt. As correction coefficient Ct(ndt), for example, a value which can be calculated using a target object in a known direction and has determined in advance prior to radar ranging may be used. Note that, in the present embodiment, a predetermined phase difference (or phase deviation) between transmission antennas is set by using feeding lines 108 having feeding line lengths including different lengths. For this reason, correction coefficient Ct(ndt) is expressed as in following equation 11, for example, in the case of a phase deviation using Tx #1 as a reference (tref=1). Here, correction coefficient Ct for Tx #1 (1)=1.

$$Ct(ndt) = e^{-j\gamma(ndt, 1)} \qquad \text{(Equation 11)}$$

Further, TxCal processing is expressed as in following equation 12. Here, diag(Ct) is an Nt-dimensional diagonal matrix and the elements of the diagonal matrix are {Ct(1) Ct(2) . . . Ct(Nt)}. Further, DopTxcal(ndt, z) represents the ndt-th transmission antenna candidate vector after TxCal (hereinafter referred to as "the ndt-th transmission antenna candidate vector after deviation correction"), based on the output of Doppler analyzer 209 in z-th signal processor 206.

$$DopTxcal(ndt, z) = \text{diag}(Ct) \times DopTx(ndt, z) \qquad \text{(Equation 12)}$$

For example, in the case of $N_{DM}$=2, the first transmission antenna candidate vector is DopTx(1, z)=$[VFT_z(f_{b\_cf}, fddm(1))VFT_z(f_{b\_cf}, fddm(2))]^T$. In this case, by TxCal, DDM demultiplexer/direction estimator 211 outputs DopTxcal(1, z)=$[Ct(1)\times VFT_z(f_{b\_cf}, fddm(1))Ct(2)\times VFT_z(f_{b\_cf}, fddm(2))]^T$. In the same manner, the second transmission antenna candidate vector is DopTx(2, z)=$[VFT_z(f_{b\_cf}, fddm(2)), VFT_z(f_{b\_cf}, fddm(1))]^T$. In this case, by TxCal, DDM demultiplexer/direction estimator 211 outputs DopTxcal(2, z)={Ct (1)$\times VFT_z(f_{b\_cf}, fddm(2))Ct(2)\times VFT_z(f_{b\_cf}, fddm(1))\}^T$.

<Step 2-2: Direction Estimation Processing for Each Transmission Antenna Candidate>

DDM demultiplexer/direction estimator 211 performs, based on the ndt-th transmission antenna candidate vector after deviation correction, direction estimation processing for each transmission antenna candidate (hereinafter referred to as "the ndt-th candidate DOA processing").

In the ndt-th candidate DOA processing, for example, DDM demultiplexer/direction estimator 211 uses the ndt-th transmission antenna candidate vector after deviation correction to vary azimuth direction $\theta_u$ in direction estimation evaluation function $P_H(\theta_u, ndt)$ within a predetermined angle range to calculate a spatial profile. DDM demultiplexer/direction estimator 211 outputs maximum peak direction θmax(ndt) and maximum peak power value Pmax(ndt) in the calculated spatial profile.

Note that, there are various methods for direction estimation evaluation function value $P_H(\theta_u, ndt)$ depending on direction-of-arrival estimation algorithms. For example, an estimation method using an array antenna as disclosed in NPL 4 may be used.

For example, in a case where a beamformer method is used, direction estimation evaluation value $P_H(\theta_u, ndt)$ is expressed by following equation 13. Note that, in addition to the beamformer method, techniques such as Capon and MUSIC are also applicable in the same manner.

(Equation 13)

$$P_H(\theta_u, ndt) = \left| a^H(\theta_u) \left[ b^H(\theta_u) DopTxcal(ndt, 1) b^H(\theta_u) DopTxcal(ndt, 2) \ldots \right. \right.$$
$$\left. \left. b^H(\theta_u) DopTxcal(ndt, N_a) \right]^T \right|^2$$
$$= \left| \{a(\theta_u) \otimes b(\theta_u)\}^H AllDopTxcal(ndt) \right|^2$$

In equation 13, AllDopTxcal(ndt) represents a reception vector of a virtual reception antenna, is a vector in which the column vector elements of column vectors DopTxcal(ndt, 1) to DopTxcal(ndt, Na) are arranged in sequence in the column direction as in following equation 14, and represents a column vector formed of Nt×Na elements.

$$AllDopTxcal(ndt) = \begin{bmatrix} DopTxcal(ndt, 1) \\ DopTxcal(ndt, 2) \\ \vdots \\ DopTxcal(ndt, N_a) \end{bmatrix} \qquad \text{(Equation 14)}$$

Further, in equation 13, character subscript H indicates a Hermitian transpose operator with respect to the column vector, and character subscript T indicates a transpose operator with respect to the column vector. In addition, $$\otimes \qquad [15]$$

is an operator representing the Kronecker product.

Further, in equation 13, $a(\theta_u)$ represents a direction vector of a reception antenna (for example, a reception array antenna) with respect to an arrival wave of a radar transmission signal in azimuth direction $\theta_u$. In a case where the reception antennas are linearly arranged at equal intervals Dr, $a(\theta_u)$ is represented by a column vector including Na elements as in following equation 15.

$$a(\theta_u) = \begin{bmatrix} 1 \\ \exp(-j2\pi D_r \sin\theta_u / \lambda) \\ \vdots \\ \exp(-j2\pi(N_a - 1)D_r \sin\theta_u / \lambda) \end{bmatrix} \qquad \text{(Equation 15)}$$

In equation 15, $\lambda$ is the wavelength of a radar transmission signal (for example, a chirp signal) in the case of center frequency $f_c$, and $\lambda = C_0/f_c$.

Note that, in equation 13, $$a(\theta_u) \otimes b(\theta_u) \qquad [17]$$

represents a direction vector of a virtual reception antenna in the MIMO radar and is a column vector formed of Nt×Na elements. Hereinafter, a direction vector of a virtual reception antenna in the MIMO radar may also expressed as $$V_{ab} = a(\theta_u) \otimes b(\theta_u). \qquad [18]$$

Further, in equation 13, $b(\theta_u)$ represents a direction vector of a transmission antenna (for example, a transmission array antenna) with respect to an arrival wave of a radar transmission signal in azimuth direction $\theta_u$. In a case where the transmission antennas are linearly arranged at equal intervals Dt, $b(\theta_u)$ is represented by a column vector including Nt elements as in following equation 16.

$$b(\theta_u) = \begin{bmatrix} 1 \\ \exp(-j2\pi D_t \sin\theta_u / \lambda) \\ \vdots \\ \exp(-j2\pi(N_t - 1)D_t \sin\theta_u / \lambda) \end{bmatrix} \quad \text{(Equation 16)}$$

Further, azimuth direction $\theta_u$ is a vector changed within an azimuth range, in which direction-of-arrival estimation is performed, at predetermined azimuth intervals $\beta_1$.

<Step 2-3: Transmission Antenna Discrimination Processing (TxSel)>

DDM demultiplexer/direction estimator 211 performs TxSel based on maximum peak direction θmax(ndt) and maximum peak power value Pmax(ndt) which are obtained by performing direction estimation processing for each of the first to Nt transmission antenna candidates. Here, ndt=1 to Nt.

Here, in a result of direction estimation processing using the correct transmission antenna candidate, the correlation with direction vector $V_{ab}(\theta_u)$ of the virtual reception array at θmax(ndt) is the highest. Further, in TxSel, DDM demultiplexer/direction estimator 211 discriminates, as a transmission antenna, a transmission antenna candidate in which Pmax(ndt) obtained by direction estimation processing for each of the first to Nt transmission antenna candidates is the highest.

Hereinafter, the transmission antenna candidate in which Pmax(ndt) is the highest in ndt=1 to Nt will be expressed as "transmission antenna candidate nmax". Further, among other transmission antenna candidates except for transmission antenna candidate nmax, the transmission antenna candidate in which Pmax(ndt) is the highest will be expressed as "next transmission antenna candidate $n_{2nd}$". Note that, in a case where a plurality of transmission antenna candidates with the same Pmax(ndt) is included, one thereof may be expressed as transmission antenna candidate nmax and one of the remaining transmission antenna candidates may be expressed as next transmission antenna candidate $n_{2nd}$.

Further, DDM demultiplexer/direction estimator 211 may calculate the likelihood (reliability, accuracy) of TxSel in the below-described manner and, in a case where the calculated likelihood is equal to or less than a predetermined likelihood value (threshold), may perform processing in which the result of TxSel is rejected and a subsequent positioning output is not performed. Thus, an effect of reducing the probability of erroneous detections or erroneous alarms by radar apparatus 10 is obtained.

In the following description, an example in which a first likelihood and a second likelihood are used will be described as an example. Note that, DDM demultiplexer/direction estimator 211 may use one of the first likelihood and the second likelihood or both the first likelihood and the second likelihood. In a case where both the first likelihood and the second likelihood are used, the AND and OR conditions of the both may be used.

In a case where DDM demultiplexer/direction estimator 211 discriminates transmission antenna candidate nmax in TxSel, DDM demultiplexer/direction estimator 211 may use, for example, following equation 17 as the first likelihood in TxSel.

[20]

$$LH1(n\max, n_{2nd}) = \frac{P_{max}(n\max) - P_{max}(n_{2nd})}{P_{max}(n\max) + P_{max}(n_{2nd})} \quad \text{(Equation 17)}$$

In equation 17, first likelihood LH1(nmax, $n_{2nd}$) is calculated using Pmax(nmax) in transmission antenna candidate nmax and $P_{max}(n_{2nd})$ in next transmission antenna candidate $n_{2nd}$. Here, first likelihood LH1(nmax, $n_{2nd}$) is outputted in a range of 0≤LH1(nmax, $n_{2nd}$)≤1. As $P_{max}$(nmax) in transmission antenna candidate nmax is larger than $P_{max}(n_{2nd})$ in next transmission antenna candidate $n_{2nd}$, first likelihood LH1(nmax, $n_{2nd}$) is closer to 1. Further, as first likelihood LH1(nmax, $n_{2nd}$) is closer to 1, the likelihood (reliability) of transmission antenna determination can be regarded as being higher.

For example, in a case where first likelihood LH1(nmax, $n_{2nd}$) and a predetermined value (for example, approximately 0.3 to 0.5) are compared and first likelihood LH1 (nmax, $n_{2nd}$) is equal to or less than the predetermined value, DDM demultiplexer/direction estimator 211 may perform processing in which the result of TxSel is rejected and a subsequent positioning output is not performed. Thus, an effect of reducing the probability of erroneous detections or erroneous alarms by radar apparatus 10 is obtained.

For example, in a case where signals corresponding to both the correct transmission antenna candidate and an erroneous transmission antenna candidate are received as being in phase or substantially in phase, Pmax(nmax) in transmission antenna candidate nmax and $P_{max}(n_{2nd})$ in next transmission antenna candidate $n_{2nd}$ are calculated as equivalent values. For this reason, first likelihood LH1 (nmax, $n_{2nd}$) becomes 0 or a value close to 0, and thus, a low value is outputted as the likelihood (reliability) of TxSel. In a case where first likelihood LH1(nmax, $n_{2nd}$) is equal to or less than the predetermined value, DDM demultiplexer/direction estimator 211 rejects the result of TxSel and does not perform a subsequent positioning output, and thus, an effect of reducing the probability of erroneous detections or erroneous alarms by radar apparatus 10 is obtained.

In a case where DDM demultiplexer/direction estimator 211 discriminates transmission antenna candidate nmax in TxSel, DDM demultiplexer/direction estimator 211 may use, for example, following equation 18 as second likelihood LH2(nmax) in TxSel.

[21] (Equation 18)

$$LH2(n\max) = \frac{1}{V_{ab}^H(\theta_u)V_{ab}(\theta_u)} \times \frac{P_{max}(n\max)}{AllDopTxcal^H(ndt)AllDopTxcal(ndt)}$$

For example, in a case where Pmax(ndt) is calculated using equation 13, second likelihood LH2(nmax) is outputted in a range of 0≤LH2(nmax)≤1. For example, as the correlation with direction vector $V_{ab}(\theta_u)$ of the virtual reception array at $\theta_{max}$(ndt) is higher, second likelihood LH2(nmax) given by equation 18 is closer to 1. Further, as second likelihood LH2(nmax) is closer to 1, the likelihood (reliability) of transmission antenna determination can be regarded as being higher.

For example, in a case where second likelihood LH2 (nmax) and a predetermined value (for example, approximately 0.6 to 0.9) are compared and second likelihood LH2(nmax) is equal to or less than the predetermined value (is equal to or less than a predetermined likelihood value), DDM demultiplexer/direction estimator 211 may perform processing in which the result of TxSel is rejected and a subsequent positioning output is not performed. Thus, an effect of reducing the probability of erroneous detections or erroneous alarms by radar apparatus 10 is obtained.

For example, in a case where there are target objects in a plurality of different directions with the same distance Bin, reception signal components from a plurality of the target objects are mixedly present. For example, in a case where all the reception signal components from the plurality of target objects are at the same reception level, DDM demultiplexer/ direction estimator 211 may highly likely be incapable of performing TxSel correctly. In such a case, second likelihood LH2(nmax) is likely to be a value of approximately 0.5 or less, and a relatively low value is outputted as the likelihood (reliability) of TxSel. Further, for example, the more noise components are included in a reception signal from a target object, the more likely TxSel cannot be performed correctly. In such a case, second likelihood LH2(nmax) is likely to be a value of approximately 0.5 or less, and a relatively low value is outputted as the likelihood (reliability) of TxSel. Further, in a case where second likelihood LH2(nmax) is equal to or less than the predetermined value, DDM demultiplexer/direction estimator 211 rejects the result of TxSel and does not perform a subsequent positioning output, and thus, an effect of reducing the probability of erroneous detections or erroneous alarms by radar apparatus 10 is obtained.

Further, DDM demultiplexer/direction estimator 211 may output, as a positioning result, distance index information $f_{b\_cf}$ and $\theta_{max}$(nmax) and $P_{max}$(nmax) which are obtained by performing direction estimation processing for each nmax-th transmission antenna candidate.

Further, in TxSel, based on the difference between the DF index, which indicates the output of Doppler analyzer 209 corresponding to each of Tx #1 to Tx #Nt as indicated by nmax-th transmission antenna candidate vector DopTx(nmax, z) determined as a transmission antenna, and the DS amount for each of Tx #1 to Tx #Nt by DS setter 106 in radar transmitter 100, DDM demultiplexer/direction estimator 211 may detect the Doppler frequency of a target object in a range of $\pm 1/(2Tr)$ and output the detected Doppler frequency as a positioning result.

Further, DDM demultiplexer/direction estimator 211 may output distance index information $f_{b\_cf}$ (alternatively, for example, distance information using equation 8) as a positioning result.

In FIG. 4, DDM demultiplexer/direction estimator 211 performs the same operations as those in Steps 1 and 2 described above by using each $f_{b\_cf}$ and DF index $(f_{sc\_cf}+(ndm-1)\times\Delta FD)$ in a plurality of (for example, all) target objects extracted by CFAR processor 210.

DDM demultiplexing processing (transmission antenna discrimination) has been described above.

As described above, in the present embodiment, DDM demultiplexer/direction estimator 211 demultiplexes signals (DDM signals), which have been transmitted with multiplexing transmission, from reflected wave signals, and discriminates, based on a direction estimation result after correction of phase deviation between transmission antennas for the demultiplexed signals, which transmission antenna each of the demultiplexed signals corresponds to. Thus, radar apparatus 10 can accurately distinguish between the correct transmission antenna candidate and an erroneous transmission antenna candidate, and therefore the accuracy of the antennae discrimination can be improved.

[Setting Examples of Feeding Line 108]

Feeding line 108 having a line length satisfying one of the following conditions related to feeding line 108 (referred to as, for example, "feeding line conditions") and conditions related to transmission/reception antenna arrangements (for example, "transmission/reception antenna arrangement conditions") may be applied to radar apparatus 10 according to the present embodiment. Thus, radar apparatus 10 is capable of reducing errors in transmission antenna determination and errors in the detection of the Doppler frequency of a target object. Further, the detection performance in radar apparatus 10 can be improved by reducing errors in transmission antenna determination and errors in the detection of the Doppler frequency of a target object.

Hereinafter, the feeding line conditions and examples of effects obtained by satisfying the feeding line conditions will be described.

<Feeding Line Condition (1): in the Case of Two Transmission Antennas>

In radar apparatus 10, power is supplied by using feeding lines 108 having feeding line lengths such that a line length difference (also referred to as, for example, a feeding line difference or a feeding line length difference) between feeding lines 108 connected to two transmission antennas in transmission antenna processor 109, respectively, is a half wavelength of a radar transmission signal or an odd multiple of the half wavelength (one and a half wavelengths, two and a half wavelengths, and the like). For example, a phase deviation due to a line length difference between feeding lines 108 connected to two transmission antennas, respectively, is an odd multiple of $\pi/2$.

Thus, in radar apparatus 10, power is supplied by using feeding lines 108 having different feeding line lengths in which a phase deviation between transmission antennas is $\pi/2$ or an odd multiple of $\pi/2$.

<Feeding Line Condition (2): In a Case where at Least Three Transmission Antennas with Identical Arrangement Direction are Included>

In radar apparatus 10, power is supplied by using feeding lines 108 having feeding line lengths such that, with respect to a target object direction in which the received phases of signals transmitted from two transmission antennas among at least three transmission antennas in transmission antenna processor 109 are in phase, the received phase of one of the two transmission antennas and the received phase of the remaining transmission antenna are not in phase.

Note that, the phase deviation setting between transmission antennas described above may include an error of approximately $\pm\pi/10$, in which case a relatively high effect may also be achieved in the same manner.

For radar apparatus 10, for example, transmission antenna intervals and feeding line lengths $L_1$ to $L_Nt$ of feeding lines 108 connected to Tx #1 to Tx #Nt, respectively, are used as parameters and the parameters are set such that the path difference within the radar field of view is an integer multiple of the wavelength and does not involve an in-phase relationship.

For example, there is a method in which a phase deviation between transmission antennas is reduced as much as possible by using equal-length wiring as feeding lines and phase deviation correction between the transmission antennas is made unnecessary or subjected to fine-tuning or the like, whereas in the present embodiment, feeding lines 108 have different line lengths between transmission antennas.

Alternatively, there is a method in which radio waves as specific polarized waves are transmitted by supplying power with a specific phase difference between transmission antennas, in which case a radar apparatus outputs identical transmission signals from a plurality of transmission antennas. In the present embodiment, on the other hand, radar apparatus 10 performs DDM transmission with different Doppler frequencies and therefore does not perform transmission by using identical transmission signals.

Hereinafter, an example of feeding line condition (1) (in the case of two transmission antennas) will be described. [Example of Feeding Line Condition (1)]

For example, reception signal $R_{na,nt}(\theta)$ that is a reflected wave reflected by a target object in direction $\theta$ after transmission from nt-th Tx #nt and is received by, for example, na-th reception antenna Rx #na among reception antennas Rx #1 to Rx #Na is given as in following equation 19. Here, $A_{na,nt}(\theta)$ represents a real number amplitude response, and $\xi(nt)$ represents a phase rotation amount of a radar transmission signal occurring in feeding line 108 connected to nt-th Tx #nt. Further, $\rho_{na,nt}(\theta)$ represents a received phase due to a path difference between reflected waves from a target object in direction $\theta$. In $\rho_{na,nt}(\theta)$, a phase difference due to a feeding line difference is not included.

[22]

$$R_{na,nt}(\theta) = A_{na,nt}(\theta)e^{j\xi(nt)}e^{j\rho_{na,nt}(\theta)} \qquad \text{(Equation 19)}$$

Here, in the case of the correct transmission antenna candidate, a phase deviation due to a feeding line length is correctly corrected as in following equation 20 by multiplying reception signal $R_{na,nt}(\theta)$ by correction coefficient Ct(ndt) for correcting a phase deviation between transmission antennas by TxCal (for example, Step 2-1 in FIG. 4). Note that, given phase difference $\gamma(nt, 1)=\xi(nt)-\xi(1)$, $e^{i\xi(1)}$ remains as a common term regardless of transmission antennas in equation 20, but does not affect a direction estimation result since radar apparatus 10 performs direction estimation processing by using a phase difference, and a target object direction can be correctly detected based on phase difference $\rho_{na,nt}(\theta)$ depending on the target object direction.

[23]

$$R_{cal}(R_{na,nt}(\theta), nt) = Ct(nt)R_{na,nt}(\theta) = A_{na,nt}(\theta)e^{j\xi(1)}e^{j\rho_{na,nt}(\theta)} \quad \text{(Equation 20)}$$

For example, radar apparatus 10 may calculate target object direction $\theta$ as in following equation 21 based on a phase difference between a reception signal corresponding to a signal from Tx #1 and a reception signal corresponding to a signal from Tx #2, where the reception signals are received by the na-th reception antenna.

[24]

$$\angle\{R_{cal}(R_{na,2}(\theta), 2)R^*_{cal}(R_{na,1}(\theta), 1)\} = \qquad \text{(Equation 21)}$$

$$\rho_{na,2}(\theta) - \rho_{na,1}(\theta) = \frac{2\pi}{\lambda}D_t\sin\theta$$

$$\therefore \theta = \sin^{-1}\frac{\{\rho_{na,2}(\theta) - \rho_{na,1}(\theta)\}\lambda}{2\pi D_t}$$

Here, $D_t$ indicates the transmission antenna interval between Tx #1 and Tx #2. Further, $$\angle\{X\} \qquad\qquad [25]$$

represents an operator for outputting a phase in radian units with respect to complex number X. For example, in a case where complex number X is given as X=A×exp(j×θ) (j: imaginary unit, A: real number, and θ: phase [rad]), $$\angle\{X\} = \theta. \qquad\qquad [26]$$

In the case of an erroneous transmission antenna candidate, on the other hand, a phase deviation due to a feeding line length is not correctly corrected by TxCal (for example, Step 2-1 in FIG. 4). For example, in a case where a reception signal corresponding to a signal from Tx #1, where the reception signal is received by the na-th reception antenna, is erroneously discriminated (or regarded) as a reception signal from Tx #2 and a reception signal corresponding to a signal from Tx #2, where the reception signal is received by the na-th reception antenna, is erroneously discriminated as a reception signal from Tx #1, a phase deviation due to a feeding line length is not correctly corrected by TxCal (for example, Step 2-1 in FIG. 4) as in following equations 22 and 23.

[27]

$$R_{cal}(R_{na,1}(\theta), 2) = \qquad\qquad \text{(Equation 22)}$$

$$Ct(2)R_{na,1}(\theta) = A_{na,1}(\theta)e^{j(\xi_1-\xi_2)}e^{j\xi(1)}e^{j\rho_{na,1}(\theta)}$$

[28]

$$R_{cal}(R_{na,2}(\theta), 1) = \qquad\qquad \text{(Equation 23)}$$

$$Ct(1)R_{na,2}(\theta) = A_{na,2}(\theta)e^{j(\xi_2-\xi_1)}e^{j\xi(1)}e^{j\rho_{na,2}(\theta)}$$

In this case, the phase difference between reception signals after TxCal (for example, Step 2-1 in FIG. 4) is given by following equation 24.

[29]

$$\angle\{R_{cal}(R_{na,1}(\theta), 2)R^*_{cal}(R_{na,2}(\theta), 1)\} = \qquad \text{(Equation 24)}$$

$$-2(\xi_2 - \xi_1) - \{\rho_{na,2}(\theta) - \rho_{na,1}(\theta)\}$$

Note that, transmission antenna discrimination becomes difficult when both the case of the correct transmission antenna candidate and the case of an erroneous transmission antenna candidate involve being in phase. For example, in a case where the relationship of following equation 25 is satisfied, the case of the correct transmission antenna candidate and the case of an erroneous transmission antenna candidate involve being in phase in target object direction $\theta_c$, and transmission antenna discrimination becomes difficult.

[30]

$$\angle\{R_{cal}(R_{na,2}(\theta_c), 2)R^*_{cal}(R_{na,1}(\theta_c), 1)\} = \qquad \text{(Equation 25)}$$

$$\angle\{R_{cal}(R_{na,1}(\theta_c), 2)R^*_{cal}(R_{na,2}(\theta_c), 1)\}$$

$$\rho_{na,2}(\theta_c) - \rho_{na,1}(\theta_c) = -2(\xi_2 - \xi_1) - \{\rho_{na,2}(\theta_c) - \rho_{na,1}(\theta_c)\}$$

$$\rho_{na,2}(\theta_c) - \rho_{na,1}(\theta_c) = -(\xi_2 - \xi_1) \pm m_a\pi$$

$$\therefore \sin\theta_c = \frac{-(\xi_2 - \xi_1 \pm m_a\pi)\lambda}{2\pi D_t}$$

$$\therefore \theta_c = \sin^{-1}\frac{-(\xi_2 - \xi_1 \pm m_a\pi)\lambda}{2\pi D_t}$$

Here, $m_a$ is an integral value satisfying following equation 26.

[31]

$$\left| \frac{-(\xi_2 - \xi_1 \pm m_a \pi)\lambda}{2\pi D_t} \right| \le 1 \qquad \text{(Equation 26)}$$

Figure 5:
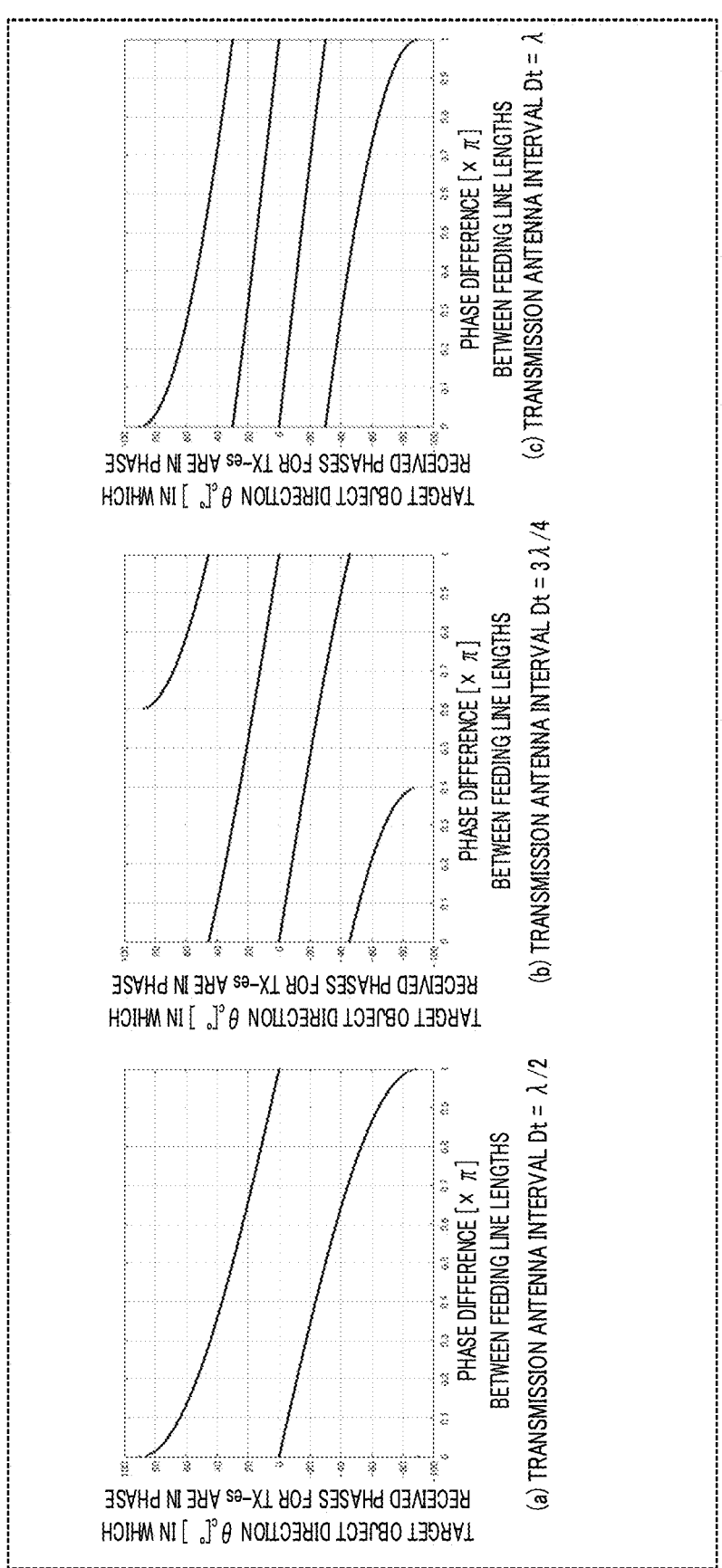
FIG. 5 illustrates examples of a relationship between a phase difference between feeding line lengths and a target object direction in which received phases in transmission antennas are in phase.

FIG. 5 is a diagram in which plotting is performed, based on the equations described above, with Nt=2, the phase difference $(\xi_2-\xi_1)$ between the feeding line length of feeding line 108 for Tx #1 and the feeding line length of feeding line 108 for Tx #2 as the horizontal axis, and target object direction $\theta_c$, in which the received phases of signals from Tx #1 and Tx #2 are in phase, as the vertical axis. In (a) of FIG. 5, an example in the case of Dt=λ/2 is illustrated, in (b) of FIG. 5, an example in the case of Dt=3λ/4 is illustrated, and in (c) of FIG. 5, an example in the case of Dt=λ is illustrated. Note that, a similar relationship is obtained even when an integer multiple of $2\pi$ is added to the horizontal axis in FIG. 5.

As illustrated in FIG. 5, it can be seen that a transmission antenna interval as narrow as Dt=λ/2 makes it possible to widen a field-of-view range that does not include target object direction $\theta_c$ in which the received phases corresponding to Tx #1 and Tx #2 are in phase.

For example, in the case of Dt=λ/2 illustrated in (a) of FIG. 5, when $\xi_2-\xi_1=0$ or $\pi$, the relationship becomes $\mu_2(\theta_c)-\rho_1(\theta_c)=0$, $\pi$, and the received phases are in phase, for example, when the angle of arrival of a target object is $\theta_c=0$, $\pm\pi/2$[rad] (=0, ±90[°]).

Further, for example, in the case of Dt=λ/2 illustrated in (a) of FIG. 5, when $\xi_2-\lambda_1=\pi/2$ (horizontal axis: 0.5), the relationship becomes $\rho_2(\theta_c)-\rho_1(\theta_c)=\pm\pi/2$, and the received phases are in phase, for example, when the angle of arrival of a target object is $\theta_c=+\pi/6$[rad](=±30[°]). Thus, for example, in the case of Dt=λ/2 illustrated in (a) of FIG. 5 and in a case where radar field of view $\theta_{FOV}$ is $-\pi/6 < \theta_{FOV} < \pi/6$, the received phases corresponding to Tx #1 and Tx #2 are not in phase within the radar field of view, and radar apparatus 10 can perform transmission antenna discrimination.

Figure 6:
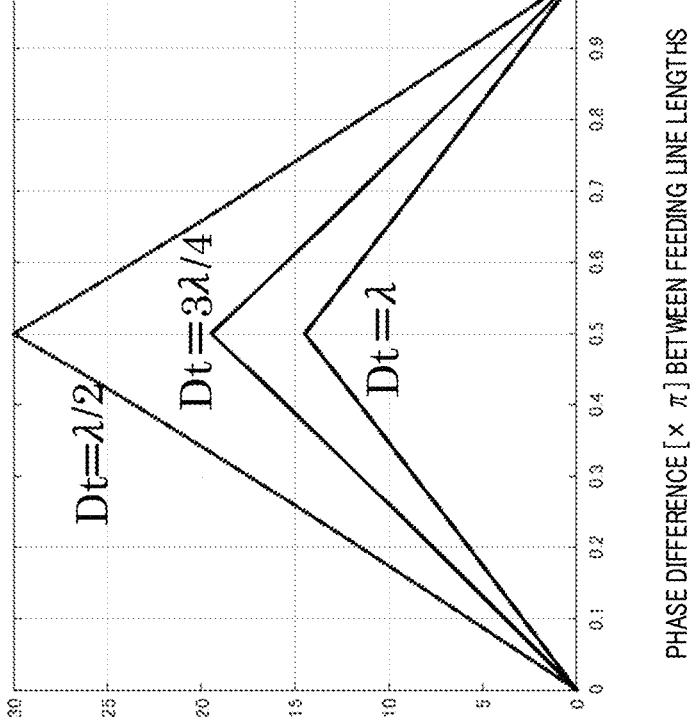
FIG. 6 illustrates an example of a relationship between a phase difference between feeding line lengths and a field of view.

FIG. 6 is a diagram in which plotting is performed with Nt=2, the phase difference $(\xi_2-\xi_1)$ between the feeding line length of feeding line 108 connected to Tx #1 and the feeding line length of feeding line 108 connected to Tx #2 as the horizontal axis, and a field of view, which does not include target object direction $\theta_c$ in which the received phases of signals from Tx #1 and Tx #2 are in phase and which can ensure both positive and negative angle regions around target object direction $\theta=0°$ to the maximum, as the vertical axis. Note that, a similar relationship is obtained even when an integer multiple of $2\pi$ is added to the horizontal axis in FIG. 6.

As an example, FIG. 6 illustrates plotting in the cases of Dt=λ/2, Dt=3λ/4, and Dt=a. As illustrated in FIG. 6, in a case where the phase difference between feeding lines 108 connected to Tx #1 and Tx #2, respectively, is $\pi/2$, the field of view which can ensure both positive and negative angle regions around target object direction $\theta=0°$ to the maximum becomes the largest. Note that, a relatively wide field of view can be ensured even when the phase difference between feeding lines 108 is approximately 0.4 to $0.6\pi$.

Further, as illustrated in FIG. 6, in a case where the phase difference between feeding lines 108 connected to Tx #1 and Tx #2, respectively, is $\pi/2$, the field of view that can be ensured in the case of Dt=λ/2 is in a range of ±30°, the field of view that can be ensured in the case of Dt=3λ/4 is in a range of ±19.5°, and the field of view that can be ensured in the case of Dt=λ is in a range of ±14.5°. Thus, when Dt is as narrow as Dt=λ/2, it is possible to widen a field-of-view range that does not include target object direction $\theta_c$ in which the received phases of signals from Tx #1 and Tx #2 are in phase.

An example of feeding line condition (1) has been described above.

[Arrangement Condition for Reception Antennas]

In the present embodiment, at least two reception antennas among Na reception antennas are arranged on a straight line in a direction in which transmission antennas are arranged (hereinafter referred to as the transmission antenna arrangement direction).

Figure 7:
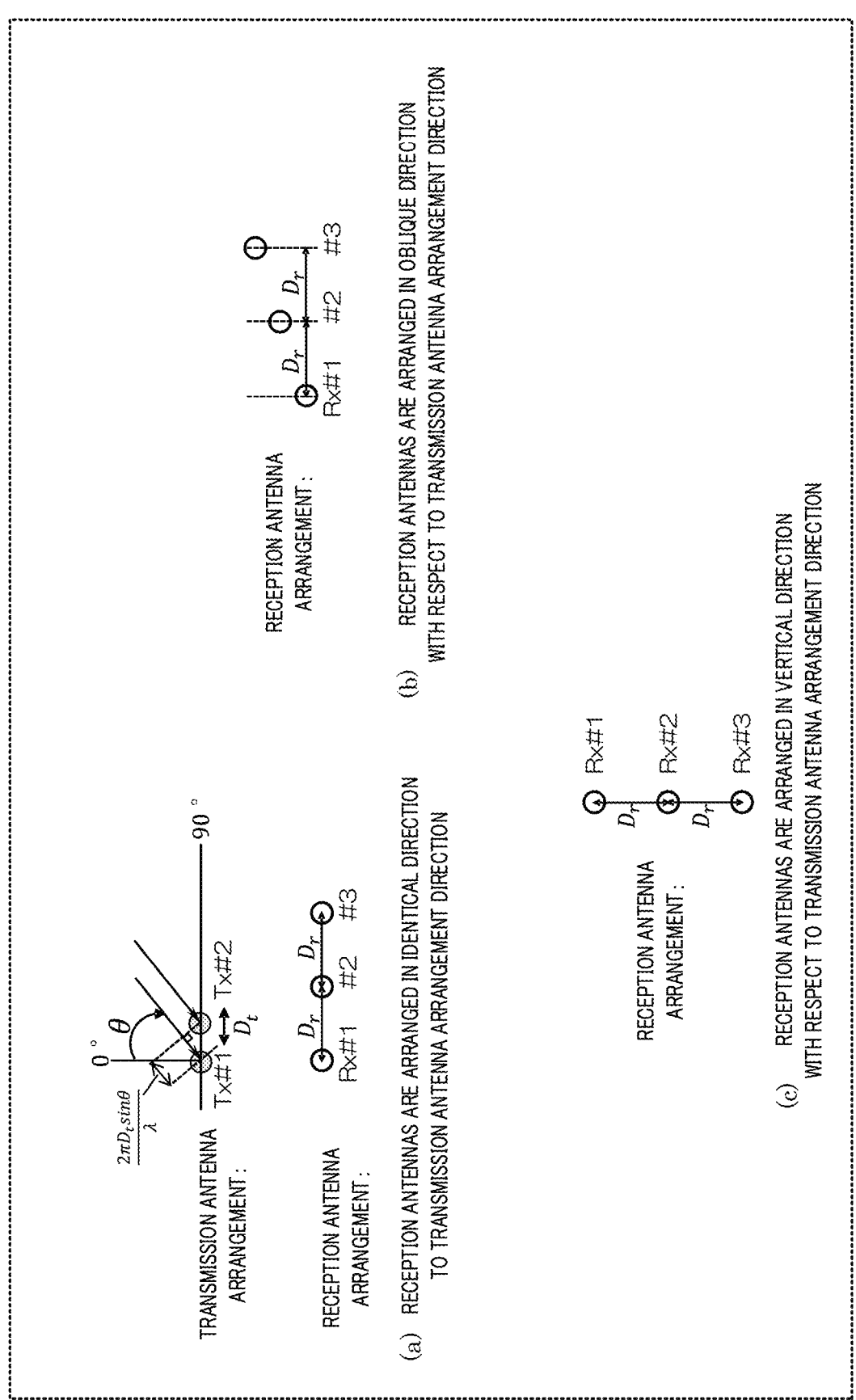
FIG. 7 illustrates an exemplary transmission antenna arrangement and exemplary reception antenna arrangements.

For example, as illustrated in (a) of FIG. 7, for Nt=2 transmission antennas, Na=3 reception antennas may be arranged, for example, at intervals Dr=2Dt in the transmission antenna arrangement direction (the lateral direction in FIG. 7). Given the arrangement illustrated in (a) of FIG. 7, in the transmission antenna arrangement direction, in addition to the arrangement positions of the transmission antennas, virtual reception antennas are arranged in positions different from the positions of the transmission antennas. Thus, radar apparatus 10 can detect received phases with respect to a plurality of transmission antennas by using a plurality of reception antennas in different positions in the transmission antenna arrangement direction, and is capable of TxSel using the direction estimation processing for each transmission antenna candidate (Step 2-2 in FIG. 4).

Note that, in the present embodiment, at least two reception antennas may be arranged in an oblique direction with respect to the transmission antenna arrangement direction. For example, as illustrated in (b) of FIG. 7, for two transmission antennas, three reception antennas may be arranged in an oblique direction with an angle smaller than 900 (for example, a direction orthogonal to the transmission antenna arrangement direction) with respect to the transmission antenna arrangement direction (the lateral direction in FIG. 7), at intervals Dr=2Dt in the transmission antenna arrangement direction. Given the arrangement illustrated in (b) of FIG. 7, in the transmission antenna arrangement direction, in addition to the arrangement positions of the transmission antennas, virtual reception antennas are arranged in positions different from the positions of the transmission antennas. Thus, radar apparatus 10 can detect received phases with respect to a plurality of transmission antennas by using a plurality of reception antennas in different positions in the transmission antenna arrangement direction, and is capable of transmission antenna discrimination processing (TxSel) using the direction estimation processing for each transmission antenna candidate (Step 2-2 in FIG. 4).

Further, in the present embodiment, when all reception antennas are arranged in a direction (the vertical direction in FIG. 7) orthogonal to the transmission antenna arrangement direction (the lateral direction in FIG. 7) as illustrated in (c) of FIG. 7, as many virtual reception antennas as transmission antennas may be arranged in the transmission antenna arrangement direction in the virtual reception antenna arrangement, and it may be difficult for radar apparatus 10 to detect whether a target object direction is correct. For example, reception antennas may be arranged in an arrangement direction different from the direction orthogonal to the transmission antenna arrangement direction as in (a) of FIG. 7 or (b) of FIG. 7. Reception antennas may be arranged in the transmission antenna arrangement direction (for example, the example in (a) of FIG. 7) or in an oblique direction (for example, the example in (b) of FIG. 7) different from a direction orthogonal to the transmission antenna arrangement direction. Thus, it is possible to obtain the effect of the present embodiment described above.

Next, an example of feeding line condition (2) (in the case of three or more transmission antennas) will be described. [Example of Feeding Line Condition (2)]

For example, in a target object direction in which reception signals corresponding to signals transmitted from given two transmission antennas among a plurality of Tx #1 to Tx #Nt are in phase, feeding line lengths in which a reception signal corresponding to a signal transmitted from one of the two transmission antennas and a reception signal(s) corresponding to a signal(s) transmitted from the remaining transmission antenna(s) are not in phase are used.

For example, a case of Nt=3 (Tx #1, Tx #2, and Tx #3) will be described.

Target object direction $\theta_{c2,1}$ in which reception signals are in phase with respect to element interval $Dt_{(2,1)}$ between Tx #1 and Tx #2 is given by following equation 27 based on equation 25.

[32]

$$\sin \theta_{c2,1} = \frac{-(\xi_2 - \xi_1 \pm m_{2,1}\pi)\lambda}{2\pi D_{t(2,1)}} \qquad \text{(Equation 27)}$$

where $m_{2,1}$ is an integer satisfying $$\left| \frac{-(\xi_2 - \xi_1 \pm m_{2,1}\pi)\lambda}{2\pi D_{t(2,1)}} \right| \le 1.$$

In the same manner, target object direction $\theta_{c3,1}$ in which reception signals are in phase with respect to element interval $Dt_{(3,1)}$ between Tx #1 and Tx #3 is given by following equation 28 based on equation 25.

[33]

$$\sin \theta_{c3,1} = \frac{-(\xi_3 - \xi_1 \pm m_{3,1}\pi)\lambda}{2\pi D_{t(3,1)}} \qquad \text{(Equation 28)}$$

where $m_{3,1}$ is an integer satisfying $$\left| \frac{-(\xi_3 - \xi_1 \pm m_{3,1}\pi)\lambda}{2\pi D_{t(3,1)}} \right| \le 1.$$

Phase differences $\gamma(2, 1)=(\xi_2-\xi_1)$ and $\gamma(3,1)=(\xi_3-\xi_1)$ may be set such that $\sin \theta_{c2,1}$ in equation 27 does not coincide with $\sin \theta_{c2,1}$ in equation 28. Thus, in a target object direction in which reception signals of signals transmitted from Tx #1 and Tx #2 among a plurality of Tx #1 to Tx #3 are in phase, it is possible to set feeding line lengths in which reception signals of signals transmitted from Tx #1 and Tx #3 are not in phase.

Note that, since a case where the reception signal level is low (for example, in a case where the reception SNR (Signal to Noise Ratio) is low) is likely to be affected by a noise or the like, it is suitable to set $\sin \theta_{c2,1}$ and $\sin \theta_{c3,1}$ to be values as different as possible. Thus, the probability of erroneous transmission antenna determination can be reduced.

Example 1

For example, in the case of Nt=3 (for example, Tx #1, Tx #2, and Tx #3), target object direction $\theta_{c2,1}$ in which reception signals are in phase with respect to element interval $Dt_{(2,1)}=\lambda/2$ between Tx #1 and Tx #2 is given by following equation 29 based on equation 25.

[34]

$$\sin \theta_{c2,1} = \frac{-(\gamma(2, 1) \pm m_{2,1}\pi)}{\pi} \qquad \text{(Equation 29)}$$

Further, for example, target object direction $\theta_{c3,1}$ in which reception signals are in phase with respect to element interval $Dt_{(3,1)}=\lambda$ between Tx #1 and Tx #3 is given by following equation 30 based on equation 25.

[35]

$$\sin \theta_{c3,1} = \frac{-(\gamma(3, 1) \pm m_{3,1}\pi)}{2\pi} \qquad \text{(Equation 30)}$$

For example, it is configured such that the feeding line lengths of feeding lines 108 for Tx #1 and Tx #2 have phase difference $\gamma(2, 1)=\pi/2$ and the feeding line lengths of feeding lines 108 for Tx #1 and Tx #3 have phase difference $\gamma(3, 1)=\pi/2$. In this case, equations 29 and 30 are given by following equations 31 and 32.

$$\sin\theta_{c2,1} = \frac{-\left(\frac{\pi}{2} \pm m_{2,1}\pi\right)}{\pi} = -\frac{1}{2} \mp m_{2,1} = -\frac{1}{2}, \text{ or, } \frac{1}{2} \qquad \text{(Equation 31)}$$

$$\sin\theta_{c3,1} = \frac{-\left(\frac{\pi}{2} \pm m_{3,1}\pi\right)}{\pi} = -\frac{1}{4} \mp \frac{m_{3,1}}{2} = -\frac{3}{4}, -\frac{1}{4}, \frac{1}{4}, \text{ or, } \frac{3}{4} \qquad \text{(Equation 32)}$$

The feeding line lengths of feeding lines 108 set in the above-described manner are feeding line lengths in which, for example, with respect to a target object direction (for example, $\theta_{c2,1}$) in which reception signals of signals transmitted from two transmission antennas Tx #1 and Tx #2 among Tx #1 to Tx #3 are in phase, reception signals of signals transmitted from Tx #1 and remaining Tx #3 are not in phase in the target object direction (for example, 0,2,1).

Figure 8:
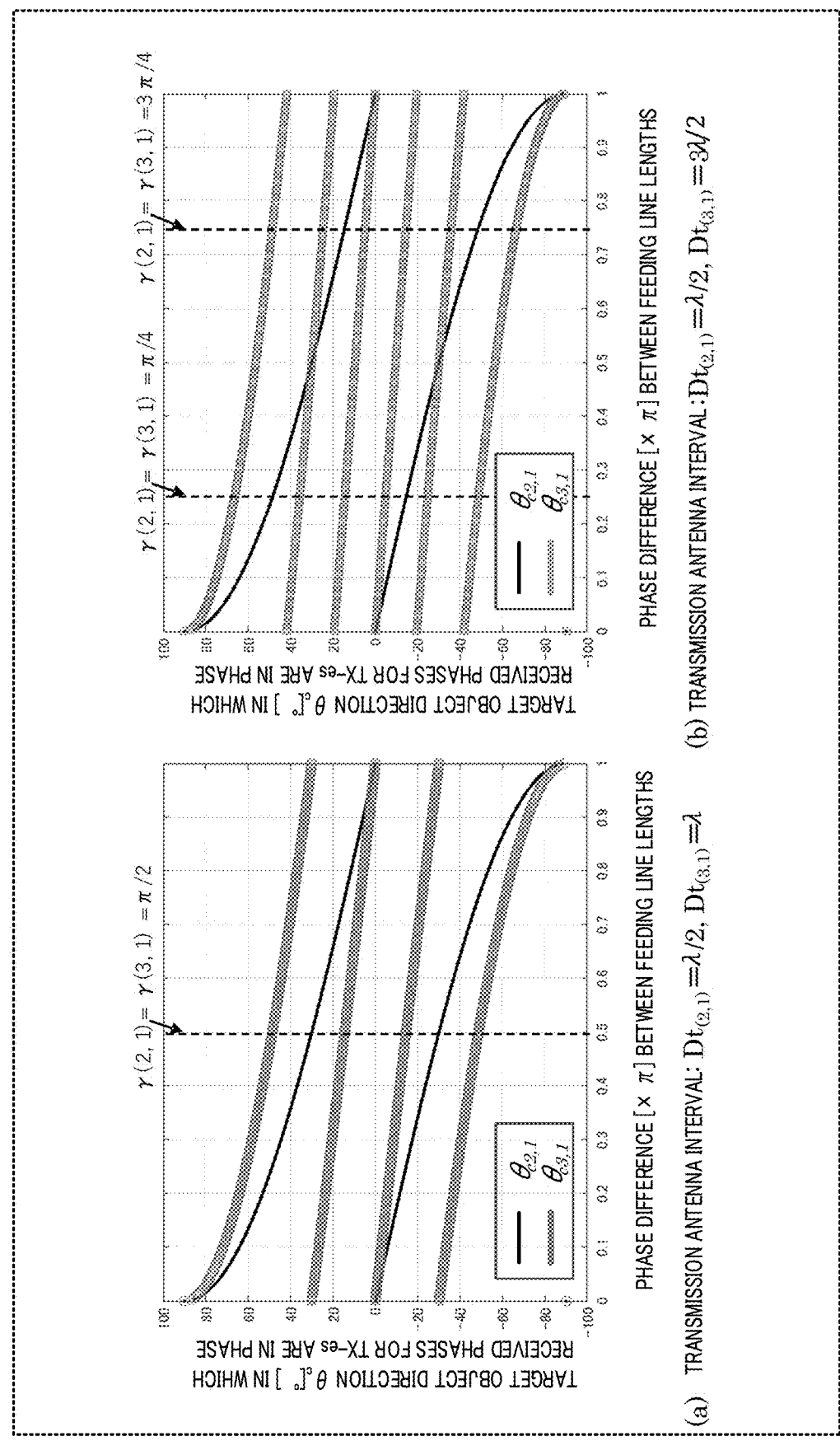
FIG. 8 illustrates examples of a relationship between a phase difference between feeding line lengths and a target object direction in which received phases in transmission antennas are in phase.

Further, for example, target object directions $\theta_{c2,1}$ and $\theta_{c3,1}$ have a relationship of being as far from each other as possible. For example, as illustrated in (a) of FIG. 8, when $\gamma(2, 1)=\gamma(3, 1)=\pi/2$, $\sin \theta_{c2,1}$, in which reception signals of signals transmitted from Tx #1 and Tx #2 are in phase, and $\sin \theta_{c3,1}$, in which reception signals of signals transmitted from Tx #1 and Tx #3 are in phase, have a difference of $\pm\frac{1}{4}$. Further, $\sin \theta_{c3,1}$ in which reception signals of signals transmitted from Tx #1 and Tx #3 are in phase has $\frac{1}{2}$ intervals based on equation 28, and $\sin \theta_{c2,1}$ has an intermediate value of $\sin \theta_{c3,1}$ in which the reception signals are in phase as described above. As described above, target object directions $\theta_{c2,1}$ and $\theta_{c3,1}$ have a relationship of being as far from each other as possible. Note that, a similar relationship is obtained even when an integer multiple of $2\pi$ is added to the horizontal axis in FIG. 8. Note that, the same extent of performance can be ensured even with $\gamma(2, 1)=\gamma(3, 1)=\pi/2\pm\pi/10$.

The following relationship is obtained by summarizing those described above.

For example, a description will be given of a case where at least three transmission antennas (for example, including Tx #1 to Tx #3) are arranged on an identical straight line and transmission antenna intervals having a relationship in which the interval between Tx #1 and Tx #2 is $Dt_{(2,1)}$, the interval between Tx #1 and Tx #3 is an integer multiple (at×$Dt_{(2,1)}$) of $Dt_{(2,1)}$, and at =2 are included. In this case, the feeding line lengths of feeding lines 108 for Tx #1 and Tx #2 may have a phase difference of $\gamma(2, 1)=\pi/2$. Further, the feeding line lengths of feeding lines 108 for Tx #1 and Tx #3 may have a phase difference of $\gamma(3, 1)=\pi/2$.

Note that, at is not limited to at =2, and the same relationship is established even when at is an even multiple as in a relationship of at =4, 6, 8.

In this case, the relationship described above is given by following equations 33 and 34.

$$\sin\theta_{c2,1} = \frac{-\left(\frac{1}{2} \pm m_{2,1}\right)}{2D_{t(2,1)}} \qquad \text{(Equation 33)}$$

$$\sin\theta_{c3,1} = \frac{-\left(\frac{1}{2} \pm m_{3,1}\right)}{2a_t D_{t(2,1)}} \qquad \text{(Equation 34)}$$

Thus, with respect to target object direction $\theta_{c2,1}$ in which reception signals of signals transmitted from Tx #1 and Tx #2 are in phase, reception signals of signals transmitted from Tx #1 and Tx #3 are not in phase in target object direction $\theta_{c2,1}$ described above, and transmission antenna determination can be performed in radar apparatus 10.

Further, target object direction $\theta_{c2,1}$, in which reception signals of signals transmitted from Tx #1 and Tx #2 are in phase, and target object direction $\theta_{c3,1}$, in which reception signals of signals transmitted from Tx #1 and Tx #3 are in phase, have a relationship of being as far from each other as possible. Thus, for example, even a case where the reception signal level is low (for example, a case where the reception SNR is low) is not affected by a noise or the like, and the probability of erroneous transmission antenna determination can be reduced.

Given the above, by setting feeding line lengths of feeding lines 108 connected to the transmission antennas to the values as described above when the number of transmission antennas is equal to or greater than 3, reception signals of signals transmitted from the transmission antennas are not in phase in a target object direction within a 90° range. Thus, radar apparatus 10 is capable of transmission antenna discrimination in a wide-angle field of view range.

Example 2

For example, in the case of Nt=3 (for example, Tx #1, Tx #2, and Tx #3), target object direction $\theta_{c2,1}$ in which reception signals are in phase with respect to element interval $Dt_{(2,1)}=\lambda/2$ between Tx #1 and Tx #2 is given by following equation 35 based on equation 25.

$$\sin\theta_{c2,1} = \frac{-(\gamma(2, 1) \pm m_{2,1}\pi)}{\pi} \qquad \text{(Equation 35)}$$

Further, for example, target object direction $\theta_{c3,1}$ in which reception signals are in phase with respect to element interval $Dt_{(3,1)}$ between Tx #1 and Tx #3=3$\lambda$/2 is given by following equation 36 based on equation 25.

$$\sin\theta_{c3,1} = \frac{-(\gamma(3, 1) \pm m_{3,1}\pi)}{3\pi} \qquad \text{(Equation 36)}$$

For example, it is configured such that the feeding line lengths of feeding lines 108 for Tx #1 and Tx #2 have phase difference $\gamma(2, 1)=\pi/4$ (or ¾$\pi$) and the feeding line lengths of feeding lines 108 for Tx #1 and Tx #3 have phase difference $\gamma(3, 1)=\pi/4$ (or ¾$\pi$). In this case, equations 35 and 36 are given by following equations 37 and 38.

$$\sin\theta_{c2,1} = \frac{-\left(\frac{\pi}{4} \pm m_{2,1}\pi\right)}{\pi} = -\frac{1}{4} \mp m_{2,1} = -\frac{1}{4}, \text{ or, } \frac{3}{4} \qquad \text{(Equation 37)}$$

$$\sin\theta_{c3,1} = \frac{-\left(\frac{\pi}{4} \pm m_{3,1}\pi\right)}{3\pi} = -\frac{1}{12} \mp \frac{m_{3,1}}{3} = -\frac{9}{12}, \qquad \text{(Equation 38)}$$
$$-\frac{5}{12}, -\frac{1}{12}, \frac{3}{12}, \frac{7}{12}, \text{ or, } \frac{11}{12},$$

The feeding line lengths of feeding lines 108 set in the above-described manner are feeding line lengths in which, for example, with respect to a target object direction (for example, $\theta_{c2,1}$) in which reception signals of signals transmitted from two transmission antennas Tx #1 and Tx #2 among Tx #1 to Tx #3 are in phase, reception signals of signals transmitted from Tx #1 and remaining Tx #3 are not in phase in the target object direction (for example, 0,2,1).

Further, for example, target object directions $\theta_{c2,1}$ and $\theta_{c3,1}$ have a relationship of being as far from each other as possible. For example, as illustrated in (b) of FIG. 8, when $\gamma(2, 1)=\gamma(3, 1)=\pi/4$ or ¾$\pi$, sin $\theta_{c2,1}$, in which reception signals of signals transmitted from Tx #1 and Tx #2 are in phase, and sin $\theta_{c3,1}$, in which reception signals of signals transmitted from Tx #1 and Tx #3 are in phase, have a difference of ±⅙. Further, sin $\theta_{c3,1}$ in which reception signals of signals transmitted from Tx #1 and Tx #3 are in phase has ⅓ intervals based on equation 28, and sin $\theta_{c2,1}$ has an intermediate value of sin $\theta_{c3,1}$ in which the reception signals are in phase as described above. As described above, target object directions $\theta_{c2,1}$ and $\theta_{c3,1}$ have a relationship of being as far from each other as possible. Note that, a similar relationship is obtained even when an integer multiple of 2$\pi$ is added to the horizontal axis in FIG. 8. Note that, the same extent of performance can be ensured even with $\gamma(2, 1)=\gamma(3, 1)=\pi/4$ (or ¾$\pi$)±$\pi$/10.

The following relationship is obtained by summarizing those described above.

For example, a description will be given of a case where at least three transmission antennas (for example, including Tx #1 to Tx #3) are arranged on an identical straight line and transmission antenna intervals having a relationship in which the interval between Tx #1 and Tx #2 is $Dt_{(2,1)}$, the interval between Tx #1 and Tx #3 is an integer multiple (at×$Dt_{(2,1)}$) of $Dt_{(2,1)}$, and at =3 are included. In this case, the feeding line lengths of feeding lines 108 for Tx #1 and Tx #2 may have a phase difference of $\gamma(2, 1)=\pi/4$ (or ¾$\pi$). Further, the feeding line lengths of feeding lines 108 for Tx #1 and Tx #3 may have a phase difference of $\gamma(3, 1)=\pi/4$ (or ¾$\pi$).

In this case, the relationship described above is given by following equations 39 and 40.

$$\sin\theta_{c2,1} = \frac{-\left(\frac{1}{4} \pm m_{2,1}\right)}{2D_{t(2,1)}} \qquad \text{(Equation 39)}$$

$$\sin\theta_{c3,1} = \frac{-\left(\frac{1}{4} \pm m_{3,1}\right)}{2a_t D_{t(2,1)}} \qquad \text{(Equation 40)}$$

Thus, with respect to target object direction $\theta_{c2,1}$ in which reception signals of signals transmitted from Tx #1 and Tx #2 are in phase, reception signals of signals transmitted from Tx #1 and Tx #3 are not in phase in target object direction $\theta_{c2,1}$ described above, and transmission antenna determination can be performed in radar apparatus 10.

Further, target object direction $\theta_{c2,1}$, in which reception signals of signals transmitted from Tx #1 and Tx #2 are in phase, and target object direction $\theta_{c3,1}$, in which reception signals of signals transmitted from Tx #1 and Tx #3 are in phase, have a relationship of being as far from each other as possible. Thus, for example, even a case where the reception signal level is low (for example, a case where the reception SNR is low) is not affected by a noise or the like, and the probability of erroneous transmission antenna determination can be reduced.

Given the above, by setting feeding line lengths of feeding lines 108 connected to the transmission antennas to the values as described above when the number of transmission antennas is equal to or greater than 3, reception signals of signals transmitted from the transmission antennas are not in phase in a target object direction within a ±90° range. Thus, radar apparatus 10 is capable of transmission antenna discrimination in a wide-angle field of view range.

Setting examples of feeding line 108 have been described above.

As described above, in the present embodiment, in radar apparatus 10, the line lengths of feeding lines 108 are set such that a phase deviation due to a line length difference between feeding lines 108 connected to at least two transmission antennas (for example, a first transmission antenna and a second transmission antenna), respectively, is an odd multiple of π/2. Alternatively, in radar apparatus 10, the line lengths of feeding lines 108 are set such that a phase deviation due to a line length difference between feeding lines 108 connected to at least three transmission antennas (for example, first to third transmission antennas), respectively, is an odd multiple of π/4. As described above, since a phase difference between transmission antennas occurs by changing the feeding line lengths of feeding lines 108 connected to the transmission antennas, it is possible to change the received phases of reflected waves corresponding to signals transmitted from a plurality of the transmission antennas, respectively, even in a case where target object direction θ is $(2\pi Dt \sin \theta)/\lambda = \pm 2n\pi$. Thus, radar apparatus 10 is capable of transmission antenna discrimination in DDM demultiplexer/direction estimator 211. Here, Dt represents the transmission antenna interval, n represents an integer value, and X represents the wavelength of a radar transmission wave.

Thus, the present embodiment makes it possible to improve the detection performance of a MIMO radar using DDM transmission.

Further, in the present embodiment, a phase deviation between transmission antennas is adjusted by setting the feeding line lengths of feeding lines 108 connected to the transmission antennas, and thus, in radar apparatus 10, the settings of other parameters (for example, parameters related to DDM transmission) may not be changed for phase deviation adjustment.

Note that, in the present embodiment, the line lengths of feeding lines 108 are set such that a phase deviation due to a line length difference between feeding lines 108 connected to two transmission antennas, respectively, is an odd multiple of π/2, but a phase deviation due to a line length difference between feeding lines 108 is suitably set to π/2 because, for example, a larger line length difference may increase feeding loss.

Further, in the present embodiment, feeding lines 108 for at least two transmission antennas are set such that a phase deviation between transmission antennas occurs by using feeding lines having different lengths. Nonetheless, the method of differentiating a phase deviation between transmission antennas is not limited thereto, but, for example, the path lengths in phase rotator 107 may be differentiated by phase rotator 107, in which case the same effect is obtained. In this case, a phase deviation between transmission antennas is added at the output end of phase rotator 107.

Embodiment 2

Radar apparatus 10 according to the present embodiment may be configured in the same manner as in Embodiment 1.

In Embodiment 1, for example, target object direction $\theta_c$ in which radar apparatus 10 receives target object reflected waves as being in phase in the case of two transmission antennas depends on the feeding line lengths (for example, phase difference $\xi_2 - \xi_1$ between feeding line lengths), and interval Dt between the transmission antennas as indicated in equation 25. The feeding line lengths and the transmission antenna interval are parameters that are physically set in a fixing manner, and target object direction $\theta_c$ is a known direction in radar apparatus 10.

In the present embodiment, for example, transmission antennas in which directional gains differ by a predetermined value or more in target object direction $\theta_c$ in which target object reflected waves are received as being in phase are used. For example, the directional gains of a first transmission antenna and a second transmission antenna included in transmission antenna processor 109 differ by a predetermined value or more in a direction in which the received phases of reflected wave signals that are radar transmission signals transmitted from the first transmission antenna and the second transmission antenna and reflected by a target object are in phase. Thus, in comparison with Embodiment 1, it is possible to obtain an effect capable of enlarging a field of view that enables radar transmission signal discrimination.

As an example, a case of number Nt of transmission antennas=2 and transmission antenna interval Dt=λ/2 will be described.

For example, in a case where feeding lines 108 having different feeding line lengths in which a phase deviation between transmission antennas is approximately π/2, radar apparatus 10 receives target object reflected waves for signals transmitted from two transmission antennas as being in phase in target object direction $\theta_c = \pm 300$ directions as described in Embodiment 1. As described above, target object direction $\theta_c$, in which target object reflected waves for signals transmitted from two transmission antennas are received as being in phase, in a case where Dt and the phase deviation between the transmission antennas (or the feeding line lengths of feeding lines 108) are set is known.

In the present embodiment, for example, as two Tx #1 and Tx #2, transmission antennas in which the directional gains of the transmission antennas in ±300 directions differ by a predetermined value (for example, approximately 2 dB to 6 dB) or more than are used.

Figure 9:
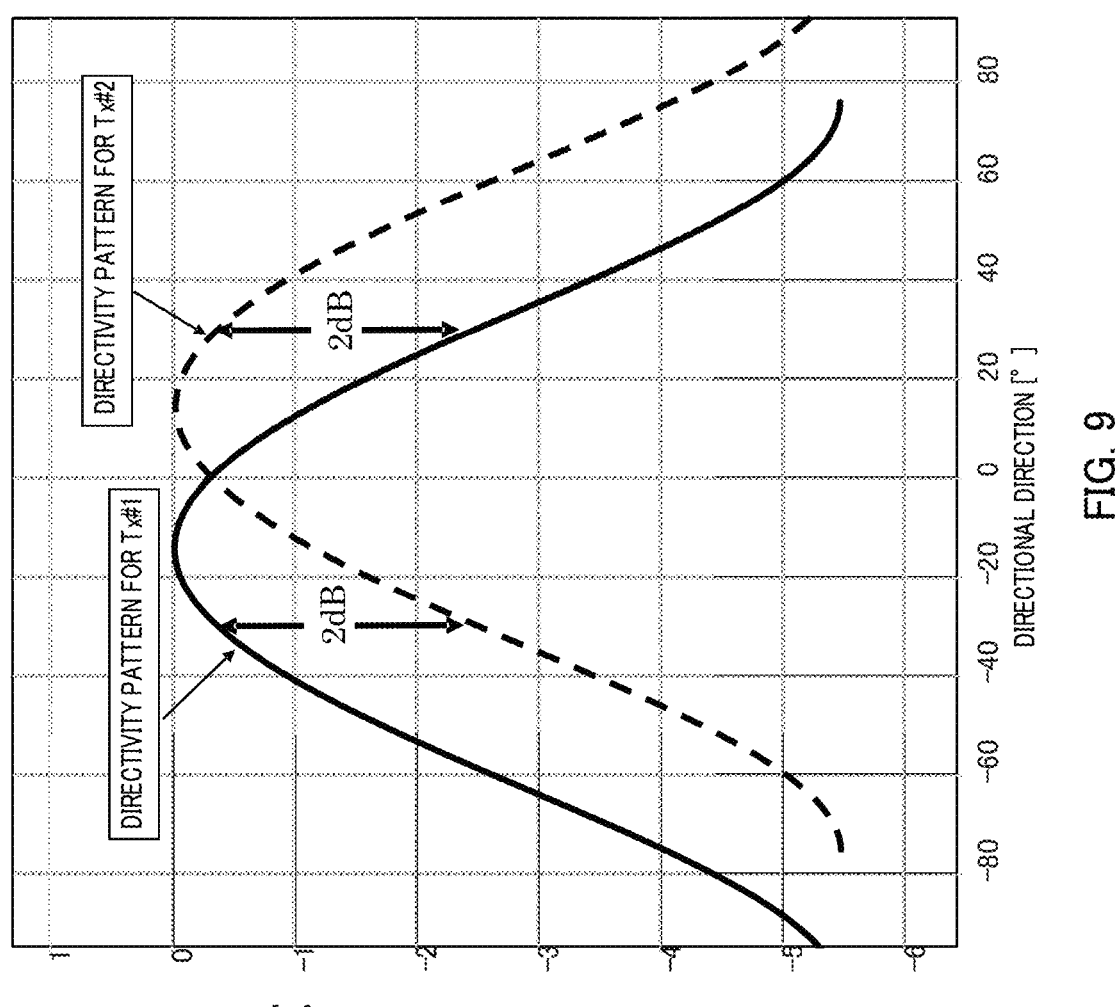
FIG. 9 illustrates exemplary directivity patterns for transmission antennas.

For example, FIG. 9 illustrates exemplary directivity patterns for two Tx #1 and Tx #2. Each directivity beam width of the two transmission antennas illustrated in FIG. 9 is 100°, the main beam direction of Tx #1 is the −15° direction and the main beam direction of Tx #2 is the 15° direction. As described above, the main beam directions of Tx #1 and Tx #2 differ from each other. By using a plurality of transmission antennas having directivity patterns with shifted main beam directions, the directional gains in the 30° or −30° direction differ by approximately 2 dB between the transmission antennas as illustrated in FIG. 9.

By using a plurality of transmission antennas having different directivity patterns as described above, radar apparatus 10 is capable of transmission antenna discrimination based on directional gains (or received powers) even in target object directions $\theta_c = \pm 30°$ in which target object reflected waves for signals transmitted from Tx #1 and Tx #2 are received as being in phase. Accordingly, radar apparatus 10 is capable of transmission antenna discrimination in which the field of view is enlarged to be more than ±30°.

Hereinafter, operations of radar apparatus 10 different from the operations according to Example 1 in a case where radar apparatus 10 uses a plurality of transmission antennas with different directivity patterns will be described, and descriptions of the same operations of radar apparatus 10 as the operations according to Example 1 will be omitted. For example, the operation examples of radar transmitter 100 in radar apparatus 10 in the present embodiment are the same as those in Embodiment 1, and thus, description of the operations will be omitted. In the present embodiment, the operations of DDM demultiplexer/direction estimator 211 in radar receiver 200 of radar apparatus 10 differ from the operations thereof in Embodiment 1.

Hereinafter, operation examples of DDM demultiplexer/direction estimator 211 (for example, operations different from those in Embodiment 1) will be described.

For example, among the operations of DDM demultiplexer/direction estimator 211 according to the present embodiment, the operation in Step 2-3 (TxSel) in Step 2 (DDM demultiplexing processing (transmission antenna discrimination)) in FIG. 4 differs from that in Embodiment 1.

For example, in a case where $\theta_{max}$(nmax) of a transmission antenna candidate is equal to target object direction $\theta_c$ in which target object reflected waves are received as being in phase in the case of two transmission antennas or in a case where $|\theta_{max}$(nmax)$-\theta_c|$ is equal to or less than a predetermined value (for example, $\delta_\theta$), after TxSel in Step 2-3 described in Embodiment 1 is performed, DDM demultiplexer/direction estimator 211 performs TxSel including the following processing.

For example, $N_{DM} = 2$ in the case of two transmission antennas. DDM demultiplexer/direction estimator 211 compares, for example, received power values of $VFT_z(f_{b\_cf},$ fddm (1)) and $VFT_z(f_{b\_cf},$ fddm (2)) that are elements of transmission antenna candidate vectors. Note that, for received power values, the received power by one of reception antennas Rx #1 to Rx #Na may be used, or a result of addition of the received power values of a plurality of reception antennas may be used.

Further, it is assumed that the transmission antenna directional gains of two Tx #1 and Tx #2 in $\theta_c$ direction are "TxGain$_{\#1}(\theta_c)$" and "TxGain$_{\#2}(\theta_c)$". For example, the directional gains (TxGain$_{\#1}(\theta_c)$ and TxGain$_{\#2}(\theta_c)$) of the transmission antennas in target object direction $\theta_c$ differ. For example, in the example in FIG. 9, TxGain$_{\#1}(-30°)$>TxGain$_{\#2}(-30°)$ in the case of $\theta_c = -30°$, and TxGain$_{\#1}(30°)$<TxGain$_{\#2}(30°)$ in the case of $\theta_c = 30°$.

DDM demultiplexer/direction estimator 211 utilizes such transmission antenna directivity conditions to perform transmission antenna discrimination as described below.

<Transmission Antenna Discrimination (TxSel) Using Transmission Antenna Directivity Conditions>

For example, in a case where $\theta_{max}$(nmax) of a transmission antenna candidate satisfies the condition $|\theta_{max}$(nmax)$-\theta_c| \leq \delta_\theta$, and in the case of $|VFT_z(f_{b\_cf},$ fddm(1))$|^2 >$ $VFT_z(f_{b\_cf},$ fddm(2))$|^2$, DDM demultiplexer/direction estimator 211 perform TxSel as in (1) and (2) below.

(1) In the case of TxGain$_{\#1}(\theta_c)$<TxGain$_{\#2}(\theta_c)$, DDM demultiplexer/direction estimator 211 determines that $VFT_z$ $(f_{b\_cf},$ fddm (1)) is the output of a reception signal corresponding to Tx #2 and $VFT_z(f_{b\_cf},$ fddm (2)) is the output of a reception signal corresponding to Tx #1.

(2) In the case of TxGain$_{\#1}(\theta_c)$>TxGain$_{\#2}(\theta_c)$, DDM demultiplexer/direction estimator 211 determines that $VFT_z$ $(f_{b\_cf},$ fddm (1)) is the output of a reception signal corresponding to Tx #1 and $VFT_z(f_{b\_cf},$ fddm (2)) is the output of a reception signal corresponding to Tx #2.

Further, for example, in a case where $\theta_{max}$(nmax) of a transmission antenna candidate satisfies the condition $|\theta_{max}$ (nmax)$-\theta_c| \leq \delta_\theta$, and in the case of $|VFT_z(f_{b\_cf},$ fddm(1))$|^2 < |VFT_z(f_{b\_cf},$ fddm(2))$|^2$, DDM demultiplexer/direction estimator 211 perform TxSel as in (1) and (2) below.

(1) In the case of TxGain$_{\#1}(\theta_c)$<TxGain$_{\#2}(\theta_c)$, DDM demultiplexer/direction estimator 211 determines that $VFT_z$ $(f_{b\_cf},$ fddm (1)) is the output of a reception signal corresponding to Tx #1 and $VFT_z(f_{b\_cf},$ fddm (2)) is the output of a reception signal corresponding to Tx #2.

(2) In the case of TxGain$_{\#1}(\theta_c)$>TxGain$_{\#2}(\theta_c)$, DDM demultiplexer/direction estimator 211 determines that $VFT_z$ $(f_{b\_cf},$ fddm (1)) is the output of a reception signal corresponding to Tx #2 and $VFT_z(f_{b\_cf},$ fddm (2)) is the output of a reception signal corresponding to Tx #1.

Here, $\theta_c$ represents a target object direction in which target object reflected waves from Tx #1 and Tx #2 are received as being in phase.

Note that, the received power sum by a plurality of reception antennas given by following equation 41 may be used instead of $|VFT_z(f_{b\_cf},$ fddm(1))$|^2$ and $|VFT_z(f_{b\_cf},$ fddm(2))$|^2$ described above.

$$\sum_{k=1}^{N_a} \left| VFT_z\left(f_{b_{cf}}, fddm(1)\right) \right|^2, \sum_{k=1}^{N_a} \left| VFT_z\left(f_{b_{cf}}, fddm(2)\right) \right|^2 \quad \text{(Equation 41)}$$

For example, in a case where directivity patterns for transmission antennas as illustrated in FIG. 9 are used, TxGain$_{\#1}(30°)$<TxGain$_{\#2}(30°)$ when $\theta_c = 30°$. Accordingly, in a case where $\theta_{max}$(nmax) of a transmission antenna candidate satisfies the condition $|\theta_{max}$(nmax)$-30° \leq \delta_\theta$, and in the case of $|VFT_z(f_{b\_cf},$ fddm(1))$|^2 > |VFT_z(f_{b\_cf},$ fddm(2))$|^2$, DDM demultiplexer/direction estimator 211 determines that $VFT_z(f_{b\_cf},$ fddm (1)) corresponds to Tx #2 and $VFT_z(f_{b\_cf},$ fddm (2)) corresponds to Tx #1.

Further, for example, in a case where directivity patterns for transmission antennas as illustrated in FIG. 9 are used, TxGain #1($-30°$)>TxGain$_{\#2}(-30°)$ when $\theta_c = -30°$. Accordingly, in a case where $\theta_{max}$(nmax) of a transmission antenna candidate satisfies the condition $|\theta_{max}$(nmax)$-(-30°)| \leq \delta_\theta$, and in the case of $|VFT_z(f_{b\_cf},$ fddm(1))$|^2 > VFT_z(f_{b\_cf},$ fddm (2))|$^2$, DDM demultiplexer/direction estimator 211 determines that VFT$_z$(f$_{b\_cf}$, fddm (1)) corresponds to Tx #1 and VFT$_z$(f$_{b\_cf}$, fddm (2)) corresponds to Tx #2.

Note that, TxSel using the transmission antenna directivity conditions described above may be performed by using likelihood information in combination.

Further, by adding TxSel using the transmission antenna directivity conditions, the present embodiment makes it possible to obtain an effect capable of further enlarging a field of view that enables radar transmission signal discrimination, in comparison with Embodiment 1

With the reception processing as described above, radar apparatus 10 in the present embodiment uses a plurality of transmission antennas in which the directional gains of the plurality of transmission antennas within a predetermined field of view in a target object direction in which target object reflected waves of signals transmitted from the plurality of transmission antennas are received as being in phase differ by a predetermined value or more. Thus, it is possible to obtain an effect capable of further enlarging a field of view that enables radar transmission signal discrimination.

Embodiment 3

TxSel by DDM demultiplexer/direction estimator 211 in Embodiment 1 described above may cause a transmission antenna determination error in cases as described below. In such cases, an error may occur in a result of Doppler frequency estimation or direction estimation due to erroneous reception and demultiplexing of a DDM transmission signal and the detection performance of the radar may deteriorate.

Case 1

In a case where two target object reflected waves at intervals equal to DDM intervals arrive in an identical distance index (hereinafter, the distance index will also be referred to as distance Bin), the maximum peak power value varies due to at least one relationship of the amplitude and phase between the reflected waves from the two target objects at the time of the direction estimation processing for each transmission antenna candidate in Step 2-2 of FIG. 4, and thus, an error may occur in TxSel and direction estimation or Doppler frequency detection may also be erroneous.

Case 2

In a case where when two target objects with different angles of arrival are included in an identical distance Bin and an identical DF index (hereinafter, which will also be referred to as Doppler bin), the maximum peak power value varies due to at least one relationship of the amplitude and phase between the reflected waves from the two target objects at the time of the direction estimation processing for each transmission antenna candidate in Step 2-2 of FIG. 4, and thus, an error may occur in TxSel and direction estimation or Doppler frequency detection may also be erroneous.

In the present embodiment, a method of transmitting a transmission signal for radar apparatus 10 to correctly demultiplex a DDM signal even in the cases as described above will be described.

Note that, the radar apparatus according to the present embodiment has the same basic configuration as radar apparatus 10 illustrated in FIG. 2, and will be therefore described with reference to FIG. 2. In the present embodiment, for example, the operations of DS setter 106, Doppler analyzer 209, CFAR processor 210, and DDM demultiplexer/direction estimator 211 in radar apparatus 10 illustrated in FIG. 2 differ from those in Embodiment 1.

In the present embodiment, for example, radar apparatus 10 variably sets at least one of the number of DS amounts (for example, DDM number) and/or the interval between DS amounts, both of which are set for radar transmission signal transmission, for each transmission period in which radar transmission signals are transmitted. For example, radar apparatus 10 variably sets the DDM number for each transmission period, variably sets each interval of DS amounts, and changes the DDM assignment to the transmission antennas.

For example, in a case where the reception levels of Doppler peaks for a plurality of targets (target objects) are approximately equal and the interval between the Doppler peaks coincides with the interval between DS amounts in DDM, it may be difficult for DDM demultiplexer/direction estimator 211 to correctly detect TxSel (Case 1 described above).

In the present embodiment, 1) a case where the DDM number is variable and each interval between DS amounts is variably set, for each transmission period, and 2) a case where the DDM number is not variable and each interval between DS amounts is variably set, for each transmission period, in order to separate a plurality of targets more reliably in the positioning output of radar apparatus 10, will be described. According to the present embodiment, since the interval between Doppler peaks corresponding to a plurality of transmission antennas for one target differs for each transmission period, radar apparatus 10 easily separates a plurality of targets in one radar observation, which becomes a measure for Case 1.

Hereinafter, as a method of phase rotation amount setting in phase rotation amount setter 105 according to the present embodiment, an example of a method of setting a DS amount to be applied by DS setter 106 will be described.

DS setter 106 may set phase rotation amount $\varphi_{ndm}$ for applying DS amount DOP$_{ndm}$, where ndm=1 to N$_{DM}$. N$_{DM}$ is the number of different set DS amounts (DDM number) and, in the present embodiment, includes a transmission period for performing transmission by using one or some of the transmission antennas in a case where the DDM number is varied for each transmission period in order to more reliably separate a plurality of targets in the positioning output of radar apparatus 10. For this reason, DDM number N$_{DM}$ may be set to a number equal to or greater than 1 and less than Nt, depending on the transmission period.

Further, DS setter 106 may variably set DS amount DOP$_{ndm}$ for each Tr. For example, in a case where DDM number N$_{DM}$ is variably set for each two transmission periods (2Tr), DS setter 106 sets DDM number N$_{DM}$ for each odd-numbered Tr as "N$_{DM}$$^{odd}$" and sets DDM number N$_{DM}$ for each even-numbered Tr as "N$_{DM}$$^{even}$", respectively.

Here, Nt≥N$_{DM}$$^{odd}$≥1 and Nt≥N$_{DM}$$^{even}$≥1. Note that, it may be configured such that N$_{DM}$$^{odd}$≠N$_{DM}$$^{even}$ or N$_{DM}$$^{odd}$=N$_{DM}$$^{even}$. DDM number N$_{DM}$$^{odd}$ or N$_{DM}$$^{even}$ may be set to a number less than Nt depending on the transmission period. In such a case, radar apparatus 10 uses one or some of the transmission antennas to transmit a radar transmission signal(s).

Note that, hereinafter, a case where radar transmission signals are transmitted by using Tx #1 to Tx #N$_{DM}$$^{odd}$ or Tx #1 to Tx #N$_{DM}$$^{even}$ will be described, but the present disclosure is not limited thereto, and it is possible to perform assignment using an arbitrary transmission antenna(s) for DDM indices by using an assignment table with numbers of transmission antennas and DDM indices to which DDM number $N_{DM}$ is assigned.

Further, DS setter 106 sets DS amount $DOP_{ndm}^{odd}$ for each odd-numbered Tr and DS amount $DOP_{ndm}^{even}$ for each even-numbered Tr, respectively.

Further, periods for variably setting DS amounts are not limited to two transmission periods, and it may be set, for example, such that DS amounts are varied with three transmission periods. In this case, DS setter 106 sets three DS amounts to be used for each three transmission periods.

Hereinafter, setting examples of DS setter 106 will be described.

Setting Example 1

In Setting Example 1, a case where the DDM number is variable and each interval between DS amounts is variably set for each two transmission periods (2Tr) will be described.

For example, among a plurality of transmission antennas included in transmission antenna processor 109, the number of transmission antennas (or the DDM number) to which DS amounts are assigned may be different between an odd-numbered transmission period and an even-numbered transmission period. At this time, at least one identical DS amount for the odd-numbered transmission period and the even-numbered transmission period may be set.

For example, in a case where the maximum equal-interval DS amount setting given by equation 5 is used, for the ndm-th DS amount, DS setter 106 applies phase rotation amount $\varphi_{ndm}^{odd}$ corresponding to DS amount $DOP_{ndm}^{odd}$ for each odd-numbered Tr according to following equation 42 (where ndm=1 to $N_{DM}^{odd}$), and applies phase rotation amount $P_{ndm}^{even}$ corresponding to DS amount $DOP_{ndm}^{even}$ for each even-numbered Tr according to equation 43 (where ndm=1 to $N_{DM}^{even}$)

$$\phi_{ndm}^{odd} = \frac{2\pi(ndm-1)}{N_{DM}^{odd}} \qquad \text{(Equation 42)}$$

$$\phi_{ndm}^{even} = \frac{2\pi(ndm-1)}{N_{DM}^{even}} \qquad \text{(Equation 43)}$$

Here, $N_{DM}^{odd}$ and $N_{DM}^{even}$ are positive numbers equal to or greater than 1, and are set to values different from each other. For this reason, DS amount $DOP_{ndm}^{odd}$ for each odd-numbered Tr and DS amount $DOP_{ndm}^{even}$ for each even-numbered Tr are set to different values. Thus, each interval between DS amounts is variably set for each Tr.

Note that, phase rotation amount $\varphi_n$ is not limited to the value given by equation 5, but may be a phase rotation amount in which the intervals for DS amount $DOP_{ndm}^{odd}$ and DS amount $DOP_{ndm}^{even}$ are different. For example, DS amounts may be offset and set. Further, indices may be variably assigned to DS amounts. Further, DS amounts at unequal intervals given by equation 6 may be used.

In a case where m is an odd number in m-th Tr, DS setter 106 sets PS amount $\psi_{ndm}^{odd}(m)$ given by following equation 44 by using phase rotation amount $P_{ndm}^{odd}$ that applies DS amount $DOP_{ndm}^{odd}$, and outputs PS amount $V_{ndm}^{odd}(m)$ to phase rotator 107, where m=1 to Nc, and ndm=1 to $N_{DM}^{odd}$.

$$\psi_{ndm}^{odd}(m) = \text{floor}\left(\frac{m-1}{2}\right) \times \phi_{ndm}^{odd} \qquad \text{(Equation 44)}$$

Further, in a case where m is an even number in m-th Tr, DS setter 106 sets PS amount $\psi_{ndm}^{even}(m)$ given by equation 45 by using phase rotation amount $p_{ndm}^{even}$ that applies DS amount $DOP_{ndm}^{even}$, and outputs PS amount $V_{ndm}^{even}(m)$ to phase rotator 107, where m=1 to Nc, and ndm=1 to $N_{DM}^{even}$.

$$\psi_{ndm}^{even}(m) = \text{floor}\left(\frac{m-1}{2}\right) \times \phi_{ndm}^{even} \qquad \text{(Equation 45)}$$

Hereinafter, an example of DS setting in Setting Example 1 will be indicated.

Figure 10:
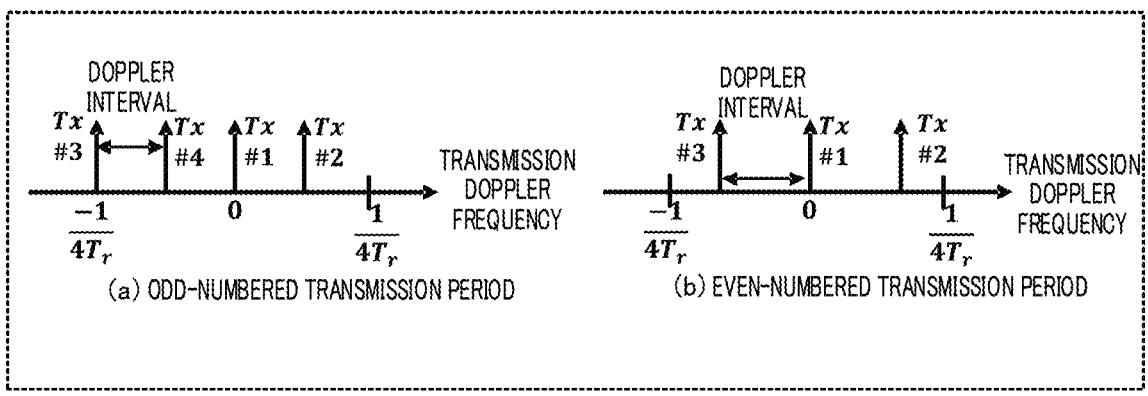
FIG. 10 illustrates setting examples of Doppler shift amounts.

In the example illustrated in FIG. 10, in the odd-numbered transmission period (hereinafter expressed as the odd Tr), DDM number $N_{DM}^{odd}=4$ is set for Tx #1 to Tx #4, and the maximum equal-interval DS amount setting given by equation 5 is applied. In the even-numbered transmission period (hereinafter expressed as the even Tr), on the other hand, DDM number $N_{DM}^{even}=3$ is set for Tx #1 to Tx #3, and the maximum equal-interval DS amount setting is applied. As a result, in FIG. 10, radar transmission signals are transmitted by DDM transmission from four transmission antennas in the odd Tr and from three transmission antennas in the even Tr, respectively.

Figure 11:
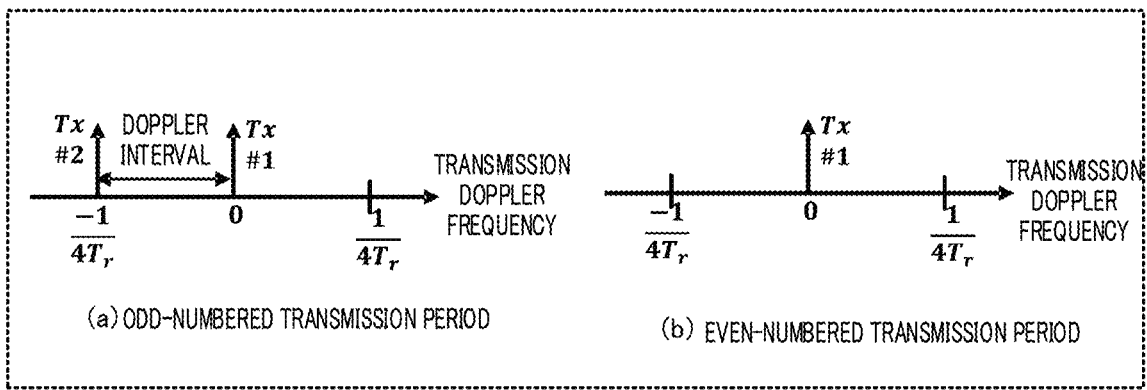
FIG. 11 illustrates setting examples of Doppler shift amounts.

In the example illustrated in FIG. 11, in the odd Tr, DDM number $N_{DM}^{odd}=2$ is set for Tx #1 and Tx #2, and the maximum equal-interval DS amount setting is applied. In the even Tr, on the other hand, DDM number $N_{DM}^{even}=1$ is set for Tx #1, and zero DS amount is set. As a result, in FIG. 11, radar transmission signals are transmitted by DDM transmission from a plurality of (for example, two) transmission antennas in the odd Tr and from one transmission antenna in the even Tr, respectively.

Figure 12:
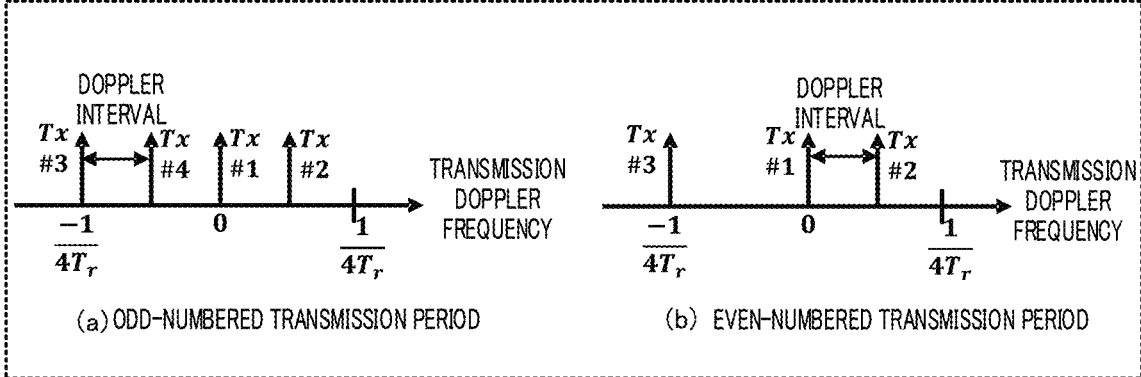
FIG. 12 illustrates setting examples of Doppler shift amounts.

In the example illustrated in FIG. 12, in the odd Tr, DDM number $N_{DM}^{odd}=4$ is set for Tx #1 to Tx #4, and the maximum equal-interval DS amount setting is applied. In the even Tr, on the other hand, DDM number $N_{DM}^{even}=3$ is set for Tx #1 to Tx #3, and the unequal-interval DS amount setting given by equation 6 (where $N_{int}=1$) is applied. As a result, in FIG. 12, radar transmission signals are transmitted by DDM transmission from four transmission antennas in the odd Tr and radar transmission signals are transmitted by DDM transmission from three transmission antennas in the even Tr. Further, in FIG. 12, DS amounts that are assigned to Tx1, Tx #2, and Tx #3 are identical in both the odd Tr and the even Tr.

Setting Example 2

In Setting Example 2, a case where the DDM number is constant and each interval between DS amounts is variably set for each two transmission periods (2Tr) will be described.

For example, in a case where the maximum equal-interval DS amount setting given by equation 5 is used for each odd-numbered Tr, for the ndm-th DS amount, DS setter 106 applies phase rotation amount $\varphi_{ndm}^{odd}$ corresponding to DS amount $DOP_{ndm}^{odd}$ for each odd-numbered Tr according to equation 42 (where ndm=1 to $N_{DM}$).

Then, in a case where m is an odd number in m-th Tr, DS setter 106 sets PS amount $\psi_{ndm}^{odd}(m)$ given by equation 44 by using phase rotation amount $\varphi_{ndm}^{odd}$ that applies DS amount $DOP_{ndm}^{odd}$, and outputs PS amount $V_{ndm}^{odd}(m)$ to phase rotator 107, where $N_{DM}^{odd}=N_{DM}^{even}=N_{DM}$, m=1 to Nc, and ndm=1 to $N_{DM}$.

DS setter 106, on the other hand, assigns phase rotation amount $\varphi_{ndm}^{even}$ corresponding to DS amount $DOP_{ndm}^{even}$ for each even-numbered Tr, for example, according to following Setting Example 2-1, 2-2 or 2-3 (where ndm=1 to $N_{DM}$).

Setting Example 2-1

For example, in a case where the unequal-interval DS amount setting given by equation 6 is used for each even-numbered Tr, for the ndm-th DS amount, DS setter 106 applies phase rotation amount $\varphi_{ndm}^{even}$ corresponding to DS amount $DOP_{ndm}^{even}$ for each even-numbered Tr according to equation 46 (where ndm=1 to $N_{DM}$). Here, $N_{int}$ is an integer value.

$$\phi_{ndm}^{even} = \frac{2\pi(ndm-1)}{N_{DM}+N_{int}} \qquad \text{(Equation 46)}$$

Further, in a case where m is an even number in m-th Tr, DS setter 106 sets PS amount $\psi_{ndm}^{even}(m)$ given by equation 45 by using phase rotation amount $\varphi_{ndm}^{even}$ that applies DS amount $DOP_{ndm}^{even}$, and outputs PS amount $V_{ndm}^{even}(m)$ to phase rotator 107, where m=1 to Nc, and ndm=1 to $N_{DM}$.

Figure 13:
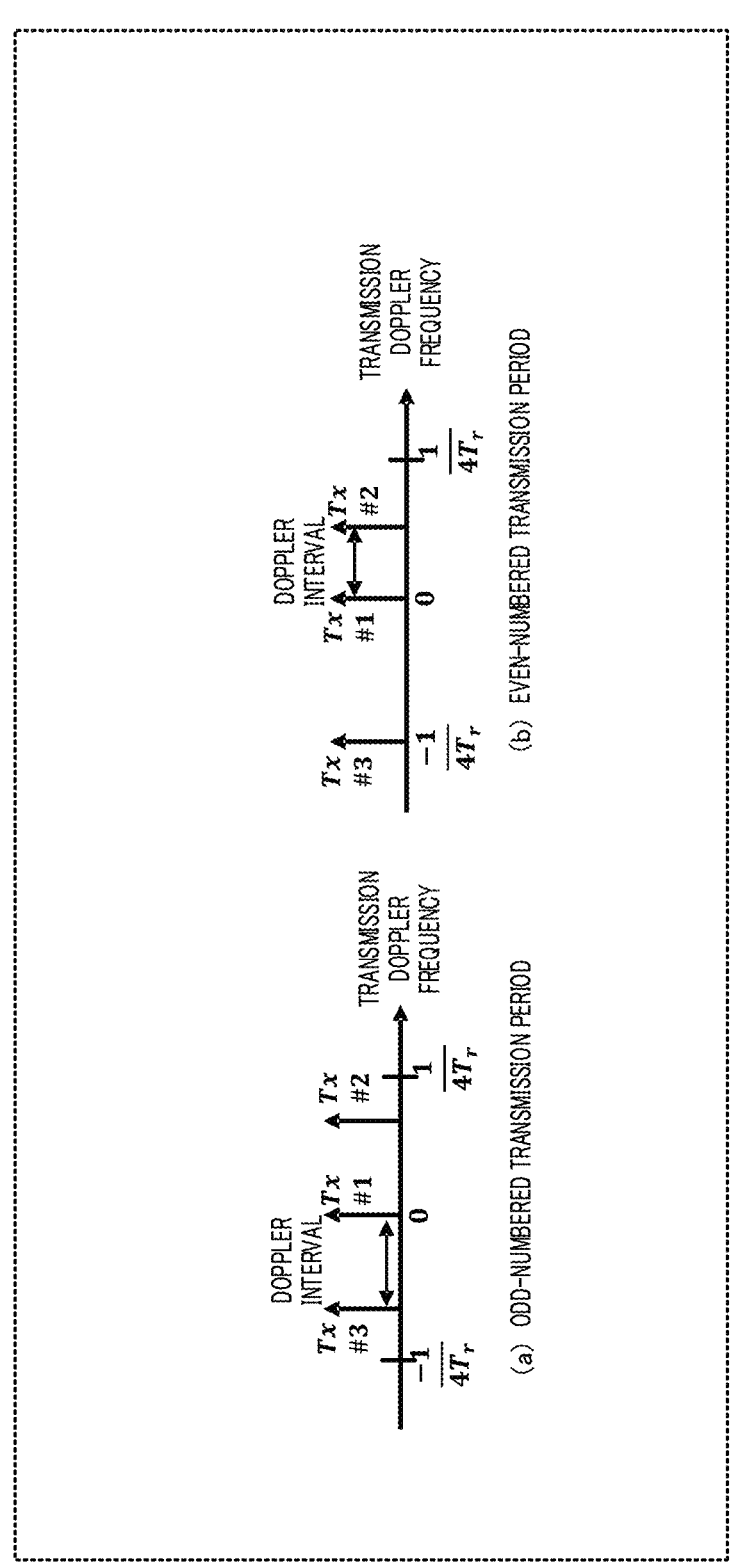
FIG. 13 illustrates setting examples of Doppler shift amounts.

FIG. 13 illustrates a DS setting example in Setting Example 2-1.

In FIG. 13, in the odd Tr, DDM number $N_{DM}^{odd}=3$ is set for Tx #1 to Tx #3, and the maximum equal-interval DS amount setting given by equation 5 is applied. In the even Tr, on the other hand, DDM number $N_{DM}^{even}=3$ is set for Tx #1 to Tx #3, and the unequal-interval DS amount setting given by equation 6 (where $N_{int}=1$) is applied.

As described above, in FIG. 13, in the odd Tr, each interval between DS amounts is an equal interval on the Doppler frequency axis, and in the even Tr, each interval between DS amounts is an unequal interval on the Doppler frequency axis.

Setting Example 2-2

In Setting Example 2-2, a setting example of Nt=2 will be described.

With respect to a first DS amount, for example, in a case where the equal-interval DS amount setting given by equation 5 is used for first Tx #1 for each even-numbered Tr, DS setter 106 applies phase rotation amount $\varphi_1^{even}$ corresponding to DS amount $DOP_1^{even}$ for each even-numbered Tr according to following equation 47. Here, as $ndm_{fix}$, any one of ndm=1 to $N_{DM}$ may be selected and used in a fixing manner.

$$\phi_1^{even} = \frac{2\pi(ndm_{fix}-1)}{N_{DM}} \qquad \text{(Equation 47)}$$

Further, with respect to the first DS amount, for example, in a case where m is an even number in m-th Tr, DS setter 106 sets PS amount $\psi_1^{even}(m)$ given by equation 45 by using phase rotation amount $\varphi_1^{even}$ that applies DS amount $DOP_1^{even}$, and outputs PS amount $\psi_1^{even}(m)$ to phase rotator 107, where m=1 to Nc.

With respect to a second DS amount, for example, DS setter 106 applies the following phase rotation amount to second Tx #2 to generate two DDM signals.

For example, with respect to the second DS amount, DS setter 106 applies and outputs phase rotation $\Phi_2^{even}(m)=phseq[mod(floor((m-1)/2), 4)+1]$ for each Tr of a chirp signal in order to apply two DS amounts $DOP_{2-1}$ and $DOP_{2-2}$ to second Tx #2.

Here, phseq[ps] represents the ps-th element of phseq=[0, 0, $\pi$, $\pi$]. For example, phseq[1]=phseq[2]=0, and phseq[3]=phase[4]=$\pi$. Further, mod(x,y) is a residue arithmetic function that represents the remainder in a case where x is divided by y. Note that, since two DDM signals are generated for Tx #2, power is divided into two for DS amount $DOP_{2-1}$ and DS amount $DOP_{2-2}$.

Note that, an example in which two DDM signals are generated is not limited to the example described above, and two DDM signals can also be generated by using, for example, phseq=[0, $\pi/2$, 0, $\pi/2$], [0, $-\pi/2$, 0, $-\pi/2$], [$\pi$, $-\pi/2$, $\pi$, $\pi/2$], or [$\pi$, $\pi/2$, $\pi$, $\pi/2$]. Further, for example, in a case where two DDM signals are generated for one transmission antenna, the other transmission antenna may perform transmission by using DDM signals that does not coincide with the above DDM signals.

Figure 14:
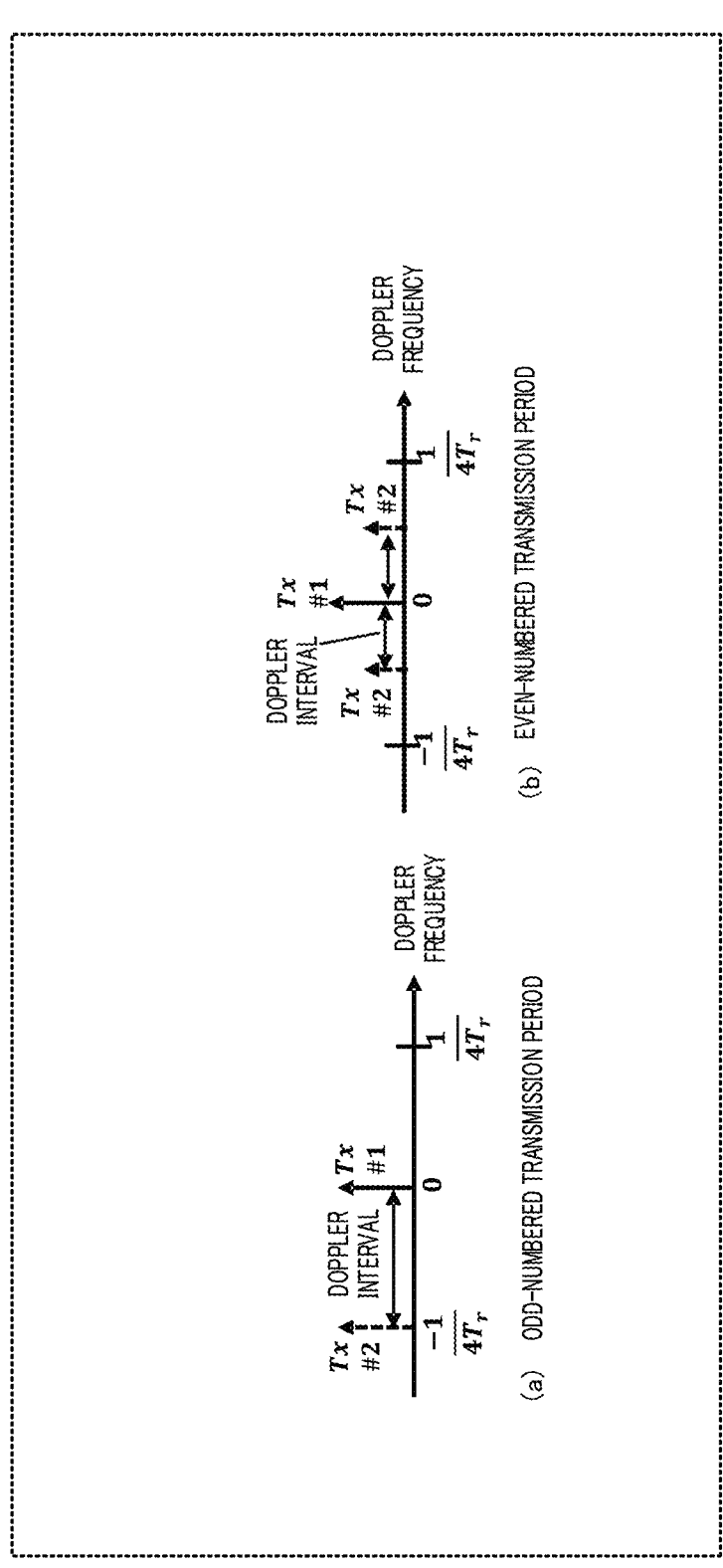
FIG. 14 illustrates setting examples of Doppler shift amounts.

FIG. 14 illustrates a DS setting example in Setting Example 2-2.

In FIG. 14, in the odd Tr, DDM number $N_{DM}^{odd}=2$ is set for Tx #1 and Tx #2, and the maximum equal-interval DS amount setting given by equation 5 is applied. In the even Tr, on the other hand, DDM number $N_{DM}^{even}=2$ is set for Tx #1 and Tx #2, zero DS amount is set for Tx #1, and phase rotation using phseq=[0, 0, $\pi$, $\pi$] is set for Tx #2.

As described above, in FIG. 14, one DS amount is assigned to each of Tx #1 and Tx #2 in the odd Tr, and one DS amount is assigned to Tx #1 and a plurality of DS amounts is assigned to Tx #2 in the even Tr.

Setting Example 2-3

In Setting Example 2-3, a case where DS amounts for all transmission antennas for each even-numbered Tr are set to be identical will be described.

For example, in a case where the equal-interval DS amount setting given by equation 5 is used, for the ndm-th DS amount, DS setter 106 applies phase rotation amount $p_{ndm}^{even}$ corresponding to DS amount $DOP_{ndm}^{even}$ for each even-numbered Tr according to following equation 48. Here, as $ndm_{fix}$, any one of ndm=1 to $N_{DM}$ may be selected and used in a fixing manner.

$$\phi_{ndm}^{even} = \frac{2\pi(ndm_{fix}-1)}{N_{DM}} \qquad \text{(Equation 48)}$$

Further, in a case where m is an even number in m-th Tr, DS setter 106 sets PS amount $\psi_{ndm}^{even}(m)$ given by equation 45 by using phase rotation amount $\varphi_{ndm}^{even}$ that applies DS amount $DOP_{ndm}^{even}$, and outputs PS amount $\psi_{ndm}^{even}(m)$ to phase rotator 107, where m=1 to Nc, and ndm=1 to $N_{DM}$.

Figure 15:
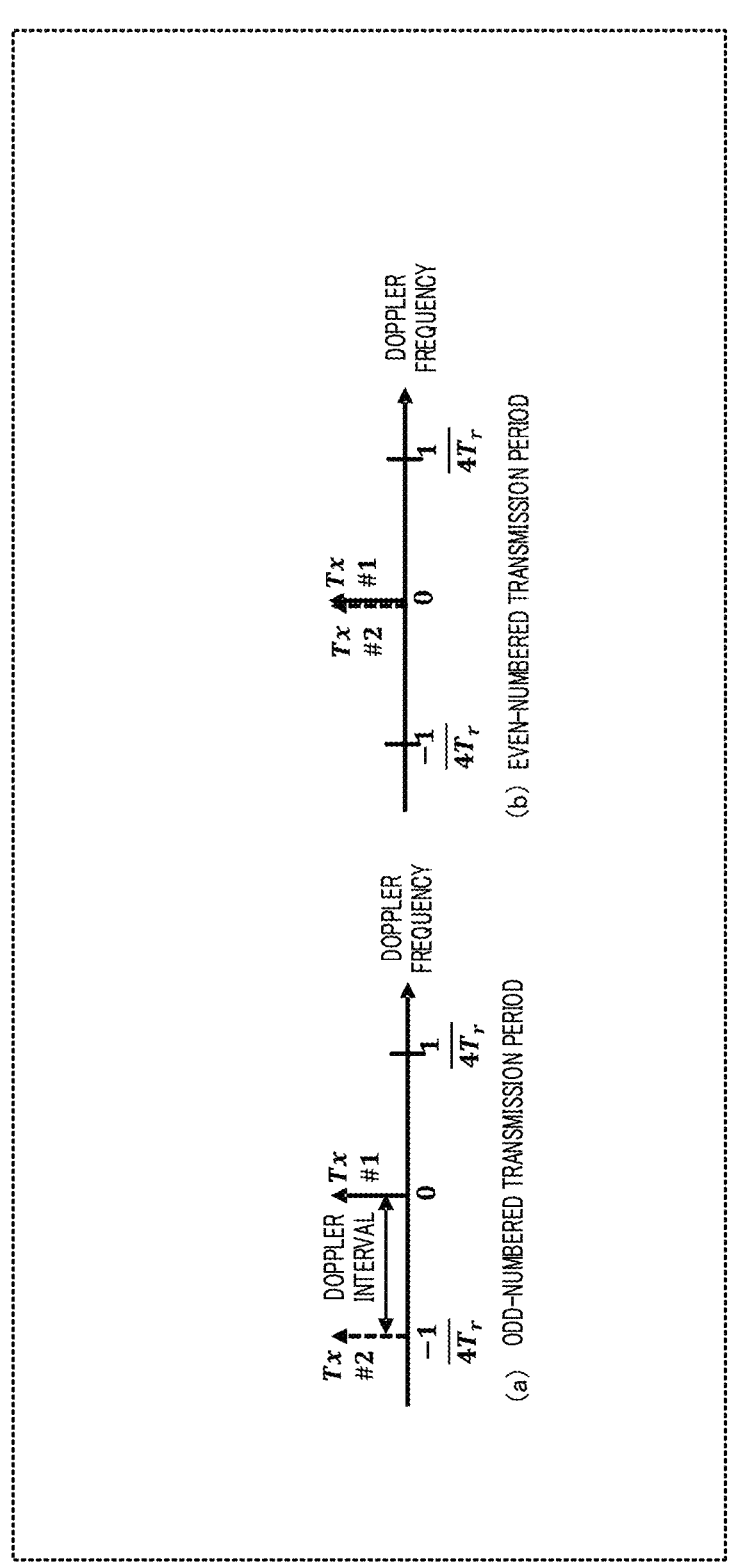
FIG. 15 illustrates setting examples of Doppler shift amounts.

FIG. 15 illustrates a DS setting example in Setting Example 2-3.

In FIG. 15, in the odd Tr, DDM number $N_{DM}^{odd}=2$ is set for Tx #1 and Tx #2, and the maximum equal-interval DS amount setting given by equation 5 is applied. In the even Tr, on the other hand, DDM number $N_{DM}^{even}=2$ is set for Tx #1 and Tx #2, and zero DS amount is set for Tx #1 and Tx #2.

As described above, in FIG. 15, different DS amounts are assigned to a plurality of transmission antennas in the odd Tr, and an identical DS amount is assigned to a plurality of transmission antennas in the even Tr.

Setting examples of DS setter 106 have been described above.

Note that, in a case where a phase rotation error is included when DS setter 106 applies a phase rotation amount to a radar transmission signal (for example, a chirp signal), spurious may occur in the Doppler frequency domain. Here, for example, the spurious level equal to or less than approximately −20 dB in comparison with the Doppler peak level does not significantly affect the radar detection performance in radar apparatus 10 in a deteriorating manner. For this reason, as a phase rotation error at the time of the phase rotation, a phase rotation error may be included in which the spurious level is within a range equal to or less than approximately −20 dB (for example, in a range of approximately 5° to 10°) in comparison with the Doppler peak level. Note that, even in the other embodiments (or variations), a phase rotation error may be included in the same manner in which the spurious level is within a range equal to or less than approximately −20 dB (for example, in a range of approximately 5° to 10°) in comparison with the Doppler peak level.

[Operation Example of Radar Receiver 200]

Next, with respect to radar reception processing in the present embodiment, operations different from those in Embodiment 1 will be mainly described.

[Operation Example of Doppler Analyzer 209]

In FIG. 2, Doppler analyzer 209 performs Doppler analysis for each distance index $f_b$ by using beat frequency responses outputted from beat frequency analyzer 208 and obtained by $N_C$ chirp pulse transmissions.

In the present embodiment, with respect to a radar transmission signal (for example, a chirp signal), for example, the DDM number is variable or constant and each interval between DS amounts is variably set for each two transmission periods (2Tr). In this case, different phase rotations $\varphi_{ndm}$ of DS amount settings are assigned between an odd-numbered Tr and an even-numbered Tr. For this reason, Doppler analyzer 209 performs Doppler analysis for each $f_b$, for example, by using a beat frequency response for each odd-numbered Tr. In the same manner, Doppler analyzer 209 performs Doppler analysis for each $f_b$, for example, by using a beat frequency response for each even-numbered Tr.

For example, Doppler analyzer 209 performs FFT processing based on data obtained for each odd-numbered or even-numbered Tr (for example, for each 2Tr). In this case, the FFT size is Nc/2. For this reason, the maximum Doppler frequency which is derived from the sampling theorem and at which no aliasing occurs is ±1/(4Tr). Further, the Doppler frequency interval of DF index $f_s$ is 1/(Nc×Tr), and the range of DF index $f_s$ is $f_s$=−Nc/4, . . . , 0, . . . , Nc/4-1.

For example, output $VFT_z^{odd}(f_b, f_s)$ of Doppler analyzer 209 for a beat frequency response for each odd-numbered Tr and output $VFT_z^{even}(f_b, f_s)$ of Doppler analyzer 209 for a beat frequency response for each even-numbered Tr in z-th signal processor 206 are given by following equation 49. Note that, j is an imaginary unit, and z=1 to Na.

[Operation Example of CFAR Processor 210]

In FIG. 2, CFAR processor 210 performs CFAR processing (for example, adaptive threshold determination) by using the outputs of Doppler analyzers 209 in first to Na-th signal processors 206 and extracts $f_{b\_cf}$ and DF indices $f_{s\_cf}$ that give peak signals.

For example, CFAR processor 210 adaptively sets a threshold by performing CFAR processing on output $VFT_z^{odd}(f_b, f_s)$ of Doppler analyzer 209 for a beat frequency response of each odd-numbered Tr, and outputs $f_{b\_cf}^{odd}$ and DF index $f_{s\_cf}^{odd}$, which provide received power greater than the threshold, and received power information $PowerFT^{odd}$ $(f_{b\_cf}^{odd} f_{s\_cf}^{odd})$ to DDM demultiplexer/direction estimator 211.

Further, for example, CFAR processor 210 performs power addition of outputs $VFT_z^{odd}(f_b, f_s)$ of Doppler analyzers 209 in first to Na-th signal processors 206 and performs two-dimensional CFAR processing in two dimensions formed by a distance axis and a Doppler frequency axis (corresponding to the relative velocity) or CFAR processing using one-dimensional CFAR processing in combination.

In a case where, for example, equation 5 is used as phase rotation amount $\varphi_{ndm}$ for applying $DOP_{ndm}^{odd}$, each interval between DS amounts in the Doppler frequency domain in the output of Doppler analyzer 209 is an equal interval and, when interval $\Delta FD$ between the DS amounts is indicated with the interval between DF indices, $\Delta FD^{odd}$=Nc/ $(2N_{DM}^{odd})$ Accordingly, in the output of Doppler analyzer 209, peaks are detected at intervals $\Delta FD^{odd}$ for each DDM signal in the Doppler frequency domain.

Accordingly, CFAR processor 210 may divide each output $VFT_z^{odd}(f_b, f_s)$ of Doppler analyzers 209 in the range of interval $\Delta FD^{odd}$ between DS amounts and perform DC-CFAR after, as given by following equation 50, performing power addition of peak positions in signals subjected to DDM for the divided ranges. Here, $f_{sc}$=−$\Delta FD^{odd}$/2, . . . , $(\Delta FD^{odd}/2)-1$.

$$PowerFT\left(f_b^{odd}, f_{sc}^{odd}\right) = \qquad \text{(Equation 50)}$$

$$\sum_{ndm=1}^{N_{DM}^{odd}} \sum_{z=1}^{N_a} \left|VFT_z\left(f_b, f_{sc} + (ndm-1) \times \Delta FD^{odd}\right)\right|^2$$

CFAR processor 210 using DC-CFAR, for example, adaptively sets a threshold, and outputs $f_{b\_cf}^{odd}$ and $f_{sc\_cf}^{odd}$ which provide received power greater than the threshold, received power information $PowerFT(f_{b\_cf}^{odd}, f_{sc\_cf}^{odd}+$ $(ndm-1)\times\Delta FD^{odd})$ for DF indices $(f_{s\_cf}^{odd}+(ndm-1)\times$ $\Delta FD^{odd})$ of $N_{DM}^{odd}$ DDM signals, and outputs $VFT_z$ $(f_{b\_cf}^{odd}, f_{sc\_f}^{odd}+(ndm-1)\times\Delta FD^{odd})$ of Doppler analyzers 209, where ndm=1, . . . , $N_{DM}^{odd}$, to DDM demultiplexer/ direction estimator 211.

In the same manner, for example, CFAR processor 210 adaptively sets a threshold by performing CFAR processing on output $VFTT_z^{even}(f_b, f_s)$ of Doppler analyzer 209 for a beat frequency response of each even-numbered Tr, and $$\begin{cases} VFT_z^{odd}(f_b, f_z) = \sum_{q=0}^{N/3-1} RFT_z(f_b, 2q+1)\exp\left[-j\frac{2\pi q f_s}{(N_c/2)}\right], & \text{(when } m \text{ is an odd number)} \\ \\ VFT_z^{even}(f_b, f_z) = \sum_{q=0}^{N/2-1} RFT_z(f_b, 2q+2)\exp\left[-j\frac{2\pi q f_s}{(N_c/2)}\right], & \text{(when } m \text{ is an even number)} \end{cases} \qquad \text{(Equation 49)}$$

outputs $f_{b\_cf}{}^{even}$ and DF Index $f_{s\_cf}{}^{even}$, which provide received power greater than the threshold, and received power information PowerFT$^{even}$($f_{b\_cf}{}^{even}$, $f_{s\_cf}{}^{even}$) to DDM demultiplexer/direction estimator 211.

Further, CFAR processor 210 using DC-CFAR performs the same processing as that in which the "odd" in the description for the odd-numbered transmission period described above is read as "even".

[Operation Example of DDM Demultiplexer/Direction Estimator 211]

Next, an operation example of DDM demultiplexer/direction estimator 211 illustrated in FIG. 2 will be described.

Note that, hereinafter, an example of processing of DDM demultiplexer/direction estimator 211 in a case where DC-CFAR is used in CFAR processor 210 will be described.

<Case where Setting Example 1 is Used in DS Setter 106>

In a case where Setting Example 1 is used in DS setter 106, for example, the DDM number is variably set and the interval between DS amounts is variably set for each two transmission periods (2Tr). In this case, phase-rotations $\varphi_{ndm}$ in which the DS amount for each odd-numbered Tr and the DS amount for each even-numbered Tr are differently set are applied.

Accordingly, Setting Example 1 may become a measure for Case 1 described above. For example, even in a case where two target object reflected waves at intervals equal to DDM intervals arrive in one transmission period of an even-numbered transmission period and an odd-numbered transmission period, radar apparatus 10 may detect two target object reflected waves at intervals different from the DDM intervals in the other transmission period of the even-numbered transmission period and the odd-numbered transmission period.

DDM demultiplexer/direction estimator 211 performs DDM demultiplexing processing and direction estimation processing on DDM signals by, for example, the same operation as that in Embodiment 1.

For example, DDM demultiplexer/direction estimator 211 uses $f_{b\_fc}{}^{odd}$ and $f_{sc\_cf}{}^{dd}$ the received power information for DF indices of $N_{DM}{}^{odd}$ DDM signals, and outputs VFT$_z{}^{odd}$($f_b$, $f_s$) of Doppler analyzers 209 in first to Na-th signal processors 206, which are inputted from CFAR processor 210, to demultiplex $N_{DM}{}^{odd}$ signals transmitted with DDM transmission, and performs TxSel together with direction estimation processing. Further, DDM demultiplexer/direction estimator 211 outputs Doppler frequencies (for example, Doppler velocities or relative velocities) and results of the direction estimation processing based on the result of TxSel.

In the same manner, CFAR processor 210 performs the same processing as that in which the "odd" in the description above is read as "even".

Note that, since Doppler analyzer 209 performs FFT processing based on data obtained for each odd-numbered or even-numbered Tr (for example, for each 2Tr), the Doppler frequency at which no aliasing occurs and which is derived from the sampling theorem is in a range of ±1/(4Tr).

Here, for example, DDM demultiplexer/direction estimator 211 can determine whether aliasing is included, by utilizing the fact that an identical transmission antenna(s) is/are included in each of the odd-numbered Tr and the even-numbered Tr. For example, in the setting example illustrated in FIG. 10, Tx #1 to Tx #3 are included in both the odd Tr and the even Tr. For example, DDM demultiplexer/direction estimator 211 can detect whether there is aliasing, by comparing phases between outputs VFT$_z{}^{odd}$($f_b$, $f_s$) and VFT$_z{}^{even}$($f_b$, $f_s$) of Doppler analyzers 209 in first to Na-th signal processors 206 in DF indices for Tx #1 to Tx

3. Thus, the Doppler frequency of a target object is detectable in a range of ±1/(2Tr).

Further, for example, in the setting example illustrated in FIG. 11, the DDM number of 1 is set to Tx #1 in the even Tr. For this reason, DDM demultiplexer/direction estimator 211 can specify a signal detected in the even Tr as a signal corresponding to Tx #1, and thus, can determine TxSel without mistake. For example, DDM demultiplexer/direction estimator 211 can determine TxSel in the even Tr without mistake by using DF index information on Tx #1. For example, even in Case 2 described above, an effect capable of determining TxSel without mistake can be obtained by using a transmission antenna determination result in the even Tr, and thus, it may become a measure for Case 2.

Further, in the setting example illustrated in FIG. 11, Tx #1 is included in both the odd Tr and the even Tr. For example, DDM demultiplexer/direction estimator 211 can detect whether there is aliasing, by comparing phases between outputs VFT$_z{}^{odd}$($f_b$, $f_s$) and VFT$_z{}^{even}$($f_b$, $f_s$) of Doppler analyzers 209 in first to Na-th signal processors 206 in a DF index for Tx #1. Thus, the Doppler frequency of a target object is detectable in a range of ±1/(2Tr).

Further, for example, in the setting example illustrated in FIG. 12, the DDM number of 3 is set to Tx #1 to Tx #3 in the even Tr, and DDMs at unequal intervals are provided. For example, with respect to demultiplexing and reception of DDM signals using unequal-interval DDMs, demultiplexing is possible by using an existing technique (for example, see PTL 4). DDM demultiplexer/direction estimator 211 may perform TxSel based on a demultiplexing result using, for example, an existing technique. Further, DDM demultiplexer/direction estimator 211 may use, for example, this result of TxSel in a result of TxSel of another transmission period (for example, the odd Tr in FIG. 12). For example, even in Case 2 described above, an effect capable of determining TxSel without mistake can be obtained by using a transmission antenna determination result in the even Tr, and thus, it may become a measure for Case 2.

Further, in the setting example illustrated in FIG. 12, Tx #1 to Tx #3 are included in both the odd Tr and the even Tr. For example, DDM demultiplexer/direction estimator 211 can detect whether there is aliasing, by comparing phases between outputs VFT$_z{}^{odd}$($f_b$, $f_s$) and VFT$_z{}^{even}$ ($f_b$, $f_s$) of Doppler analyzers 209 in first to Na-th signal processors 206 in DF indices for Tx #1 to Tx #3. Thus, the Doppler frequency of a target object is detectable in a range of ±1/(2Tr).

<Case where Setting Example 2-1 is Used in DS Setter 106>

In a case where Setting Example 2-1 is used in DS setter 106, for example, the DDM number is fixed and the interval between DS amounts is variably set for each two transmission periods (2Tr). In this case, phase-rotations $\varphi_{ndm}$ in which the DS amount for each odd-numbered Tr and the DS amount for each even-numbered Tr are differently set are applied.

Accordingly, Setting Example 2-1 may become a measure for Case 1 described above. For example, even in a case where two target object reflected waves at intervals equal to DDM intervals arrive in one transmission period of an even-numbered transmission period and an odd-numbered transmission period, radar apparatus 10 may detect two target object reflected waves at intervals different from the DDM intervals in the other transmission period of the even-numbered transmission period and the odd-numbered transmission period.

For example, DDM demultiplexer/direction estimator 211 performs DDM demultiplexing processing and direction estimation processing on DDM signals by the same operation as in a case where Setting Example 1 is used in DS setter 106.

Note that, since Doppler analyzer 209 performs FFT processing based on data obtained for each odd-numbered or even-numbered Tr (for example, for each 2Tr), the Doppler frequency at which no aliasing occurs and which is derived from the sampling theorem is in a range of $\pm 1/(4\text{Tr})$.

Here, for example, DDM demultiplexer/direction estimator 211 can determine whether aliasing is included, by utilizing the fact that an identical transmission antenna(s) is/are included in each of the odd-numbered Tr and the even-numbered Tr. For example, in the setting example illustrated in FIG. 13, Tx #1 to Tx #3 are included in both the odd Tr and the even Tr. For example, DDM demultiplexer/direction estimator 211 can detect whether there is aliasing, by comparing phases between outputs $\text{VFT}_z^{odd}(f_b, f_s)$ and $\text{VFT}_z^{even}(f_b, f_s)$ of Doppler analyzers 209 in first to Na-th signal processors 206 in DF indices for Tx #1 to Tx #3. Thus, the Doppler frequency of a target object is detectable in a range of $\pm 1/(2\text{Tr})$.

Further, in Setting Example 2-1, unequal-interval DDMs are used in a given transmission period(s). For example, in the setting example illustrated in FIG. 13, Tx #1 to Tx #3 use unequal-interval DDMs by using the DDM number of 3 in even Tr. For example, with respect to demultiplexing and reception of DDM signals using unequal-interval DDMs, demultiplexing is possible by using an existing technique (for example, PTL 4). DDM demultiplexer/direction estimator 211 may perform TxSel based on a demultiplexing result using, for example, an existing technique. Further, DDM demultiplexer/direction estimator 211 may use, for example, this result of TxSel in a result of TxSel of another transmission period (for example, the odd Tr in FIG. 13). In this case, even in Case 2 described above, an effect capable of determining TxSel without mistake can be obtained by using a transmission antenna determination result in the even Tr, and thus, it may become a measure for Case 2.

<Case where Setting Example 2-2 is Used in DS Setter 106>

In a case where Setting Example 2-2 is used in DS setter 106, for example, the DDM number is fixed and the interval between DS amounts is variably set for each two transmission periods (2Tr). In this case, phase-rotations $\varphi_{ndm}$ in which the DS amount for each odd-numbered Tr and the DS amount for each even-numbered Tr are differently set are applied. Thus, Setting Example 2-2 may become a measure for Case 2 described above.

For example, DDM demultiplexer/direction estimator 211 performs DDM demultiplexing processing and direction estimation processing on DDM signals by the same operation as in a case where Setting Example 1 is used in DS setter 106.

Note that, since Doppler analyzer 209 performs FFT processing based on data obtained for each odd-numbered or even-numbered Tr (for example, for each 2Tr), the Doppler frequency at which no aliasing occurs and which is derived from the sampling theorem is in a range of $\pm 1/(4\text{Tr})$.

Here, for example, DDM demultiplexer/direction estimator 211 can determine whether aliasing is included, by utilizing the fact that an identical transmission antenna(s) is/are included in each of the odd-numbered Tr and the even-numbered Tr. For example, in the setting example illustrated in FIG. 14, Tx #1 is included in both the odd Tr and the even Tr. For example, DDM demultiplexer/direction estimator 211 can detect whether there is aliasing, by comparing phases between outputs $\text{VFT}_z^{odd}(f_b, f_s)$ and $\text{VFT}_z^{even}(f_b, f_s)$ of Doppler analyzers 209 in first to Na-th signal processors 206 in a DF index for Tx #1. Thus, the Doppler frequency of a target object is detectable in a range of $\pm 1/(2\text{Tr})$.

Further, in Setting Example 2-2, unequal-interval DDMs are used in a given transmission period(s). For example, in the setting example illustrated in FIG. 14, Tx #1 and Tx #2 use unequal-interval DDMs by using the DDM number of 3 in even Tr. For example, with respect to demultiplexing and reception of DDM signals using unequal-interval DDMs, demultiplexing is possible by using an existing technique (for example, PTL 4). DDM demultiplexer/direction estimator 211 may perform TxSel based on a demultiplexing result using, for example, an existing technique. Further, DDM demultiplexer/direction estimator 211 may use, for example, this result of TxSel in a result of TxSel of another transmission period (for example, the odd Tr in FIG. 14). In this case, even in Case 2 described above, an effect capable of determining TxSel without mistake can be obtained by using a transmission antenna determination result in the even Tr, and thus, it may become a measure for Case 2.

Further, Setting Example 2-2 may be a measure for Case 1 described above. For example, even in a case where two target object reflected waves at intervals equal to DDM intervals arrive in one transmission period of an even-numbered transmission period and an odd-numbered transmission period, radar apparatus 10 may detect two target object reflected waves at intervals different from the DDM intervals in the other transmission period of the even-numbered transmission period and the odd-numbered transmission period.

<Case where Setting Example 2-3 is Used in DS Setter 106>

In a case where Setting Example 2-3 is used in DS setter 106, for example, the DDM number is fixed and the interval between DS amounts is variably set for each two transmission periods (2Tr). In this case, phase-rotations $\varphi_{ndm}$ in which the DS amount for each odd-numbered Tr and the DS amount for each even-numbered Tr are differently set are applied.

Accordingly, Setting Example 2-3 may become a measure for Case 1 described above. For example, even in a case where two target object reflected waves at intervals equal to DDM intervals arrive in one transmission period of an even-numbered transmission period and an odd-numbered transmission period, radar apparatus 10 may detect the two target object reflected waves in the other transmission period of the even-numbered transmission period and the odd-numbered transmission period.

For example, DDM demultiplexer/direction estimator 211 performs DDM demultiplexing processing and direction estimation processing on DDM signals by the same operation as in a case where Setting Example 1 is used in DS setter 106.

Further, for example, in the setting example illustrated in FIG. 15, the DDM number of 1 is set to Tx #1 and Tx #2 in the even Tr. For this reason, DDM demultiplexer/direction estimator 211 can determine TxSel without mistake. For example, DDM demultiplexer/direction estimator 211 can determine TxSel in the even Tr without mistake by using DF index information on Tx #1 and Tx #2. For example, even in Case 2 described above, an effect capable of determining TxSel without mistake can be obtained by using a transmission antenna determination result in the even Tr, and thus, it may become a measure for Case 2.

Further, in the setting example illustrated in FIG. 17, Tx #1 is included in both the odd Tr and the even Tr. Further, in the odd Tr, different DDM signals are used for Tx #1 and Tx #2. For example, DDM demultiplexer/direction estimator 211 can detect whether there is aliasing, by comparing phases between outputs $\mathrm{VFT}_z^{odd}(f_b, f_s)$ and $\mathrm{VFT}_z^{even}(f_b, f_s)$ of Doppler analyzers 209 in first to Na-th signal processors 206 in DF indices for Tx #1 and Tx #2. Thus, the Doppler frequency of a target object is detectable in a range of $\pm 1/(2Tr)$.

The radar reception processing in the present embodiment has been described above.

Note that, in the present embodiment, cases where different Doppler multiplexing numbers for each transmission period and different Doppler shift amounts for each transmission period are set have been described as an example, but the present disclosure is not limited thereto. The Doppler shift amount may be variably set for each radar observation in order to more reliably separate a plurality of targets in the positioning output of radar apparatus 10.

Further, in the present embodiment, cases where radar apparatus 10 performs the operations in Embodiment 1 or 2 have been described, but the present disclosure is not limited thereto. Radar apparatus 10 may perform the operations according to the present embodiment, for example, without performing the operations in Embodiments 1 and 2 (or setting of feeding line 108).

Embodiments of the present disclosure have been described above.

OTHER EMBODIMENTS

Note that, in a radar apparatus according to an exemplary embodiment of the present disclosure, the radar transmitter and the radar receiver may be individually disposed at physically remote places. Further, in the radar receiver according to an exemplary embodiment of the present disclosure, Doppler demultiplexer/direction estimator 211 and other components may be individually disposed at physically remote places.

Further, in the embodiments described above, a case where angle regions around target object direction $\theta=0°$ are set as the field of view for radar apparatus 10 has been described, but the field of view for radar apparatus 10 is not limited to the angle regions around target object direction $\theta=0°$.

Further, the numerical values of the parameters used in an exemplary embodiment of the present disclosure, such as the values related to number Nt of transmission antennas, number Na of reception antennas, transmission antenna interval Dt, Dr, Doppler multiplexing number $N_{DM}$, Doppler shift amounts, Doppler shift intervals, and phase rotations are exemplary, and the present disclosure is not limited to those values. Further, for example, one or some of the transmission antennas included in the radar apparatus may be used for number Nt of transmission antennas, and one or some of the reception antennas included in the radar apparatus may be used for number Na of reception antennas.

Further, the radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the processors described above are implemented by the CPU executing the control program. Nonetheless, the hardware configuration of the radar apparatus is not limited to that in this example. For example, the functional processors of the radar apparatus may be implemented as an integrated circuit (IC). Each functional processor may be formed as an individual chip, or some or all of them may be formed into a single chip.

While various embodiments have been described with reference to the accompanying drawings herein above, the present disclosure is obviously not limited to these examples. Obviously, a person skilled in the art would arrive at variations and modification examples within the scope described in the claims, and it is to be understood that these variations and modification examples fall within the technical scope of the present disclosure. Each constituent element of the above-mentioned embodiments may be combined optionally without departing from the spirit of the disclosure.

The expression " . . . processor", " . . . -er", or " . . . -or" in the embodiments described above may be replaced with another expression such as " . . . circuitry", " . . . assembly", " . . . device", " . . . unit", or " . . . module".

Although the above embodiments have been described with an example of a configuration using hardware, the present disclosure can also be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit or a general-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

Summary of the Present Disclosure

A radar apparatus according to an exemplary embodiment of the present disclosure includes: a plurality of transmission antennas including a first transmission antenna, which is connected to a first feeding line, and a second transmission antenna, which is connected to a second feeding line different from the first feeding line; and transmission circuitry, which, in operation, performs multiplexing transmission of a transmission signal, to which a phase rotation amount corresponding to a Doppler shift amount is applied, from the plurality of transmission antennas. A phase deviation due to a line length difference between the first feeding line and the second feeding line is an odd multiple of $\pi/2$.

In one exemplary embodiment of the present disclosure, the line length difference is a half wavelength of the transmission signal or an odd multiple of the half wavelength.

In one exemplary embodiment of the present disclosure, the plurality of transmission antennas further includes a third transmission antenna which is connected to a third feeding line, the phase deviation due to the line length difference between the first feeding line and the second feeding line further includes an odd multiple of $\pi/4$, and a phase deviation due to a line length difference between the first feeding line and the third feeding line is an odd multiple of $\pi/4$.

In one exemplary embodiment of the present disclosure, the radar apparatus further includes: a plurality of reception antennas that receives a reflected wave signal which is the transmission signal reflected by a target object; and reception circuitry, which, in operation, demultiplexes, from the reflected wave signals, a signal having been subjected to the multiplexing transmission, and discriminates, based on a direction estimation result after correction of the phase deviation for the signal having been demultiplexed, which of the first transmission antenna and the second transmission antenna each of a plurality of the signals having been demultiplexed corresponds to.

In one exemplary embodiment of the present disclosure, the plurality of reception antennas includes a first reception antenna and a second reception antenna, and the first reception antenna and the second reception antenna are arranged on a straight line in a direction in which the first transmission antenna and the second transmission antenna are arranged.

In one exemplary embodiment of the present disclosure, directional gains of the first transmission antenna and the second transmission antenna differ by a predetermined value or more in a direction in which received phases of reflected wave signals, which are signals respectively transmitted from the first transmission antenna and the second transmission antenna and reflected by a target object, are in phase.

In one exemplary embodiment of the present disclosure, main beam directions of the first transmission antenna and the second transmission antenna differ from each other.

In one exemplary embodiment of the present disclosure, at least one of a number of the Doppler shift amounts and/or an interval between the Doppler shift amounts is variably set for each transmission period in which the transmission signal is transmitted, where the number of the Doppler shift amounts and the interval between the Doppler shift amounts are set for transmission of the transmission signal.

In one exemplary embodiment of the present disclosure, among the plurality of transmission antennas, a number of transmission antennas to which the Doppler shift amounts are assigned differs between an odd-numbered transmission period and an even-numbered transmission period.

In one exemplary embodiment of the present disclosure, at least one of the Doppler shift amounts, which are indentical to each other, is set to the odd-numbered transmission period and the even-numbered transmission period.

In one exemplary embodiment of the present disclosure, in one of the odd-numbered transmission period and the even-numbered transmission period, the plurality of transmission antennas is used to transmit the transmission signal, and in another of the odd-numbered transmission period and the even-numbered transmission period, one of the plurality of transmission antennas is used to transmit the transmission signal.

In one exemplary embodiment of the present disclosure, in one of the odd-numbered transmission period and the even-numbered transmission period, each of the intervals between the Doppler shift amounts is an equal interval on a Doppler frequency axis, and in another of the odd-numbered transmission period and the even-numbered transmission period, the each of the intervals between the Doppler shift amounts is an unequal interval on the Doppler frequency axis.

In one exemplary embodiment of the present disclosure, in one of the odd-numbered transmission period and the even-numbered transmission period, one of the Doppler shift amounts is assigned to each of the first transmission antenna and the second transmission antenna, and in another of the odd-numbered transmission period and the even-numbered transmission period, one of the Doppler shift amounts is assigned to the first transmission antenna and a plurality of the Doppler shift amounts among the Doppler shift amounts is assigned to the second transmission antenna.

In one exemplary embodiment of the present disclosure, in one of the odd-numbered transmission period and the even-numbered transmission period, the Doppler shift amounts, which are different from each other, are assigned to the plurality of transmission antennas, and in another of the odd-numbered transmission period and the even-numbered transmission period, the Doppler shift amounts, which are identical to each other, are assigned to the plurality of transmission antennas.

A radar apparatus according to an exemplary embodiment of the present disclosure includes: a plurality of transmission antennas; and transmission circuitry, which, in operation, performs multiplexing transmission of a transmission signal, which is a transmission signal to which a phase rotation amount corresponding to a Doppler shift amount is applied, from the plurality of transmission antennas. At least one of a number of the Doppler shift amounts, which is set for transmission of the transmission signal, and/or an interval between the Doppler shift amounts, which is set for the multiplexing transmission, is variably set for each transmission period in which the transmission signal is transmitted.

In one exemplary embodiment of the present disclosure, the interval between the Doppler shift amounts is an equal interval.

In one exemplary embodiment of the present disclosure, a transmission period in which the interval between the Doppler shift amounts is an equal interval and a transmission period in which the interval between the Doppler shift amounts is an unequal interval are included.

While various embodiments have been described herein above, it is to be appreciated that various changes in form and detail may be made without departing from the sprit and scope of the invention(s) presently or hereafter claimed.

This application is entitled to and claims the benefit of Japanese Patent Application No. 2023-045450, filed on Mar. 22, 2023, the disclosure of which including the specification, drawings and abstract is incorporated herein by reference in its entirety.

INDUSTRIAL APPLICABILITY

The present disclosure is suitable as a radar apparatus that detects a wide-angle range.

REFERENCE SIGNS LIST

10 Radar apparatus
100 Radar transmitter
101 Radar transmission signal generator
102 Transmission signal generation controller
103 Modulated signal generator
104 VCO
105 Phase rotation amount setter
106 Doppler shift setter
107 Phase rotator
108 Feeding line
109 Transmission antenna processor
200 Radar receiver 201 Antenna system processor
202 Reception antenna processor
203 Reception radio
204 Mixer
205 LPF
206 Signal processor
207 AD converter
208 Beat frequency analyzer
209 Doppler analyzer
210 CFAR processor
211 Doppler demultiplexer/direction estimator

The invention claimed is:

1. A radar apparatus, comprising:
a plurality of transmission antennas including a first transmission antenna and a second transmission antenna, the first transmission antenna connected to a first feeding line, the second transmission antenna connected to a second feeding line different from the first feeding line; and
transmission circuitry, which, in operation, performs multiplexing transmission of a transmission signal from the plurality of transmission antennas, the transmission signal being a transmission signal to which a phase rotation amount corresponding to a Doppler shift amount is applied, wherein
a phase deviation due to a line length difference between the first feeding line and the second feeding line is an odd multiple of $\pi/2$.

2. The radar apparatus according to claim 1, wherein the line length difference is a half wavelength of the transmission signal or an odd multiple of the half wavelength.

3. The radar apparatus according to claim 1, wherein:
the plurality of transmission antennas further includes a third transmission antenna, the third transmission antenna connected to a third feeding line,
the phase deviation due to the line length difference between the first feeding line and the second feeding line further includes an odd multiple of $\pi/4$, and
a phase deviation due to a line length difference between the first feeding line and the third feeding line is an odd multiple of $\pi/4$.

4. The radar apparatus according to claim 1, further comprising:
a plurality of reception antennas that receives a reflected wave signal, the reflected wave signal being the transmission signal reflected by a target object; and
reception circuitry, which, in operation, demultiplexes, from the reflected wave signals, a signal having been subjected to the multiplexing transmission, and discriminates, based on a direction estimation result after correction of the phase deviation for the signal having been demultiplexed, which of the first transmission antenna and the second transmission antenna each of a plurality of the signals having been demultiplexed corresponds to.

5. The radar apparatus according to claim 4, wherein:
the plurality of reception antennas includes a first reception antenna and a second reception antenna, and
the first reception antenna and the second reception antenna are arranged on a straight line in a direction in which the first transmission antenna and the second transmission antenna are arranged.

6. The radar apparatus according to claim 1, wherein directional gains of the first transmission antenna and the second transmission antenna differ by a predetermined value or more in a direction in which received phases of reflected wave signals are in phase, the reflected wave signals being signals respectively transmitted from the first transmission antenna and the second transmission antenna and reflected by a target object.

7. The radar apparatus according to claim 6, wherein main beam directions of the first transmission antenna and the second transmission antenna differ from each other.

8. The radar apparatus according to claim 1, wherein at least one of a number of the Doppler shift amounts and/or an interval between the Doppler shift amounts is variably set for each transmission period in which the transmission signal is transmitted, the number of the Doppler shift amounts and the interval between the Doppler shift amounts being set for transmission of the transmission signal.

9. The radar apparatus according to claim 8, wherein among the plurality of transmission antennas, a number of transmission antennas to which the Doppler shift amounts are assigned differs between an odd-numbered transmission period and an even-numbered transmission period.

10. The radar apparatus according to claim 9, wherein at least one of the Doppler shift amounts is set to the odd-numbered transmission period and the even-numbered transmission period, the Doppler shift amounts being identical to each other.

11. The radar apparatus according to claim 9, wherein:
in one of the odd-numbered transmission period and the even-numbered transmission period, the plurality of transmission antennas is used to transmit the transmission signal, and
in another of the odd-numbered transmission period and the even-numbered transmission period, one of the plurality of transmission antennas is used to transmit the transmission signal.

12. The radar apparatus according to claim 9, wherein:
in one of the odd-numbered transmission period and the even-numbered transmission period, each of the intervals between the Doppler shift amounts is an equal interval on a Doppler frequency axis, and
in another of the odd-numbered transmission period and the even-numbered transmission period, the each of the intervals between the Doppler shift amounts is an unequal interval on the Doppler frequency axis.

13. The radar apparatus according to claim 9, wherein:
in one of the odd-numbered transmission period and the even-numbered transmission period, one of the Doppler shift amounts is assigned to each of the first transmission antenna and the second transmission antenna, and
in another of the odd-numbered transmission period and the even-numbered transmission period, one of the Doppler shift amounts is assigned to the first transmission antenna and a plurality of the Doppler shift amounts among the Doppler shift amounts is assigned to the second transmission antenna.

14. The radar apparatus according to claim 8, wherein in one of the odd-numbered transmission period and the even-numbered transmission period, the Doppler shift amounts are assigned to the plurality of transmission antennas, the Doppler shift amounts being different from each other, and
in another of the odd-numbered transmission period and the even-numbered transmission period, the Doppler shift amounts are assigned to the plurality of transmission antennas, the Doppler shift amounts being identical to each other.

15. A radar apparatus, comprising:

a plurality of transmission antennas; and transmission circuitry, which, in operation, performs multiplexing transmission of a transmission signal from the plurality of transmission antennas, the transmission signal being a transmission signal to which a phase rotation amount corresponding to a Doppler shift amount is applied, wherein at least one of a number of the Doppler shift amounts and/or an interval between the Doppler shift amounts is variably set for each transmission period in which the transmission signal is transmitted, the number of the Doppler shift amounts being set for transmission of the transmission signal, the interval between the Doppler shift amounts being set for the multiplexing transmission.

16. The radar apparatus according to claim 15, wherein the interval between the Doppler shift amounts is an equal interval.

17. The radar apparatus according to claim 15, wherein a transmission period in which the interval between the Doppler shift amounts is an equal interval and a transmission period in which the interval between the Doppler shift amounts is an unequal interval are included.

18. A transmission method of a radar apparatus, the transmission method comprising:

applying a phase rotation amount corresponding to a Doppler shift amount to a transmission signal; and performing multiplexing transmission of the transmission signal from a plurality of transmission antennas, wherein the plurality of transmission antennas includes a first transmission antenna and a second transmission antenna, the first transmission antenna connected to a first feeding line, the second transmission antenna connected to a second feeding line different from the first feeding line, and a phase deviation due to a line length difference between the first feeding line and the second feeding line is an odd multiple of $\pi/2$.

19. The transmission method of radar apparatus according to claim 18, wherein at least one of a number of the Doppler shift amounts and/or an interval between the Doppler shift amounts is variably set for each transmission period in which the transmission signal is transmitted, the number of the Doppler shift amounts and the interval between the Doppler shift amounts being set for transmission of the transmission signal.

20. The transmission method of radar apparatus according to claim 19, wherein among the plurality of transmission antennas, a number of transmission antennas to which the Doppler shift amounts are assigned differs between an odd-numbered transmission period and an even-numbered transmission period.

* * * * *